INVENTOR.
John G. Van Bosse

DISTRIBUTOR 112

READ DRIVER 1403

INHIBIT DRIVER 1601

TO / FROM
CROSSPOINT
NETWORK 3,133,154
ELECTRONIC SWITCHING SYSTEM
John G. Van Bosse, Park Ridge, Ill., assignor to Automatic Electric Laboratories, Inc., a corporation of Delaware
Filed Oct. 12, 1959, Ser. No. 845,901
20 Claims. (Cl. 179—18)

This invention relates to an electronic switching system, and more particularly, to a switching system in which control equipment is time division multiplex shared, and in which the communication signal paths are selectively connected via a crosspoint switching network.

Many electronic automatic telephone switching systems have been developed in order to realize advantages such as fast operation, small size, and easy maintenance as compared to electromechanical systems. These electronic switching systems fall into two main categories, those in which the voice path switching is accomplished by means of a common highway with time division multiplex sampling of the voice signals, and those using electronic elements such as gas tubes or semiconductor diodes connected in matrix form in one or more stages. The crosspoint type systems include small exchange types having approximately 100 lines in which control circuits such as registers and sequence switches are individual to connecting units such as links; and large exchanges of about 10,000 lines in which the control circuits are shared in common by using complicated time-sharing arrangements with highly centralized memory units.

It is an object of this invention to provide a simple and effective arrangement for time-sharing of the control circuits, which is suitable even for a small exchange using crosspoint switching.

According to the invention, an electronic switching system is provided in which control equipment comprising a memory and associated registers and logic circuits is shared on a time division multiplex basis by all of the subscribed lines. This control equipment performs the functions of receiving signals representative of the subscriber station hookswitch and dial signals, registering the call sequence of each line, timing the dial pulses and digits, registering the dialled number, and during a connection registering the route of the connection in the crosspoint network.

The system also includes a marker for selecting an available path through the switching network for a desired connection and for controlling the establishment and breaking off of connections. The marker is used on a one-at-a-time basis by the calling lines, and is held for one or more complete multiplex cycles each time it is seized. When a calling line has completed dialling and the marker is idle, it is seized for one cycle to select an available path, and if a connection can be made it is held for another cycle to set up the connection.

It is a feature of the invention that the time-shared control equipment registers the routing of all established connections, preferably in the time slots of both the calling and the called lines. It is therefore possible for the marker to search for and select an available path without testing or any other action being taken in the crosspoint network itself.

When the marker has been seized by a calling line which has completed dailling, the calling and called numbers are supplied to the marker during the calling line time slot in which seizure occurs. The calling line number is identified by the distributor output, and the called number is indicated by the control equipment register. The marker then tests for an available connection during one multiplex cycle, examining the control equipment register of each of the lines for the routing information stored therein for established connections. On the basis of this information the marker determines either that the connection is impossible because the called line is busy or no path to the switching network is available, and therefore gives a busy signal to the calling line and is released; or it identifies an available connection and is held for an additional multiplex cycle during which it transmits marking signals to the crosspoint network and thereby causes a connection to be established. During this latter cycle the marker also transmits the routing of the call to the time-shared control equipment during the respective time slots of the calling and called lines where it is retained for the duration of the call. Since registration of the called number is no longer required, it is cancelled; and the same register is then used to store the routing, thereby reducing the number of register elements needed.

When the calling line sequence circuit in the control equipment determines that disconnect has occurred, the marker is seized for one multiplex cycle, during which it receives the routing information from the calling and called lines registers and breaks off the crosspoint connection in accordance therewith.

The switching network comprises a multi-stage crosspoint network having junctors at the center. For a system having 100 line circuits, a four-stage network may be used, with two stages for connection between the junctor and a calling line, and two stages for connections between the junctor and the called line. In the disclosed embodiment of the invention each interstage link, and also each link between the network and the line circuits is marked to identify and fire the crosspoints to be used in a connection.

It is a feature of the invention that each idle link is shunted by a low resistance circuit to A.C. ground. With this arrangement, low potential control signals may be used; and also there is a constant load on the principal direct current power supply to the crosspoints, so that clicks are not likely to be heard in other connections when a junctor or a link switches from idle to busy or vice-versa. This shunt control arrangement is used both for the junctors and for the control markers to the various links.

Another feature of the invention relates to an arrangement for supplying ringing current to the connection from the junctor, this current being transmitted to the called subscriber's station to operate a tone ringer, and to the calling subscriber's station to supply ringback tone.

It has been chosen to use four-layer semiconductor diodes as the switching elements in the network. These diodes are bistable devices which have a high resistance in one state, and responsive to a relatively high potential applied thereto, they break down and switch to a low resistance state, remaining in the latter state as long as a small holding current is permitted to flow through them. In this type of diode as presently available the break-down voltage is a function of the rate of change of the switching voltage applied thereto. The nominal ratings are determined on the basis of a slow rate of change of the switching voltage. If this voltage has a very fast rise time the break-down voltage may be substantially reduced, thereby causing the false firing of diodes other than the ones selected.

According to the invention, this problem is overcome by supplying the break-down marking voltages at a relatively slow and constant rate of change. In a specific embodiment of this feature a resistance-capacitance network is included in the marking control unit of each link. The transient voltage characteristic of this network is used to control the rise time of the switching voltage.

The above-mentioned and other objects and features of this invention and the manner of attaining them will become more apparent, and the invention itself will be best understood by reference to the following description of embodiments of the invention taken in conjunction with the accompanying drawings comprising FIGS. 1 to 45, wherein.

Figure 5:
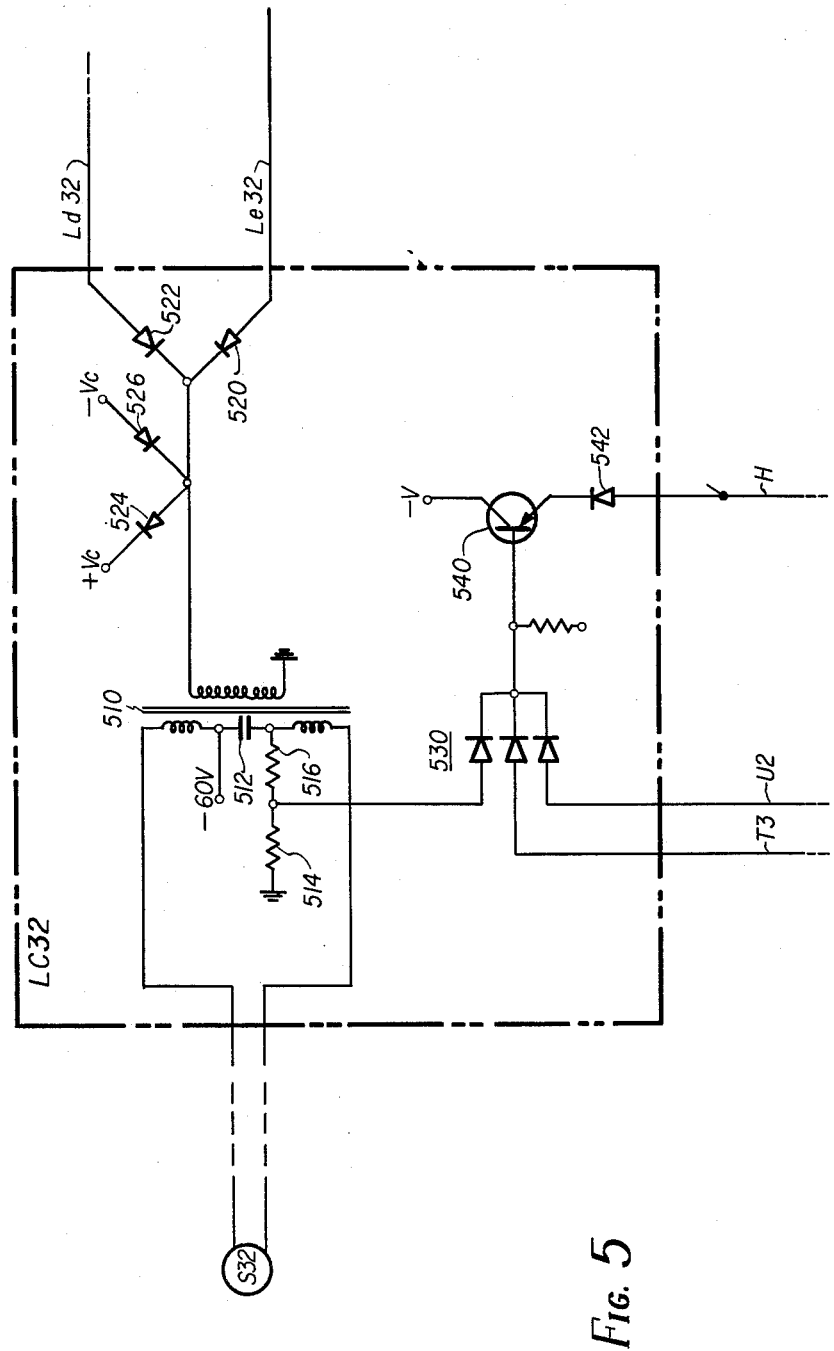
FIG. 5 is a schematic diagram of a line circuit.
Figure 6:
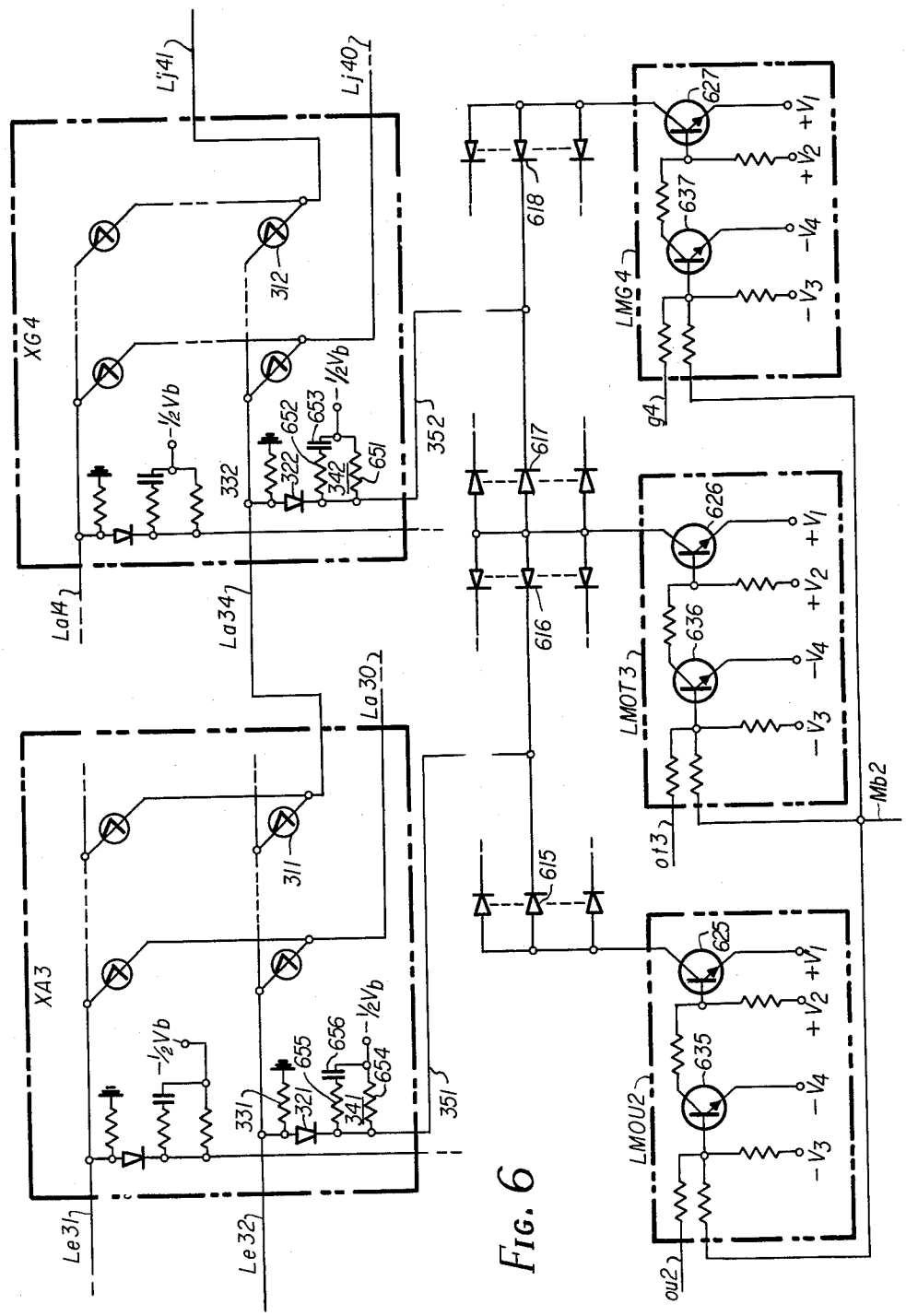
FIG. 6 is a schematic diagram of a portion of a switching network.
Figure 7:
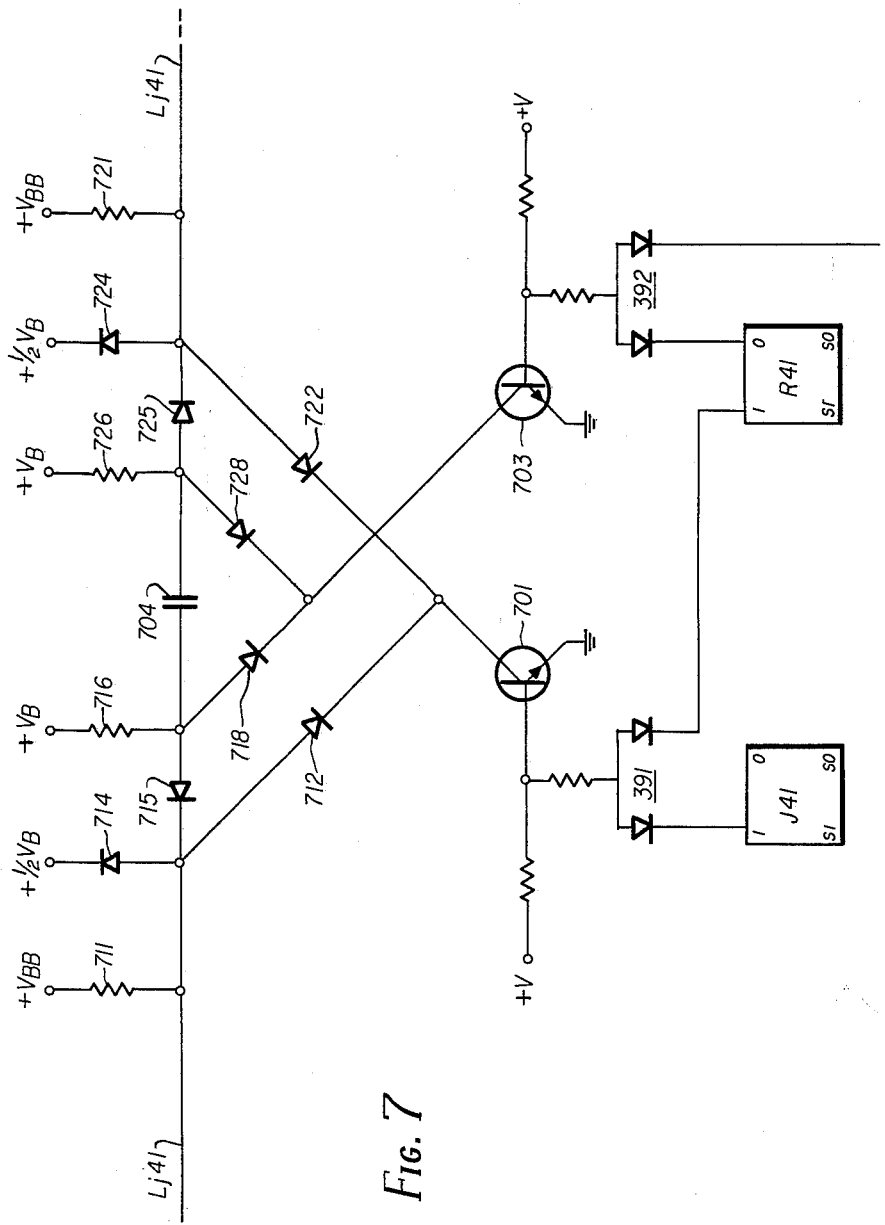
FIG. 7 is a schematic diagram of one of the junctors in the switching network.
Figure 18:
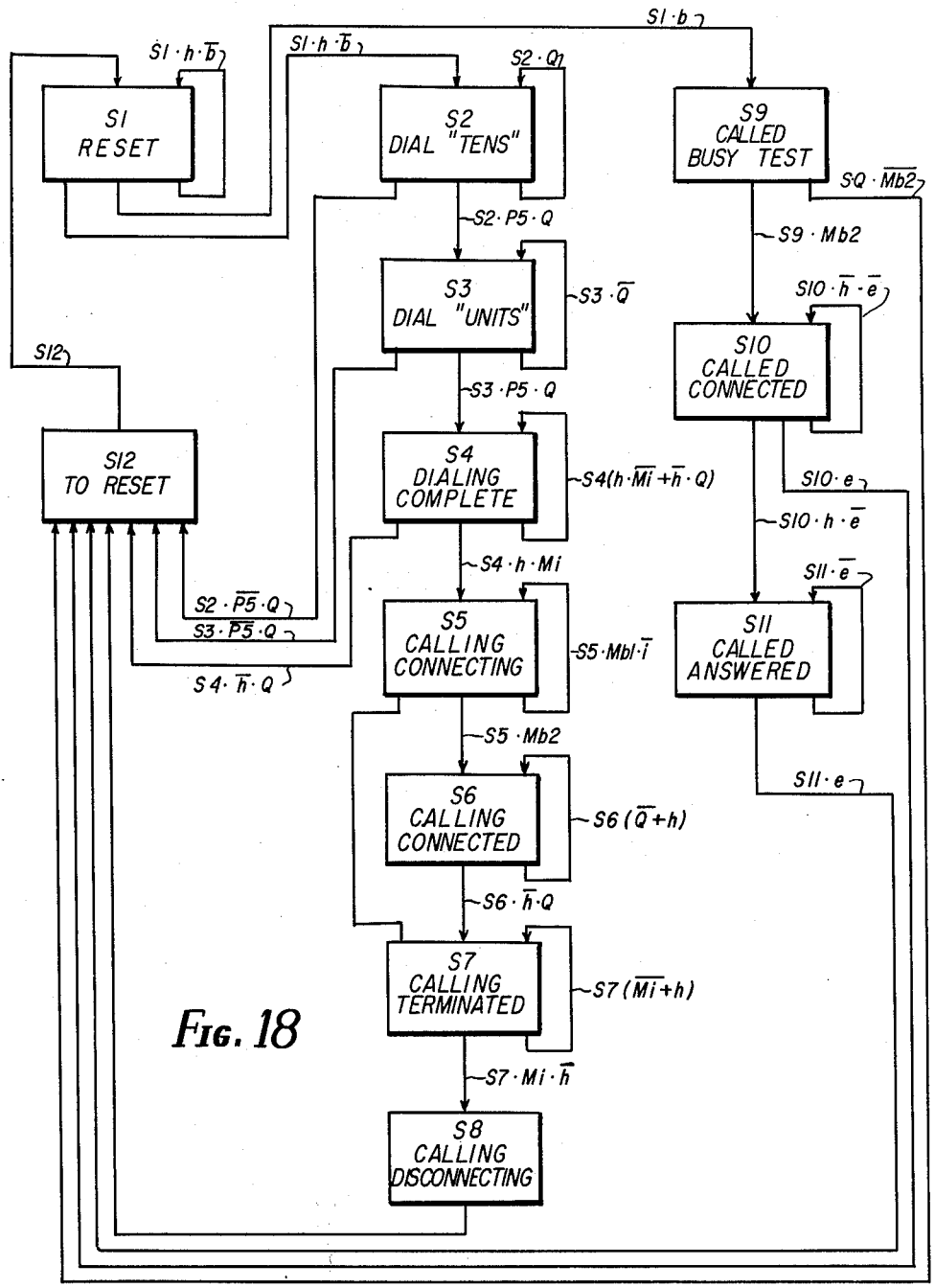
Figure 19:
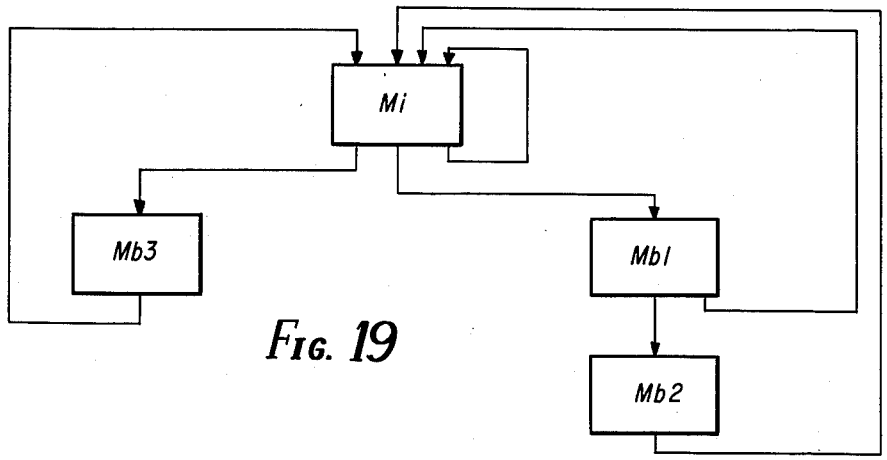
Figure 20:
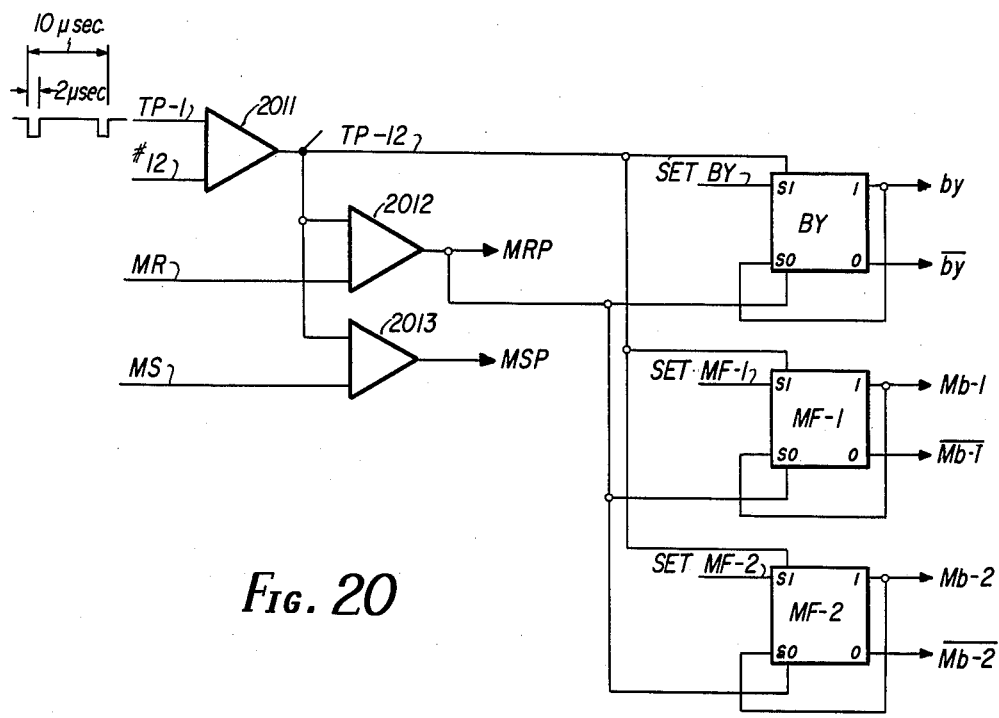
Figure 21:
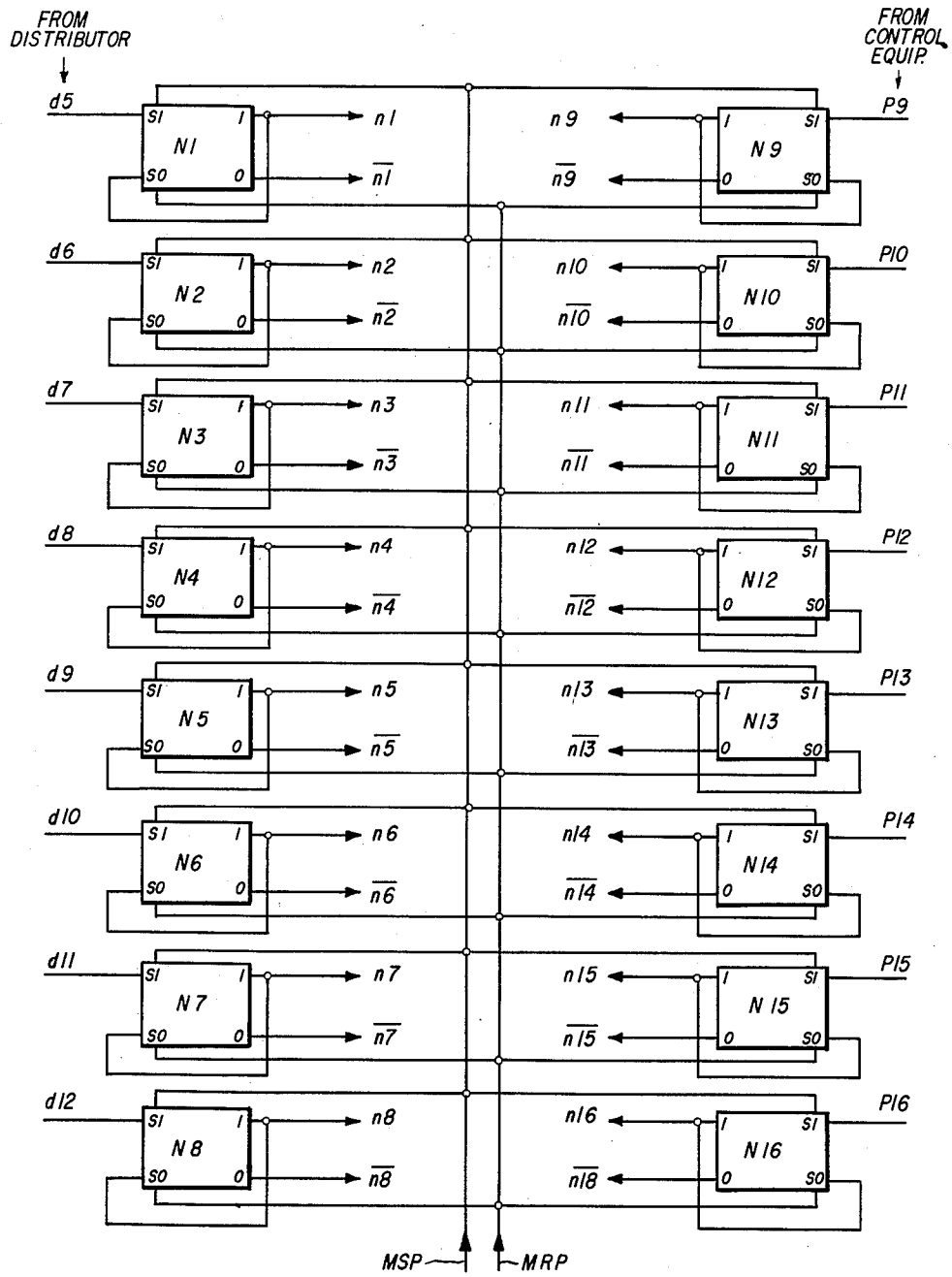
Figure 22:
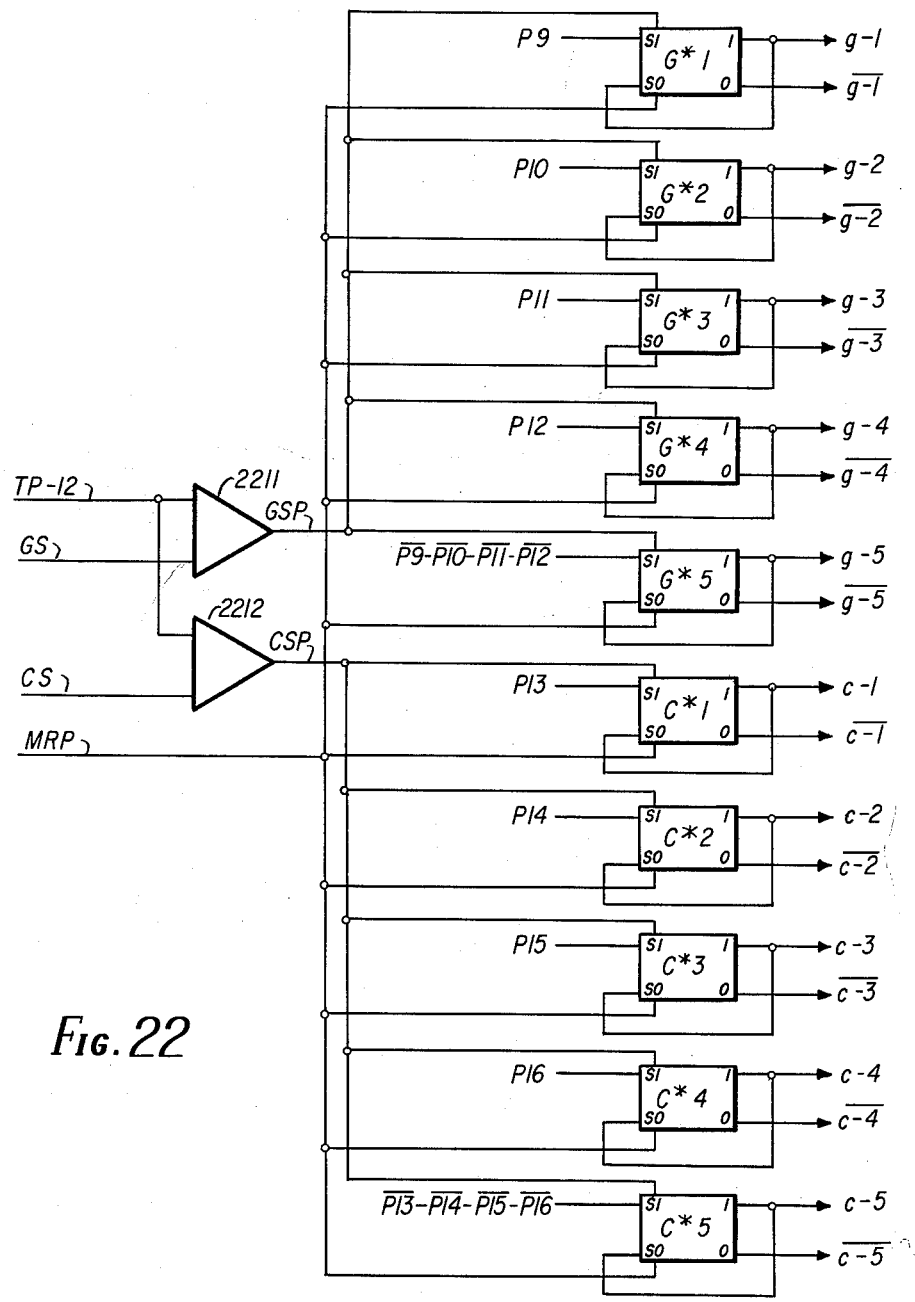
Figure 23:
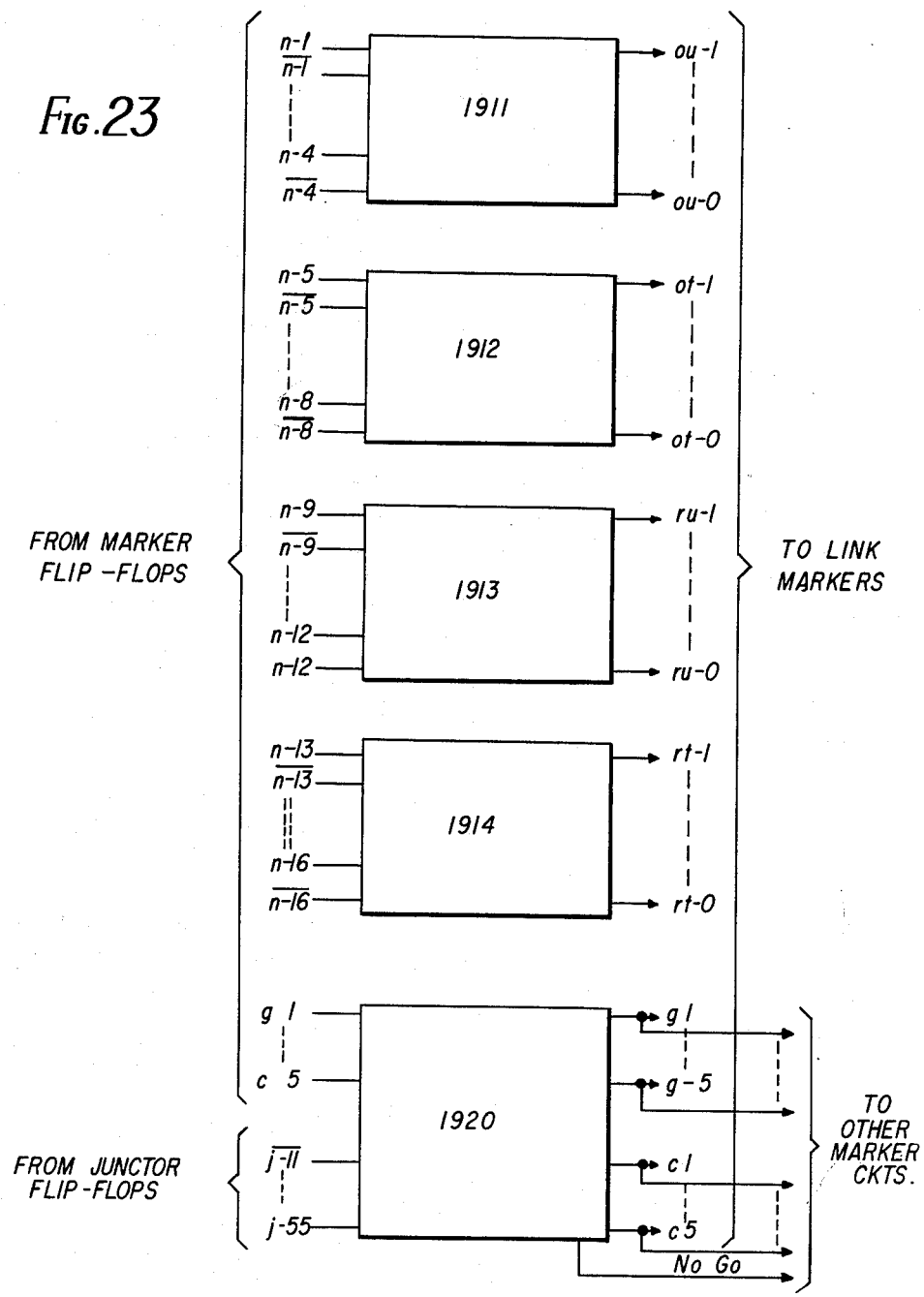
Figure 24:
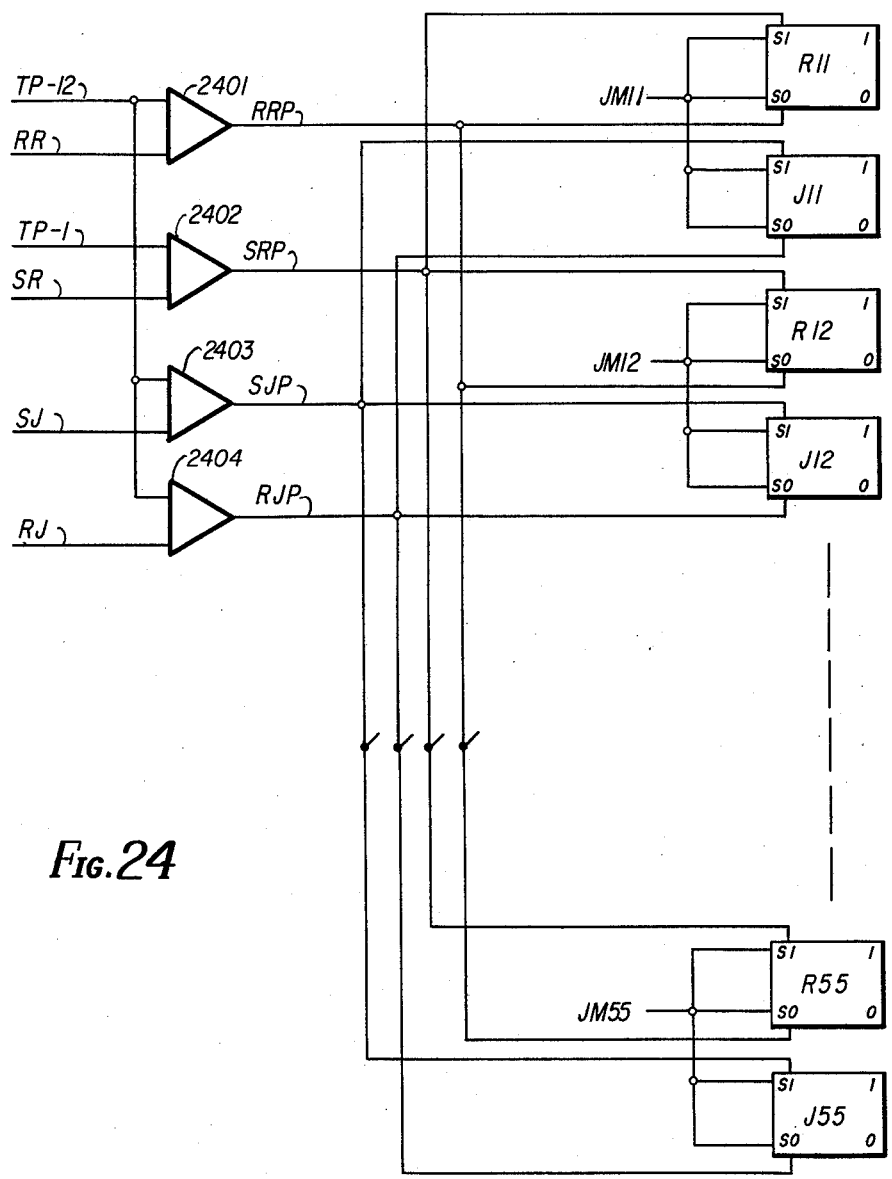

FIGS. 14 to 17 inclusive, are schematic diagrams of various units in the memory;

FIG. 18 is a flow diagram of the sequence states of a line;

FIG. 19 is a flow diagram showing the marker states;

FIGS. 20, 21 and 22 are functional block diagrams showing the control of the various flip-flops in the marker, and the output signals obtained therefrom;

FIG. 23 is a block diagram of various logic circuits in the marker;

FIG. 24 is a functional block diagram showing the control of the junctor flip-flops;

FIGS. 25 to 29 inclusive, are graphs used in explaining the system;

FIGS. 30 to 43 inclusive, when arranged as shown in FIG. 45, comprise a functional block diagram of the control unit and marker of an alternative embodiment;

FIG. 44 is a diagram showing how FIGS. 5, 6 and 7 may be arranged together; and

FIG. 45 is a diagram showing how FIGS. 30 through 43 inclusive are to be arranged.

The system will be described in accordance with the following outline:
A. General Description
  A1. Component Elements
B. Line Circuits and Loop Supervision
C. The Crosspoint Switching Network
  C1. Network Configuration
  C2. Network Control Equipment
  C3. Establishing, Maintaining and Terminating a Connection
  C4. Details of Crosspoint Switching Network
D. Distributor
E. Control Equipment Shared on Time Division Multiplex Basis
  E1. Memory Details
  E2. Organization of Memory and Control
    E2a. Sequence Circuits
    E2b. Line Supervision
  E2c. Timer
    E2d. Number and Route Register
  E3. Logic for Control Unit
    E3a. Subscriber State Sequences
    E3b. Command for the Timer
    E3c. Commands for Registers P9–P12 and P13–P16
F. Marker
  F1. Marker State Sequences and Indications
  F2. Marker Memory
  F3. Parity Signals
  F4. Marker Busy Test
  F5. Disconnect Called Party Identification Signal
  F6. Group and Choice Registers
  F7. Pathfinder
  F8. Connection Impossible Signal
  F9. Commands to Link Markers
  F10. Commands to Junctor Flip-Flops
G. Sequence for Establishing Connection
H. Alternative Embodiment

A. GENERAL DESCRIPTION

Figure 1:
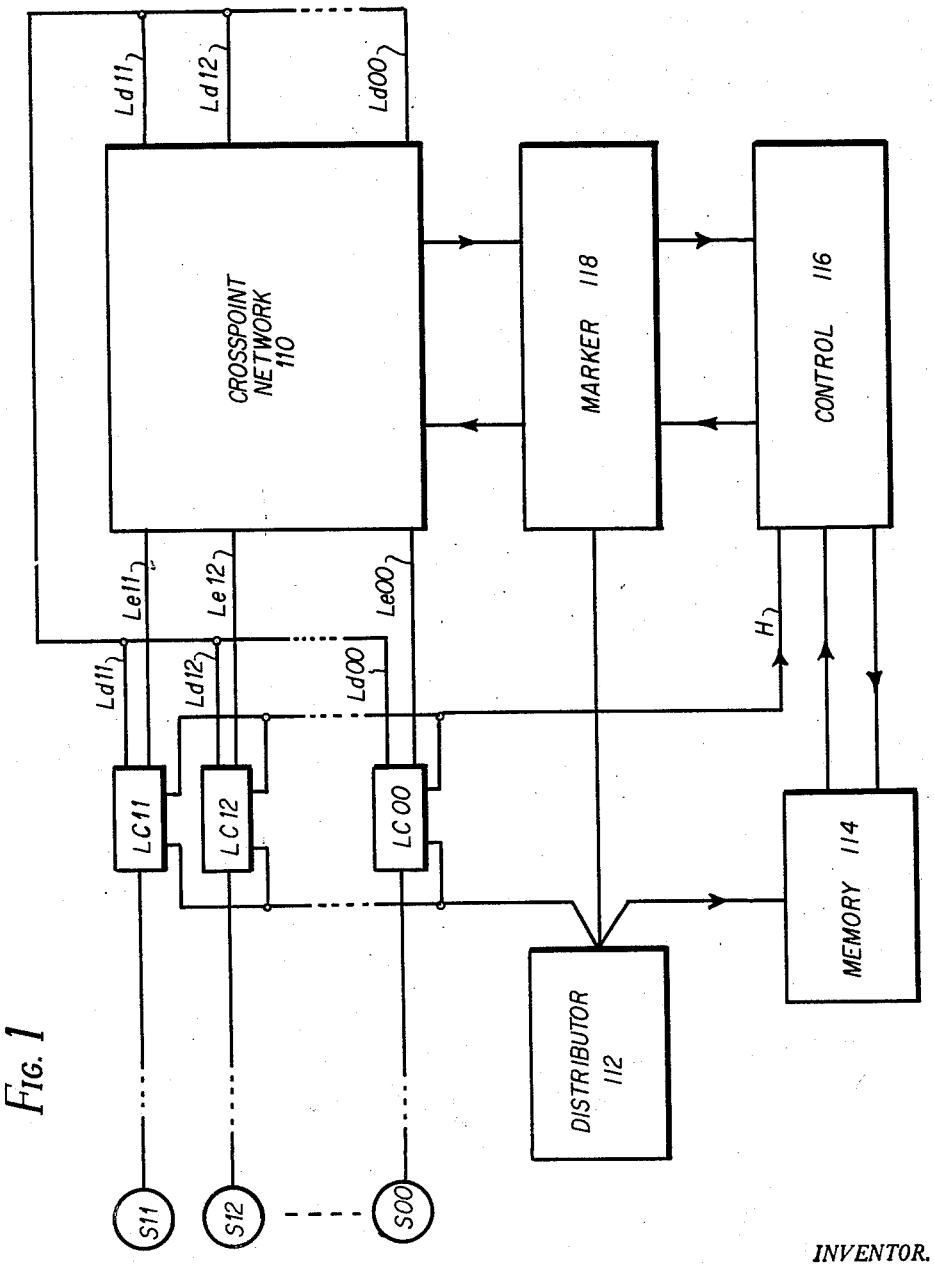
FIG. 1 is a block diagram of the entire system.

It has been chosen to describe the invention as embodied in a 100-line private automatic exchange, as shown in FIG. 1 by a block diagram. The system comprises 100 line circuits LC11 to LC00 having respective subscriber stations S11 to S00, a crosspoint switching network 110, a distributor 112, a memory 114, a control unit 116, and a marker 118.

The crosspoint network 110 consists of a four-stage crosspoint array between the originating links $Le11$–$Le00$ on the left side and the terminating links $Ld11$–$Ld00$ on the right side. This network includes 25 junctors, to provide a maximum of 25 connections. It also includes equipment for establishing and breaking down connections under command of the marker 118.

Each of the line circuits includes equipment for providing a speech path between the subscriber's line and either an originating link $Le$ or a terminating link $Ld$ to the crosspoint network 110, and equipment for supplying hookswitch supervision signals to a common highway H.

The distributor 112 supplies the control pulses required for time division multiplex sharing of the control equipment. These are supplied to the line circuits, the memory 114 and the marker 118.

The temporary storage required for the time division multiplex sharing is provided by the memory 114. For each of the 100 lines, there are sixteen individual ferrite cores in the memory, making a total of 1600 cores. This may be considered as being 100 words, each word associated with a line circuit, and each word consisting of 16 binary digits (bits).

The control unit 116 includes 16 flip-flops associated respectively with the 16 bits of the memory 114, and one flip-flop associated with the multiplex highway H from the line circuits. It also includes logic circuits for controlling the input and recirculation of information to the memory. Each line has the use of the equipment 116 for one out of 100 time positions in each multiplex cycle. Four of the memory bits in memory 114 along with the associated flip-flops and logic circuits in unit 116 form a sequence circuit for registering the various states of the line circuits such as initiation of a call, the various stages of dialling, conversation and disconnect for a calling line; signalling, conversation and disconnect for a called line; and a state for idle lines. Line supervision is supplied by the flip-flop associated with the highway H to detect the present open or closed loop condition of the line, along with one of the memory bits and its associated flip-flop and logic circuits for registering the condition the line loop had in the last cycle. A timer comprising three of the memory bits along with the associated flip-flops and logic circuits registers the elapsed time since the last change of condition of the line loop. The other eight memory bits along with their flip-flops and logic circuits form two registers of four bits each, which during dialling receive and store the designation of the called line, and during conversation store the crosspoint routing of the call.

The marker 118 is used for establishing and breaking down connections in the crosspoint network 110, on a one-at-a-time basis. After a number has been completely dialled, a calling line transmits a request signal to the marker, during the calling line time position of each cycle. If the marker is idle (indicated by a signal M$bi$), it is seized by the calling line. Then during the 100 time positions of a complete multiplex cycle the marker is in a state designated as M$b$1, and through the medium of the logic circuits in the control unit 116, it examines the information stored in the memory 114 for each line. Based on this information it determines if the called line is busy or idle and selects the crosspoint elements to be used in the network 110. Then if the called line is idle and a path is available in the network 110, the marker moves to a state designated as M$b$2, and is held by the calling line for another full cycle of 100 time positions to establish the connection and to record the routing in the memory 114 for both the calling and the called lines. After the parties have hung up a disconnect signal is transmitted to the marker during the calling line's time position which causes the marker to be seized for one full cycle (designated by M$b$3), to break down the connection corresponding to the routing recorded in the memory for both the calling and the called lines.

A1. Component Elements

In various parts of the system flip-flops are used as registers. Each of these flip-flops includes two transistors in a bistable circuit configuration. Each flip-flop has four input terminals and two output terminals. The input terminals are in two pairs, S1 and S0, each pair comprising a direct-coupled and a capacitively-coupled input circuit. To set a flip-flop to state 1 requires coincidence of a signal on the D.C. input and a trigger pulse on the capacitively-coupled input at S1; and in like manner to reset it to state 0 requires coincidence of a D.C. input and a trigger pulse at S0.

Gated pulse amplifiers are transistor circuits having a direct-coupled gating input terminal and a capacitively-coupled trigger-pulse input terminal. When the two inputs coincide, an output pulse is produced. A typical circuit is shown by R. K. Richards in "Digital Computer Components and Circuits" (D. Van Nostrand Company, Inc., 1957) at page 176.

The logical circuits use NOR gates, each of which is a one-transistor logical element whose output is an AND function of the negations of its inputs. The inputs are coupled through individual resistors to the base electrode, and the output is taken from the collector electrode. A NOR gate having all of its inputs false produces a true output signal; and if any one of the inputs is true, the output is false. Throughout the system a true signal condition indicated by a negative potential, and a false condition by ground.

The four-layer diodes in the switching network are of the general type discussed in an article on "P-N-P-N Transistor Switches" by Macrander, Prescher and Wedmore in The Proceedings of the I.R.E., September 1956, vol. 44, pages 1174–1182.

B. LINE CIRCUITS AND LOOP SUPERVISION

The 100-line circuits are all similar. Line circuit LC32 for subscriber 32 is shown in FIG. 5. For voice frequency connections, the subscriber's line is coupled by transformer 510 to two places in the crosspoint network. The primary of transformer 510 is split to supply direct-current feed over the subscriber's line; and the two halves of this primary winding are coupled by a capacitor 512 for voice frequency. The secondary winding is grounded to provide a single wire (common ground) circuit in the crosspoint network. The other side of the secondary winding is connected through diode 520 to the calling side link L$e$32 and through diode 522 to the called side ling L$d$32. Diodes 524 and 526 provide clamping to prevent false firing or extinguishing of the crosspoint elements.

Resistors 514 and 516 provide for loop detection of the hookswitch supervision signal, the junction point of these two resistors being connected to one of the inputs of the three-diode AND gate 530. The other two inputs of this AND gate are connected to the tens and units leads from the distributor, which for this line circuit are T3 and U2.

The output from AND gate 530 is coupled through an emitter-follower transistor amplifier 540 and a diode 542 to the common highway H. Thus during this subscriber's time slot when signals appear on the leads T3 and U2 in coincidence and the subscriber's line loop is closed, a signal appears on highway H. Thus it may be seen that on highway H pulses will appear in the time slots corresponding to the subscribers which have closed line loops. The signals of the highway H form one of the principal sources of information for the control equipment.

C. THE CROSSPOINT SWITCHING NETWORK

C1. Network Configuration

Figure 2:
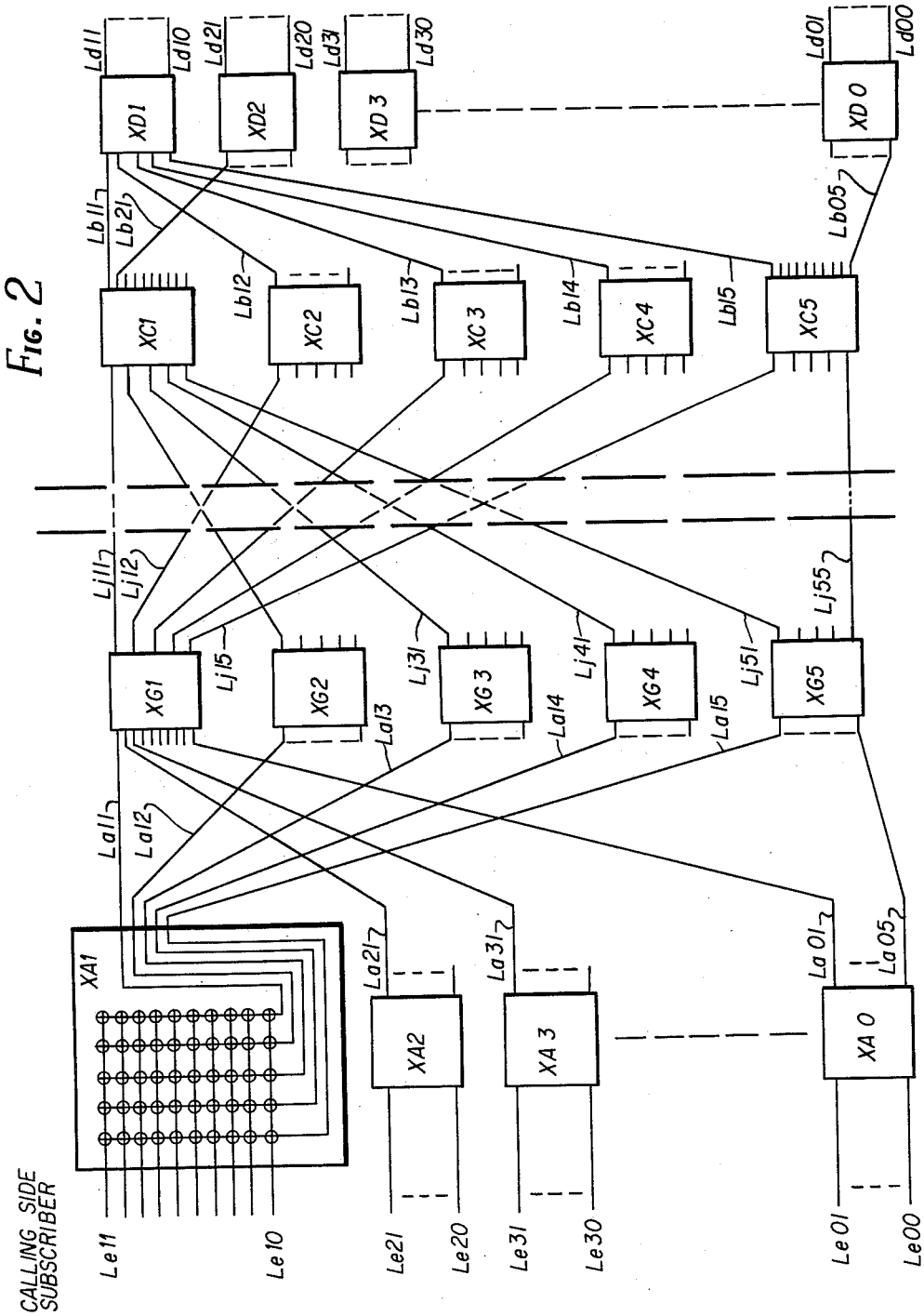
FIG. 2 is a block diagram of the crosspoint switching network.

The crosspoint switching network 110 is shown in FIG. 2. The network consists of a number of crosspoint matrix switches interconnected by links. The line circuit of each of the 100 subscribers is connected to two sides of the network by means of one L$e$ link and one L$d$ link. The L$d$ and L$e$ links bear a two-digit identification number corresponding to the identification number of the subscribers. Subscribers 11–10 are connected on the left-hand (calling) side of the network to crosspoint switch XA–1, and on the right hand (called) side of the network to switch XD–1; subscribers 21–20 are connected to switches XA–2 and XD–2, and in general each subscriber is connected to the XA and the XD switch having the identification number corresponding to the tens identification (first digit) of the subscriber. A voice frequency connection between a pair of subscribers always runs from the calling subscriber's line circuit over an L$e$ link, an XA switch, an L$a$ link, an XG switch, L$j$ link, an XC switch, an L$b$ link, an XD switch, and an L$d$ link to the called subscriber's line circuit. The switching network is shown to consist of ten XA switches XA1–XA0, five XG switches XG1–XG5, five XC switches XC1–XC5 and ten XD switches XD1–XD0. Junctor units, not shown in FIG. 2, are included in the L$j$ links. The network shows a mirror symmetry with respect to these junctors. In the following the side of a switch closest to the junctors will be identified as the "output" side, and the side furthest from the junctors as the "input" side.

One output of every XA switch is linked (L$a$ links) to an input of each of the five XG switches. Therefore, each XA switch has five outputs. Since there are ten XA switches (one for each tens group of subscribers), every XA switch has ten inputs. Since the ten subscribers of a certain tens group are connected to one XA switch, the number of inputs of the XA switches equals ten. Each XG switch is linked by one L$j$ link to every one of the five XC switches. Therefore, an XG switch has five outputs. Because of the mirror-symmetry XA and XD switches have the same number of inputs and of outputs, XG and XC switches have also the same number of inputs and of outputs. Consequently, all switches are of the 10 (inputs) x 5 (outputs) type, and therefore contain 50 crosspoint elements. The total number of crosspoint elements is therefore 30×50=1500.

The L$d$ and L$e$ links are designated with a two-digit number corresponding to the subscriber's number; the L$a$ links by a first digit corresponding to the number of the XA switch and a second digit corresponding to the number of the XG switch on which the link terminates; the L$j$ links by a first digit corresponding to the number of the XG switch and a second digit corresponding to the number of the XC switch; the L$b$ links by a first digit corresponding to the number of the XD switch and a second digit corresponding to the number of the XC switch.

For example, a connection between a calling party at station S32 and a called party at station S68 runs over switches XA3 and XD6. When the pathfinder in the marker selects the routing of this call via switches XG4 and XC1, the links used for this connection are: L$e$32, L$a$34, L$j$41, L$b$61, and L$d$68. The elements of this typical path in the switching network are shown in FIG. 3.

C2. Network Control Equipment

Figure 3:
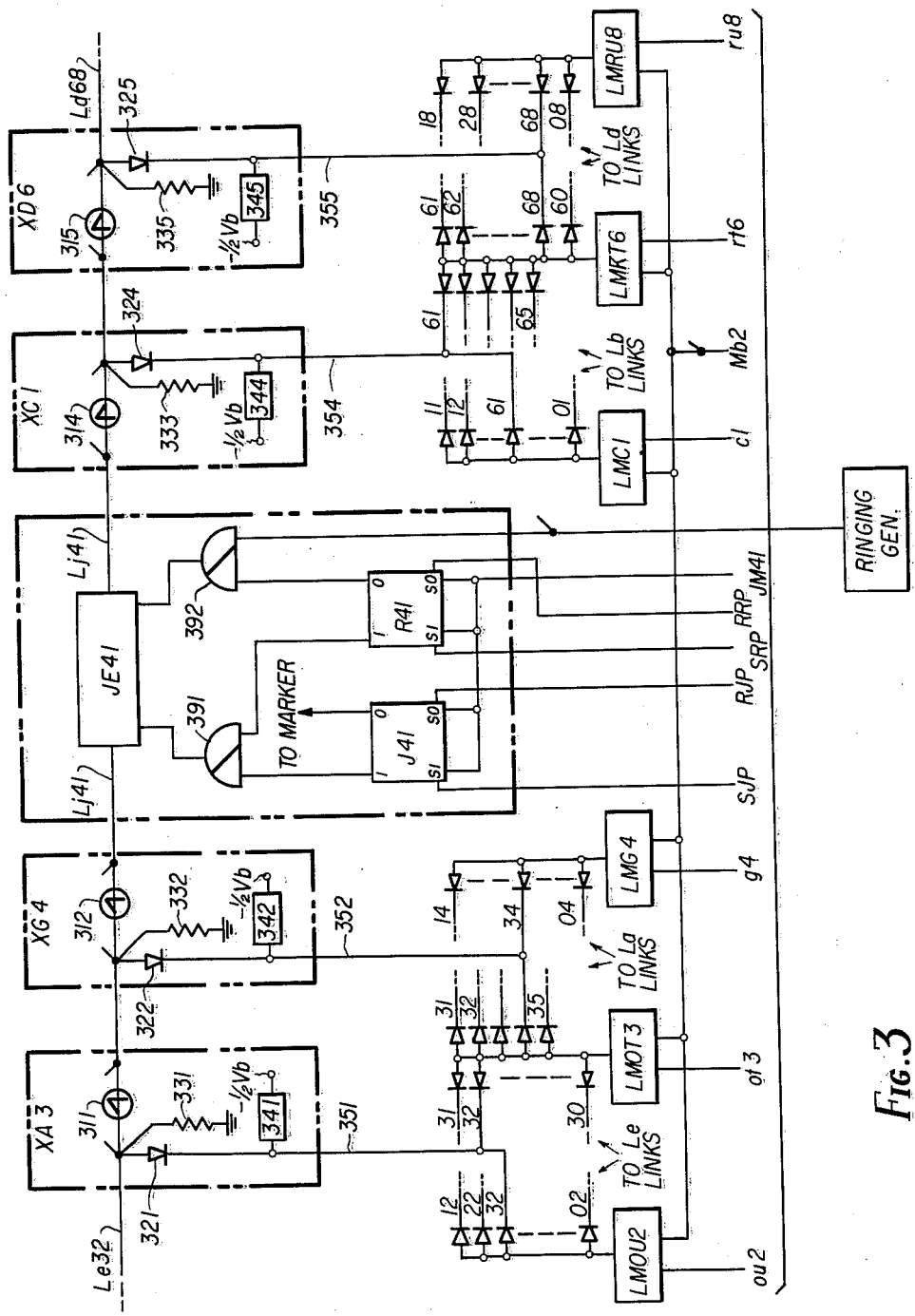
FIG. 3 is a symbolic and functional block diagram of a typical connection to the crosspoint switching network.

In addition to the switching matrices XA, XG, XC, and XD the switching network contains a number of network control units, as shown in FIG. 3. These units are used to establish, maintain and terminate the voice-frequency connections between pairs of subscribers by firing, maintaining and extinguishing appropriate sets of crosspoint elements in the switching network. To this end the network control units receive commands from the marker and from the control logic.

The network control units comprise link-markers (LM), which are used only during the connecting cycle (M$b$2) of the marker, to mark a path to be established; and junctor equipments (JE) which are used to initiate, maintain and terminate a connection. Each of the 25 junctor links L$j$ contains a junctor equipment (JE) and an associated "R" and "J" flip-flop.

There are six groups of link-markers for marking the originating tens, originating units, group, choice, receiving tens, and receiving units; and there are six corresponding groups of output leads from the marker 118 for activating the link-markers. As shown in FIG. 3, link-marker LMOU2 has its output coupled through individual diodes to mark the ten links L$e$12–L$e$02 having units digit 2, link-marker LMOT3 through individual diodes marks the ten links L$e$31–L$e$30 and the five links L$a$31–L$a$35 having tens digit 3, link-marker LMG4 through individual diodes marks the ten links L$a$14–L$a$04 having the group designation 4, link-marker LMC1 through individual diodes marks the ten links L$b$11–L$b$01 having choice designation 1, link-marker LMRT6 through individual diodes marks the five links L$b$61–L$b$65 and the ten links L$d$61–L$d$60 having tens digit 6, and link-marker LMRU8 through individual diodes marks the ten links L$d$18–L$d$08 having units digit 8. These link-markers are activated respectively by the signals $ou$2, $ot$3, $g$4, $c$1, $rt$6 and $ru$8 from the marker 118. Each of the designated links requires activation of two link-markers to be effectively marked. Thus link L$e$32 is marked by the activation of both of the link-markers LMOU2 and LMOT3, link L$a$34 by link-markers LMOT3 and LMG4, link L$b$61 by link markers LMC1 and LMRT6, and link L$d$68 by link-markers LMRT6 and LMRU8.

Figure 4:
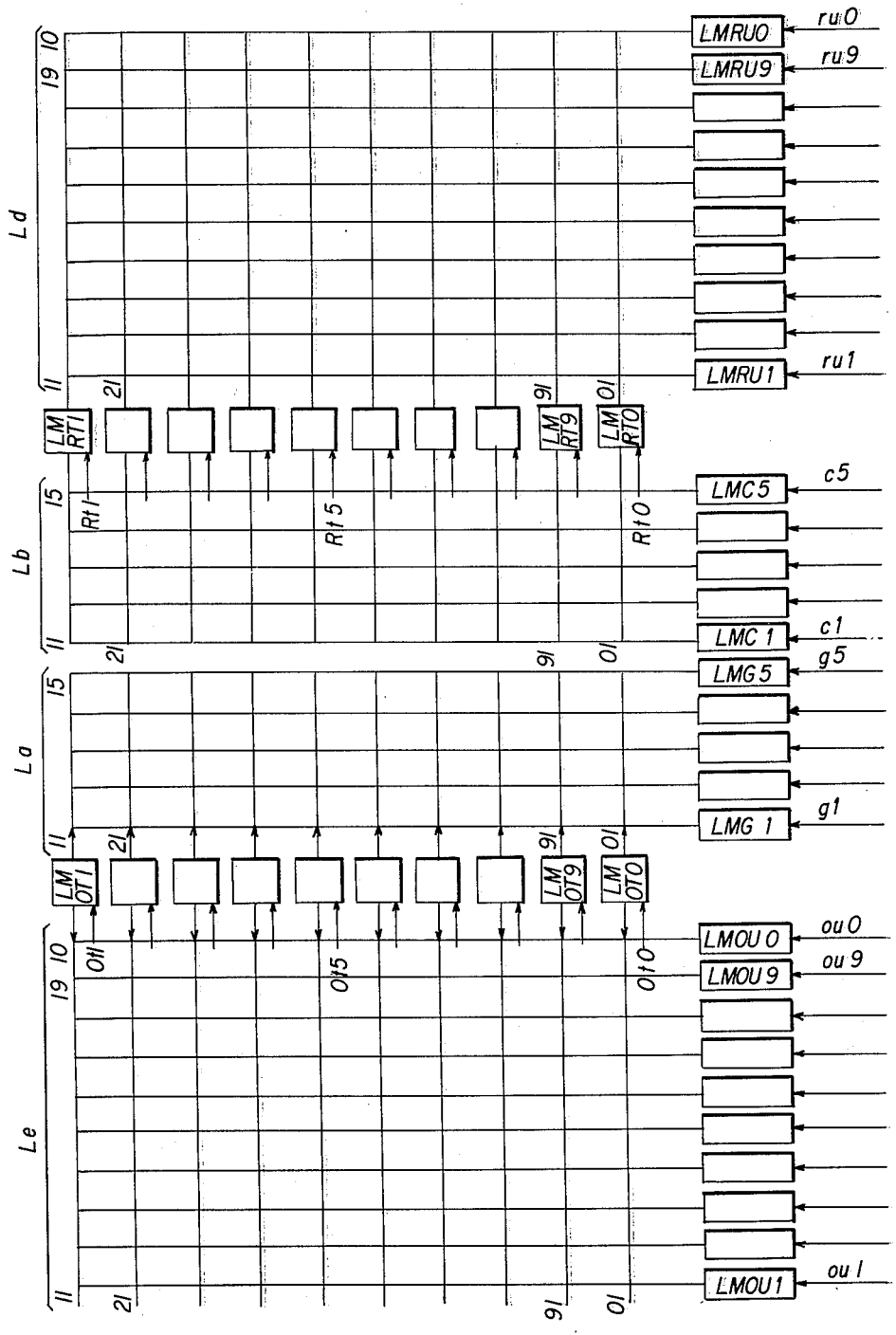
FIG. 4 is a diagram in symbolic matrix form showing how the various links of the switching network are marked.

The designation of which links are marked by which link-markers is shown in symbolic matrix form in FIG. 4. This diagram also shows the input signal lead for each of the link-markers.

C3. Establishing, Maintaining and Terminating a Connection

Establishing a connection is a three-step process involving selection of a route, marking of the links, and firing the crosspoint elements.

Selection of a route is made in the marker during the 16 millisecond cycle the marker is in state M$b$1. When the marker moves from state M$b$1 to state M$b$2, the following information, sufficient to establish the selected connection, is available in the marker: (1) the "tens" identification of the calling party is indicated by a signal on one of the ten "original tens" leads $ot$1–$ot$0 (2) the "units" identification of the calling party is indicated by a signal on one of the ten "originating units" leads $ou$1–$ou$0, (3) the number of the XG switch over which the call is to be routed is indicated by a signal on one of the five "group" leads $g$1–$g$5, (4) the number of the XC switch over which the call is to be routed is indicated by a signal on one of the five "choice" leads $c$1–$c$5, (5) the "tens" identification of the called party is indicated by a signal on one of the ten "receiving tens" leads $rt$1–$rt$0, and (6) the "units" identification of the called party is indicated by a signal on one of the ten "receiving units" leads $ru$1–$ru$0. This information remains available during the full 16 millisecond cycle of the marker state M$b$2.

As an example, consider a connection to be made between a calling party at station S32 and a called party at station S68. The marker shows the following information in marker cycle M$b$2: originating tens $ot$3, originating units $ou$2, receiving tens $rt$6, and receiving units $ru$8, and assuming that the routing of this connection is via XG4 and XC1, the marker also shows group $g$4 and choice $c$1. With the aid of FIG. 2 it can be seen that links L$e$32, L$a$34, L$j$41, L$b$61, and L$d$68 are to be used for this connection. With the aid of FIG. 3, the LM markers to be activated in order to mark the L$e$, L$a$, L$b$, and L$d$ links are LMOU2, LMOT3, LMG4, LMC1, LMRT6, and LMRU8. In other words, the link-markers corresponding to the marker outputs which are "on," should be activated.

Firing the crosspoint elements is the last step in establishing a connection, and it is made at the end of the M$b$2 marker cycle. The end of this cycle is evidenced by the appearance of a signal S5 from the control unit 116, indicating that the distributor is addressing the calling party being served by the marker, which is in its state M$b$2. At this time the junctor corresponding to the selected route is set to busy by commands to the junctor flip-flops. When the junctor goes to busy, the voltage on the links L$j$41 on both sides of the equipment J41 starts to rise toward a given potential. When the junctor potential reaches this value, four-layer diodes 312 and 314 are subjected to the full breakdown voltage (L$a$34 and L$b$61 having been marked) and enter the low-resistance states. Currents now flow through diodes 312 and 314 and the control networks of links L$a$34 and L$b$61. The values of the network components are chosen such that under these conditions the potential of L$a$34 and L$b$61 reaches nearly the given value at the junctor JE41. Consequently, after diodes 312 and 314 have broken down, diodes 311 and 315 are subjected to the full breakdown voltage (L$e$32 and L$d$68 having been marked), and consequently also break down. A short time after this the link-markers are turned off, back-biasing the diodes 321, 322, 324, and 325. The connection has now been established.

When a conversation from calling station S32 to called station S68 is in progress by way of XG4 and XC1, the four-layer diodes 311 in XA3, 312 in XG4, 314 in XC1, and 315 in XD6 are conducting, and the shunt diodes 321, 322, 324, and 325 are back-biased. The junctor JE41 is busy. Referring to FIG. 5, the series diode 520 of line circuit LC32 and a diode of line circuit LC68 corresponding to diode 522, are conducting. In this condition, sustaining currents are flowing from the junctor toward the line equipments of both subscribers. These currents, on which the voice frequency currents are superimposed, keep the four-layer diodes in the conducting state.

This condition is maintained as long as the junctor equipment associated with this particular conversation remains in the busy condition. When the junctor equipment is set to the idle condition, sustaining currents are diverted, the four-layer diodes lose their sustaining currents and revert to the "off" state, terminating the connection.

A junctor equipment such as JE41 is controlled by its two associated flip-flops J41 and R41. The junctor is "busy" when either J41 or R41 or both are in state 1. In addition, when R41 is in state 1 a ringing signal from a common ringing generator is gated onto the connection.

When a connection is established, both J41 and R41 are set to state 1. When the called party answers, R41 is reset to state 0, interrupting the ringing signal. When the calling party signals to be disconnected, both flip-flops J41 and R41 are reset to state 0. It is necessary to provide this extra reset command to the ringing flip-flop R41 since the connection should be terminated even when the called party has not yet answered.

C4. Details of Crosspoint Switching Network

The details of one-half of the connection shown in FIG. 3, from the calling line to the junctor, is shown by FIGS. 6 and 7, which should be arranged along with the line circuit of FIG. 5 as shown by FIG. 44. The path between the junctor and the called line is similar and therefore is not shown in the detailed drawings. The crosspoint matrices and link-markers are shown in FIG. 6, and the junctor is shown in FIG. 7.

In FIG. 6 each of the matrices XA3 and XG has four of its fifty four-layer diode crosspoint elements shown. Each of the incoming (horizontal) links of a matrix is equipped with a leakage resistor and a link-marking network. For example, the link Le32 of matrix XA3 has a leakage resistor 331, and a link-marking network comprising a diode 321, a resistance capacitance network 341 to a potential source −½Vb and a connection over conductor 351 to two diodes 615 and 616 to respective link-marking units.

Each of the link-marker units such as LMOU2, LMOT3, and LMG4 acts as a normally closed switch which may be opened by coincidence of two input signals. For example, link-marker LMOT3 comprises an output transistor 626 which is controlled by an input transistor 636, which in turn is controlled by input signals on leads ot3 and Mb2. When the link-marker is in its normal "off" condition, both transistors 626 and 636 are in saturation. Therefore the output transistor 626 has a very low resistance path from its collector electrode to its emitter electrode and the collector electrode is at substantially the emitter potential of +V1. Each of the input signals through the link-marker can have either of two values, an off-value of 0 or an on-value of −V volts. These input signals are supplied through respective individual resistors. The value of these resistors, along with the values of −V3 and −V4, are so chosen that the transistor 636 is saturated except when the two input signals are both at value of −V at the same time. The collector of transistor 626 is connected through ten diodes and resistors of Le links to the potential source −½Vb, and through five diodes and resistors of La links to the same potential source −½Vb. In the drawing the connection through diode 616 and a resistor of network 341 is shown for link Le31 and the connection through diode 617 and the resistor of network 342 is shown for link La34. The connection to fifteen links is the maximum number of any one link-marker unit. The circuit is designed so that the output transistor of each link-marker draws sufficient forward base current to keep it saturated when its collector is loaded with this number of resistors to the source −½Vb.

In the junctor equipment (FIG. 7) the transistor 701 is normally conducting and drawing current through diode 712 and resistor 711, and also through diode 722 and resistor 721 from the source +Vbb therefore the junctor link Lj41 is shunted to ground at both sides of the junctor equipment. Whenever either the junctor flip-flop J41 or the ringing flip-flop F41 is set and supplies an "on" signal, which has a negative value, through gate 391, the transistor 701 becomes cut-off. Current then flows from the source Vbb through resistors 711 and 721 to the crosspoint networks to fire and sustain a connection. The diodes 714 and 724 act as clamps to limit the maximum potential on the link Lj41 to the value of +½Vb to prevent false breakdowns of crosspoint elements.

Diodes 715 and 725 and resistors 716 and 726 serve to isolate the two halves of the connection for a large signal. In the normal talking condition diodes 715 and 725 carry about 3 milliamperes each and therefore can accommodate audio currents up to that valve. When establishing a connection, however, the voltage on link Lj41 can drop to a negative value after a crosspoint fires. Without the diodes 715 and 725 this drop, occurring on oneside of the junctor, would be transmitted by condenser 704 to the other side of the junctor, thereby extinguishing a crosspoint that has just fired. Insertion of the diodes 715 and 725 presents this undesirable phenomenon. A sudden voltage drop on the left-hand side of the junctor will propagate through the left-hand diode 715 and the condenser 704 but will be blocked by the right-hand diode 725.

Transistor 703 is for ringing control. One of its inputs through gate 392 is from a common ringing generator and the other input is from the ringing flip-flop R41. Normally the flip-flop is in reset condition, with its zero output on, at a negative value, maintaining the transistor 703 cut-off. When the ringing flip-flop is set and its zero output is at ground, the signal from the common ringing generator applied through gate 392 controls the transistor 703. The common ringing generator generates a square wave ringing signal between ground and −V volts. During the interval that this signal is at ground, the signal from the flip-flop also being at ground, the transistor 703 is turned on drawing current through diodes 718 and 728 and resistors 716 and 726 from the source +Vbb. The periodic changes in current are transmitted through the crosspoint elements to both the called and the calling subscribers subsets where they are converted to ringing and ringback tone.

Note that the junctor arrangement is such that shunt control rather than series control is used, that is, the transistor 701 is normally conducting when the junctor is idle and shunts the junctor link Lj41 to ground. This arrangement has several advantages. The control signals, for example, are supplied to a point near ground, and therefore may be of low potential. Also, there is the substantially constant load on the principal direct current supply +Vbb, so that clicks are not likely to be heard on other lines of the junctor switches from idle to busy, or vice-versa. The link-markers as in FIG. 6 also use shunt control with the transistor such as transistor 626 in link-marker LMOT3 normally conducting, to give these same advantages.

A problem inherent with the use of the four-layer diodes which are presently commercially available relates to the breakdown voltage characteristic. These devices show a marked decrease in breakdown voltage Vb, when the applied breakdown voltage has a large rate of rise (small rise time). The rated breakdown voltage of these devices is for a very slow rise time. If a fast rise time were to be used, the rate of rise would have to be accurately controlled, and the diodes would have to be individually tested and rated for this particular rise time before they could be used in the system. According to a feature of the invention, the rate of rise of the marking voltages is limited to a suitable slow value to avoid false breakdown. The specific solution shown here includes providing a capacitor in each of the networks for marking the links as shown, for example, in FIG. 6 in network 341 of link Le32 and network 342 of link La34.

Figure 28:
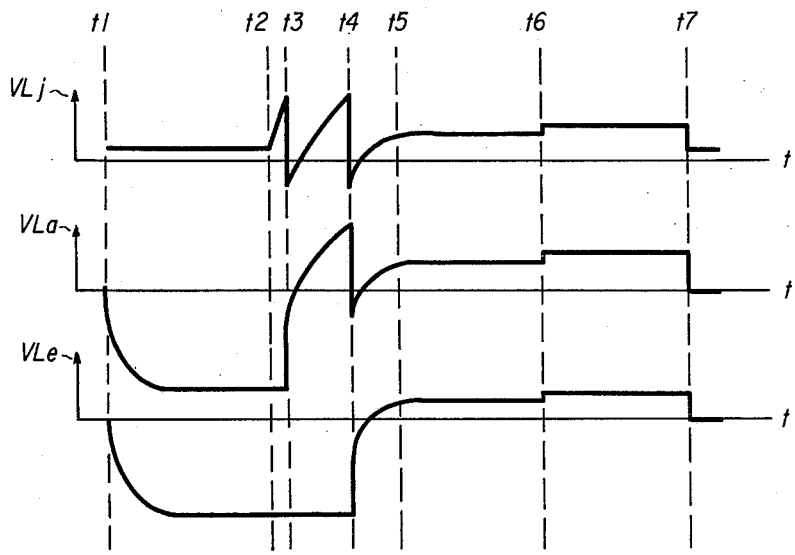

Establishing a connection involves two steps, marking the selected Le, La, Lb, and Ld links and busying the selected junctor. FIG. 28 gives some graphs showing the potentials at different points in the network while a connection is being established. The first curve shows the potential on the Lj link which in the shown connection is link Lj41. The second curve shows the potential on the selected La link which in the shown connection is link La34, and the third curve shows the potential on the Le link which for the shown connection is link Le32.

Initially link-markers LMG4, LMOT3, and LMOU2 are idle with their transistor switches conducting; potentials at conductors 351 and 352 closely approximate +V1.

The value of V1 is sufficiently large to back-bias all diodes such as 615, 616, 617, and 618 in the network.

The potential at the idle links L$e$32 and L$a$34 is close to ground; leakage resistors 331 and 332 take care of the small leakage currents of the idle crosspoint elements connected to these links.

The junctor is idle, transistor switch 701 is closed, and diodes 613 and 623 conduct the currents from $+Vbb$ via resistors 711 and 721. The potential at L$j$41 is close to ground. The condensers 653 and 656 are charged to a potential determined by the current flowing from $+V1$ through transistors 625, 626 and 627, diodes 615, 616, 617, and 618, and the networks 341 and 342 to $-\frac{1}{2}Vb$.

Activation, at time $t1$, (FIG. 28) of the link-markers LMOU2, LMOT3, LMG4, opens transistor switches 625, 626 and 627. Diodes 615, 616, 617, and 618 no longer conduct, and the potential on conductors 351 and 352 immediately drops to a negative value determined by the source $-\frac{1}{2}Vb$ and the stored charge and resistance drops in the networks 341 and 342. This negative potential renders diodes 321 and 322 conductive, and the potential on L$e$32 and L$a$34 follows the potentials of 351 and 352, respectively. The rapid initial drop is limited to tolerable value by proper choice of resistance values in networks 341 and 342, and therefore does not prematurely fire any of the four-layer diodes connected to the links L$e$32 and L$a$34. During the time following $t1$, the capacitors 653 and 656 discharge, and the potentials on links L$a$34 and L$e$32 approach exponentially the value $-\frac{1}{2}Vb$. (The leakage resistors 331 and 332 being of much higher resistance than the series resistors 651 and 654.) The capacitors 653 and 656 restrict the rate of potential drop on links L$a$34 and L$e$32 in order to prevent premature firing of the four-layer diodes mentioned above.

At time $t2$ the junctor is busied. Transistor switch 701 opens and the potential on L$j$41 rapidly rises towards $+\frac{1}{2}Vb$. Of all four-layer diodes connected to L$j$41, only 312 has a marking voltage $-\frac{1}{2}Vb$ on its other terminal, consequently diode 312 fires at time $t3$.

As soon as diode 312 fires, the potentials on L$j$41 and L$a$34 become practically equal (the forward voltage drop of a conducting four-layer diode is less than one volt). The voltage on the condenser 653 cannot change immediately; if the resistor 652 were not present, the voltage on L$a$34 and L$j$41 at time $t3$ would be $-\frac{1}{2}Vb$. Since resistor 652 is in the circuit, however, the initial voltage of L$a$34 and L$j$41 is more positive than $-\frac{1}{2}Vb$. Resistor 711 now charges condenser 653, and the voltage on L$a$34 and L$j$41 increases the rate of rise being limited by condenser 653 to prevent spurious breakdown of other diodes. At times $t4$, the voltage on L$a$34 has reached the value of $+\frac{1}{2}Vb$. Diode 311 is now subjected to the full V$b$ and therefore breaks down. At this moment the voltages on L$e$32, L$a$34, and L$j$41 become practically equal. Because of resistor 655 the voltage at L$a$34 does not drop completely to $-\frac{1}{2}Vb$ at time $t4$. This provides a safety margin against the spurious firing of other diodes at time $t4$.

After time $t4$, condenser 656 is charged via V$bb$, and diodes 311 and 312. When the potential at L$e$32 reaches ground, diode 520 (FIG. 5) conducts and the connection from the subscriber to the junctor is established.

At time $t6$ the link-markers are turned off, so that transistors 625, 626 and 627 conduct. The potential of conductors 351 and 352 rises to $+V1$, this back-biases diodes 321 and 322.

During the time a connection is maintained, a current flows from $+Vbb$ in the junctor, through resistors 711 and 716, four-layer diodes 312 and 311, diode 520, transformer 510 in subscriber's line circuit to ground. This current is sufficiently above the holding currents of the four-layer diodes, which are thus kept in the conducting state. Audio frequency signals are passed from the subscriber's transformer 510 through diodes 520, 311, 312, and 715, condenser 704, and along a similar path to the other subscriber.

A connection is terminated by resetting the junctor associated with that connection to idle. When the junctor is reset, transistor switch 701 closes. Transistor 701 and diodes 721 and 722 now divert the sustaining currents through resistors 711 and 721 from the four-layer diodes, since the sum of forward voltage drops of transistor 701 and diodes 712 and 722 is smaller than the sum of forward voltage drops of diodes 520, 311 and 312. The four-layer diodes, having lost their sustaining current, revert to the high impedance state releasing the connection.

D. DISTRIBUTOR

Figure 25:
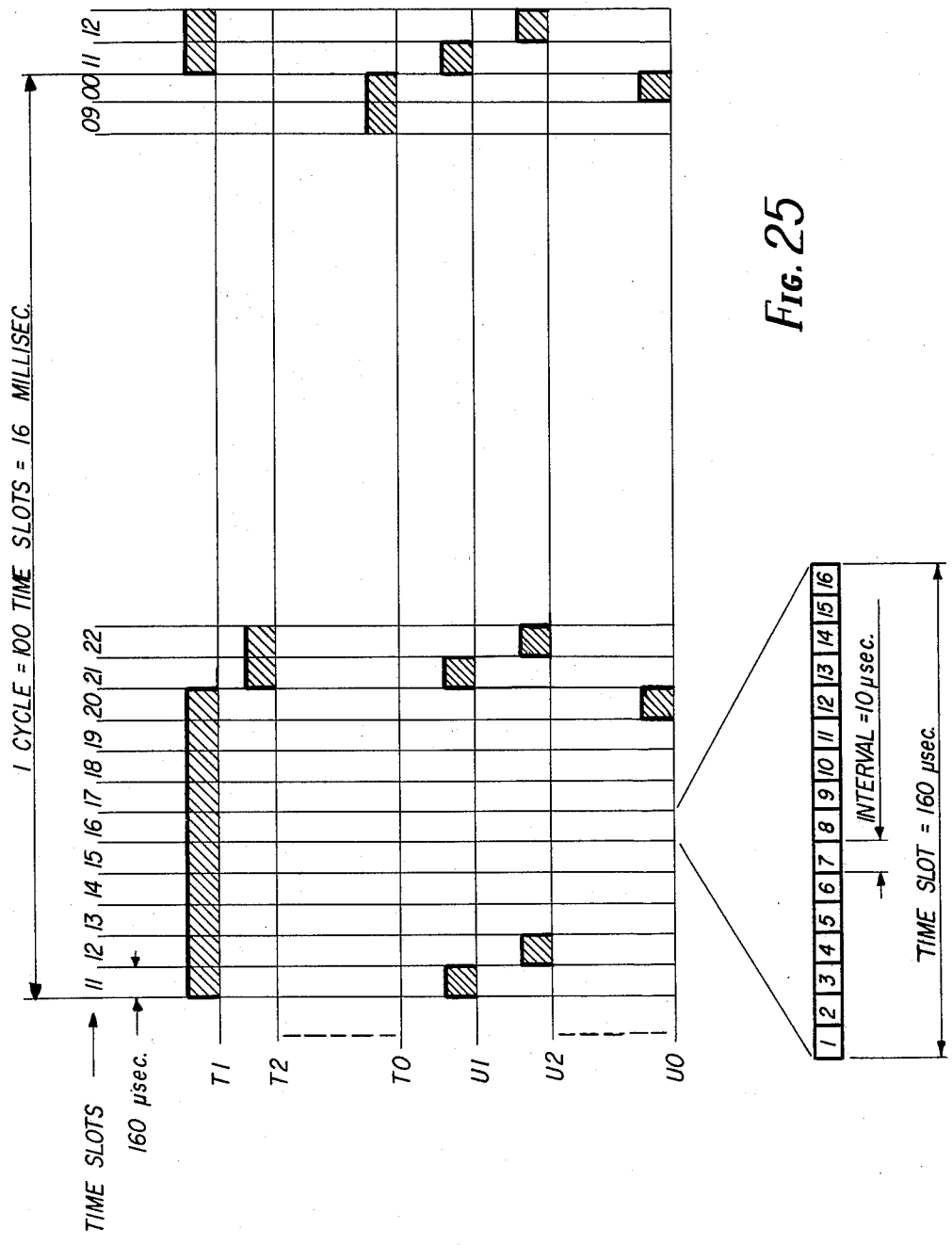

Many of the control actions in this system take place on a time division multiplex basis, allowing the use of one piece of equipment for a number of subscribers. The graph in FIG. 25 shows the multiplexing timing arrangement. Each cycle has a duration of 16 milliseconds, and is divided into 100 time slots, each of which has a duration of 160 microseconds. Each time slot is marked by the coincidence of a tens pulse and a units pulse. Each tens pulse has a duration of ten time slots (1.6 milliseconds) and recurs once per cycle. Each units pulse has a duration of one time slot, and recurs once every 1.6 milliseconds. As shown by the expansion of one of the time slots at the bottom of FIG. 25, each time slot is subdivided into 16 intervals, each of which has a duration of ten microseconds.

Figure 8:
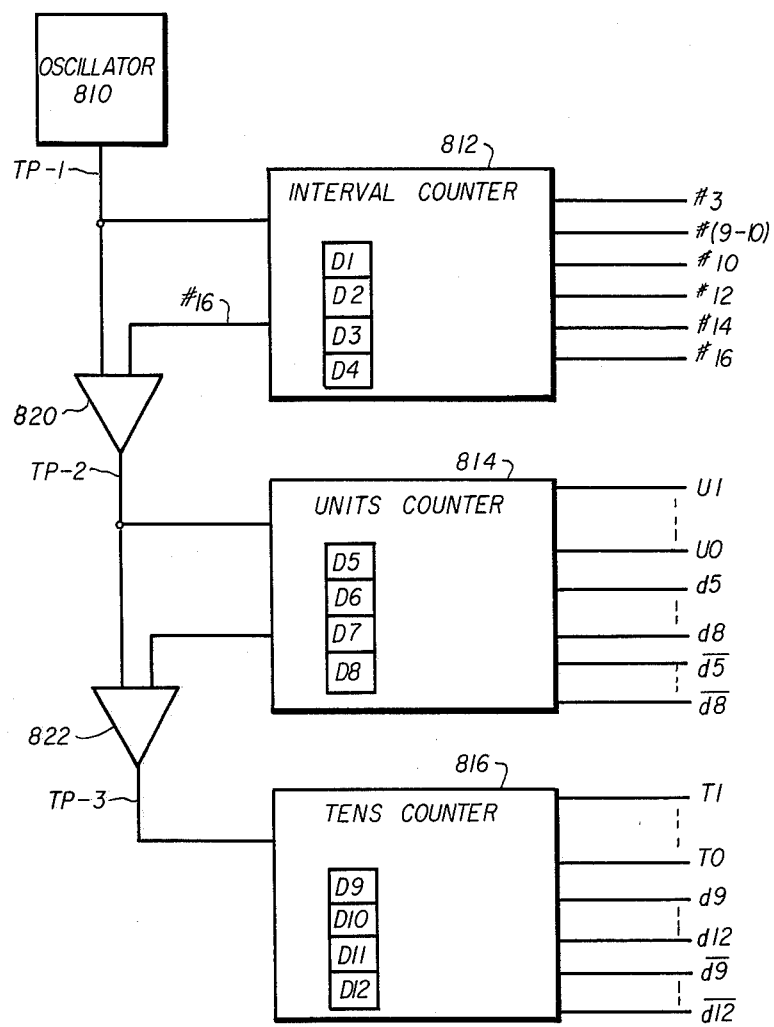
FIG. 8 is a block diagram of the distributor.

The multiplexing pulses are generated by the distributor 112, which is shown by a block diagram in FIG. 8. It comprises an oscillator 810, an interval counter 812, a units counter 814, and a tens counter 816.

Figure 9:
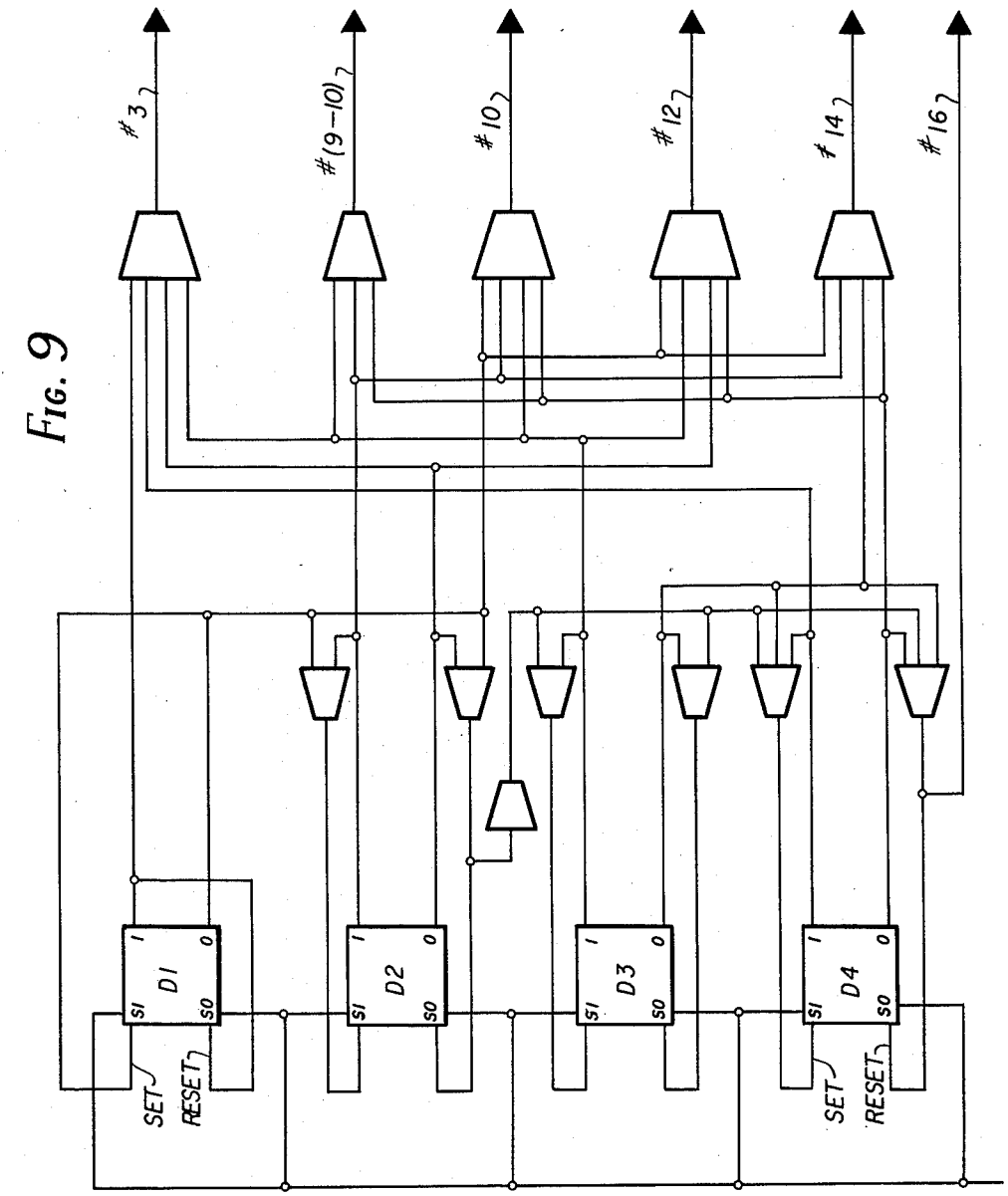
FIG. 9 is a functional block diagram of the interval counter of the distributor.

The oscillator 810 is a free-running multivibrator. It generates a pulse train TP-1 which comprises pulses having a duration of two microseconds and recurring every ten microseconds, as shown by graph A in FIG. 26. The interval counter 812 is a binary counter comprising flip-flops D1–D4 and a group of NOR logic gates, as shown in FIG. 9. It is advanced one step by each pulse of train TP-1, as shown by graph B of FIG. 26. It therefore remains in each state for ten microseconds. Output signals are required only for states #3, #(9+10), #10, #12, #14, and #16. The equations for setting and resetting the flip-flops are as follows:

Set $D1=\overline{d1}$      Reset $D1=d1$.
Set $D2=d1.\overline{d2}$      Reset $D2=d1.d2$.
Set $D3=d1.d2.\overline{d3}$      Reset $D3=d1.d2.d3$.
Set $D4=d1.d2.d3.\overline{d4}$      Reset $D4=d1.d2.d3.d4$ The required outputs are given by the following equations:

$$\#3 = \overline{d1}.d2.\overline{d3}.\overline{d4}$$
$$\#(9+10) = \overline{d2}.\overline{d3}.d4$$
$$\#10 = d1.\overline{d2}.\overline{d3}.d4$$
$$\#12 = d1.d2.\overline{d3}.d4$$
$$\#14 = d1.\overline{d2}.d3.d4$$
$$\#16 = d1.d2.d3.d4$$

Figure 26:
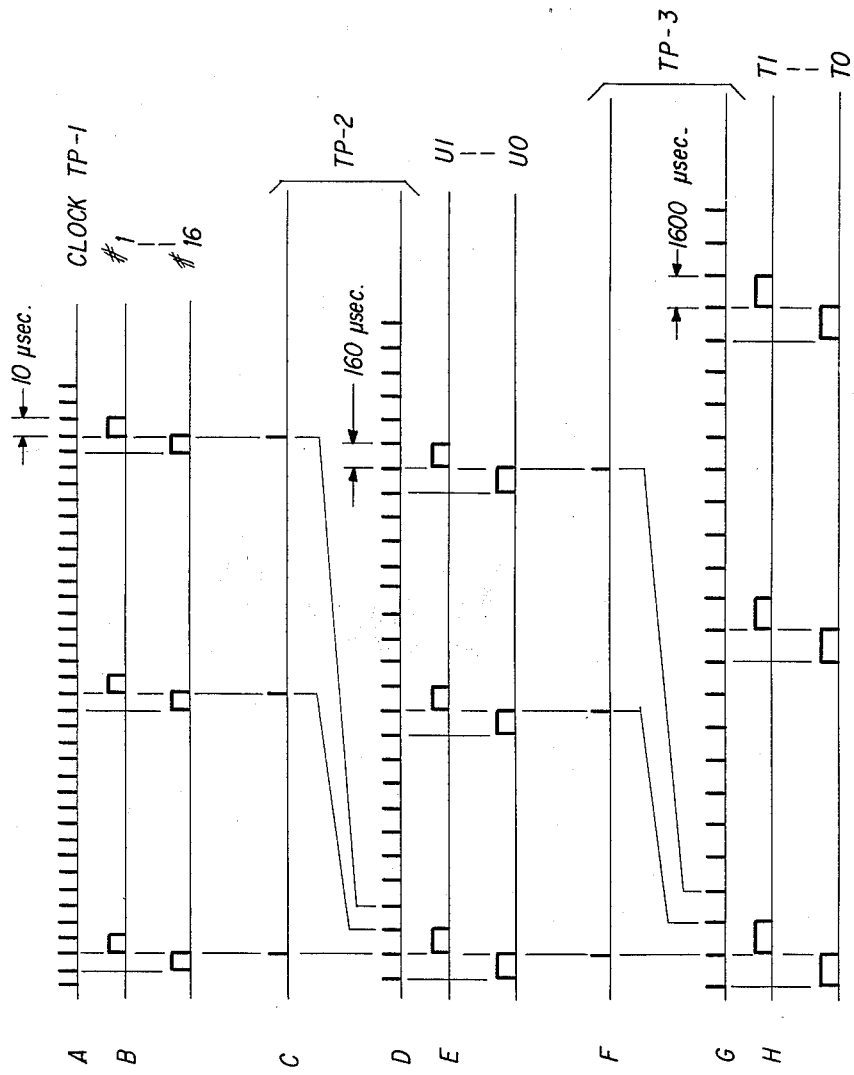

The pulse train TP–1 is gated with the output #16 of the interval counter in a gated pulse amplifier 820, producing an output pulse train TP–2 of two-microsecond pulses recurring every 160 microseconds, as shown by graph C in FIGURE 26. This same pulse train is shown on a reduced time scale by graph D.

Figure 10:
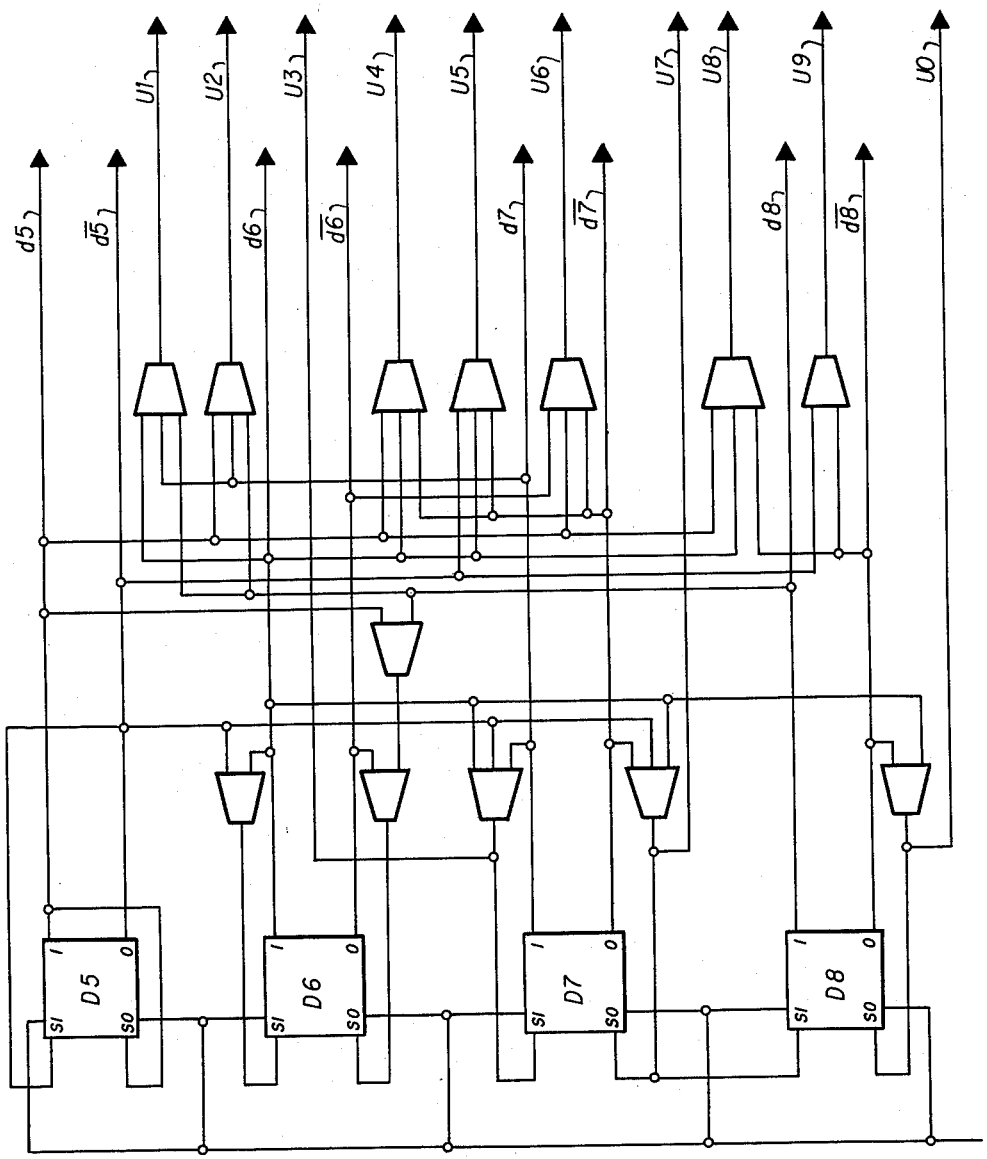
FIG. 10 is a functional block diagram of the units counter of the distributor.

The units counter 814 comprises flip-flops D5–D8 and a group of NOR logic gates, as shown in FIGURE 10. It is advanced one step by each pulse of train TP–2, as shown by graph E of FIG. 26, it therefore remains in each state for ten microseconds. The logic is so arranged that the counter recycles after the count of ten. The equations for setting and resetting the flip-flops are as follows:

$$\text{Set } D5 = \overline{d5}$$
$$\text{Reset } D5 = d5$$
$$\text{Set } D6 = d5.\overline{d6}$$
$$\text{Reset } D6 = d6 \ (d5+d8)$$
$$\text{Set } D7 = d5.d6.\overline{d7}$$
$$\text{Reset } D7 = d5.d6.d7$$
$$\text{Set } D8 = d5.d6.d7$$
$$\text{Reset } D8 = d6.d8$$

The output equations are as follows:

$U1=\overline{d6}.\overline{d7}.\overline{d8}$    $U6=\overline{d5}.d6.d7$
$U2=\overline{d5}.\overline{d7}.\overline{d8}$    $U7=d5.d6.d7$
$U3=d5.d6.\overline{d7}$    $U8=\overline{d5}.\overline{d6}.d8$
$U4=\overline{d5}.\overline{d6}.d7$    $U9=d5.d8$
$U5=d5.\overline{d6}.d7$    $U0=d6.d8$ The units counter also supplies the outputs $d5$–$d8$ and $\overline{d5}$–$\overline{d8}$ from the flip-flops.

The pulse train TP-2 is gated with the output U0 from the units counter in gated pulse amplifier 822, producing an output pulse train TP-3 of two microsecond pulses recurring every 1600 microseconds, as shown by graph F in FIG. 26. This same pulse train is shown on a reduced time scale by graph G.

The tens counter 816 comprises flip-flops D9–D12 and a group of NOR logic gates. It is advanced one step by each pulse of train TP-3, as shown by graph H of FIG. 26, it therefore remains in each state for 1600 microseconds. The logic is arranged to recycle the timer after the tenth count as for the units counter. The detailed design and the equations are similar to those for the units counter, and are therefore not shown in detail. The outputs comprise T1–T0, $d9$–$d12$, and $\overline{d9}$–$\overline{d12}$.

E. CONTROL EQUIPMENT SHARED ON TIME DIVISION MULTIPLEX BASIS

Figure 11:
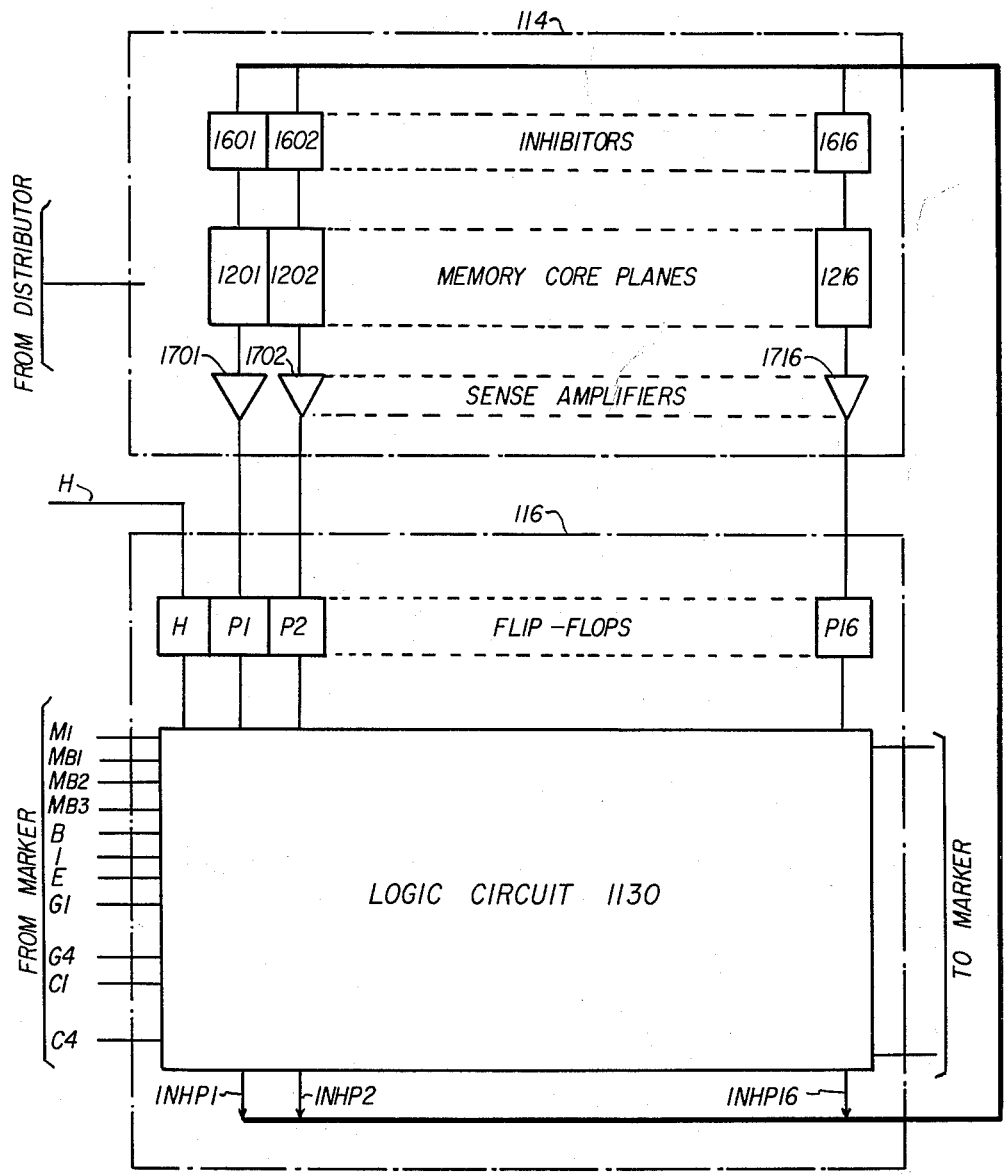
FIG. 11 is a block diagram showing the signal flow in the memory and the control unit.
Figure 12:
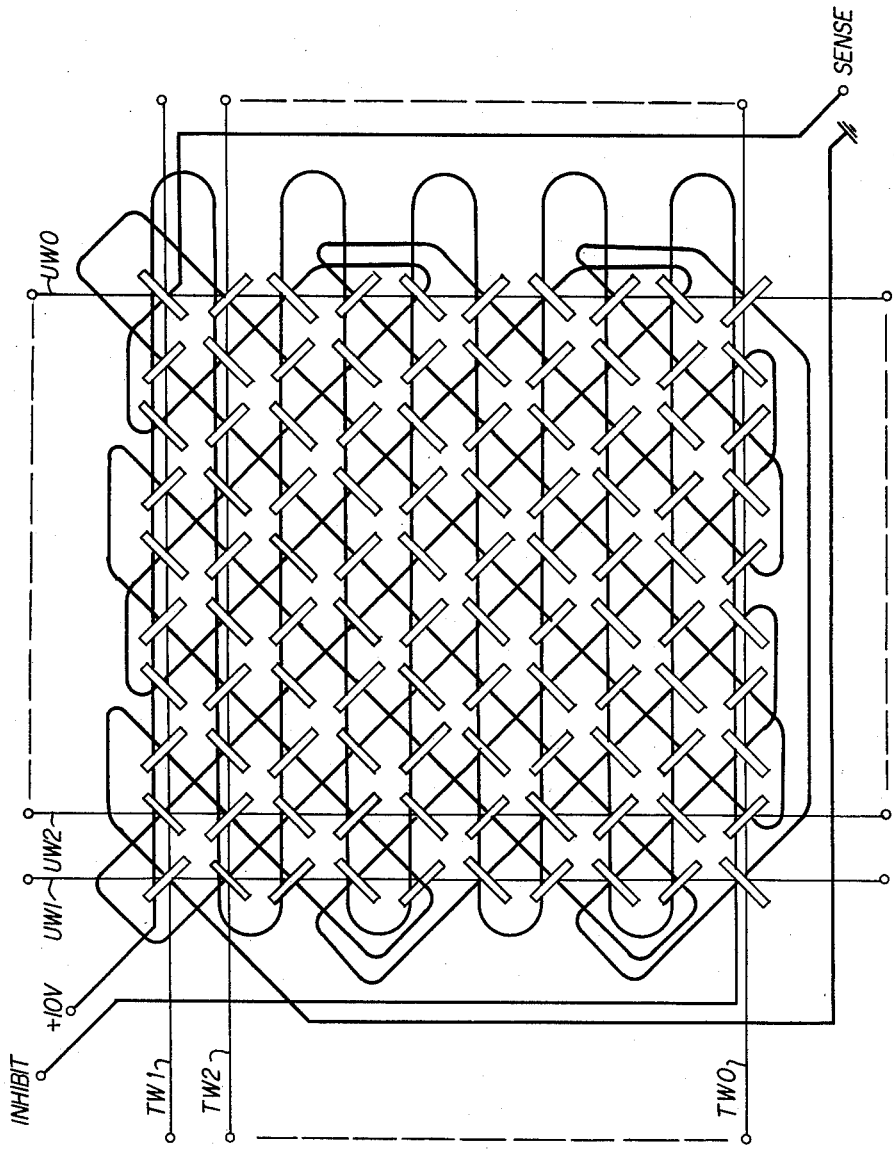
FIG. 12 is a diagram showing the wiring of one plane of the memory.
Figure 13:
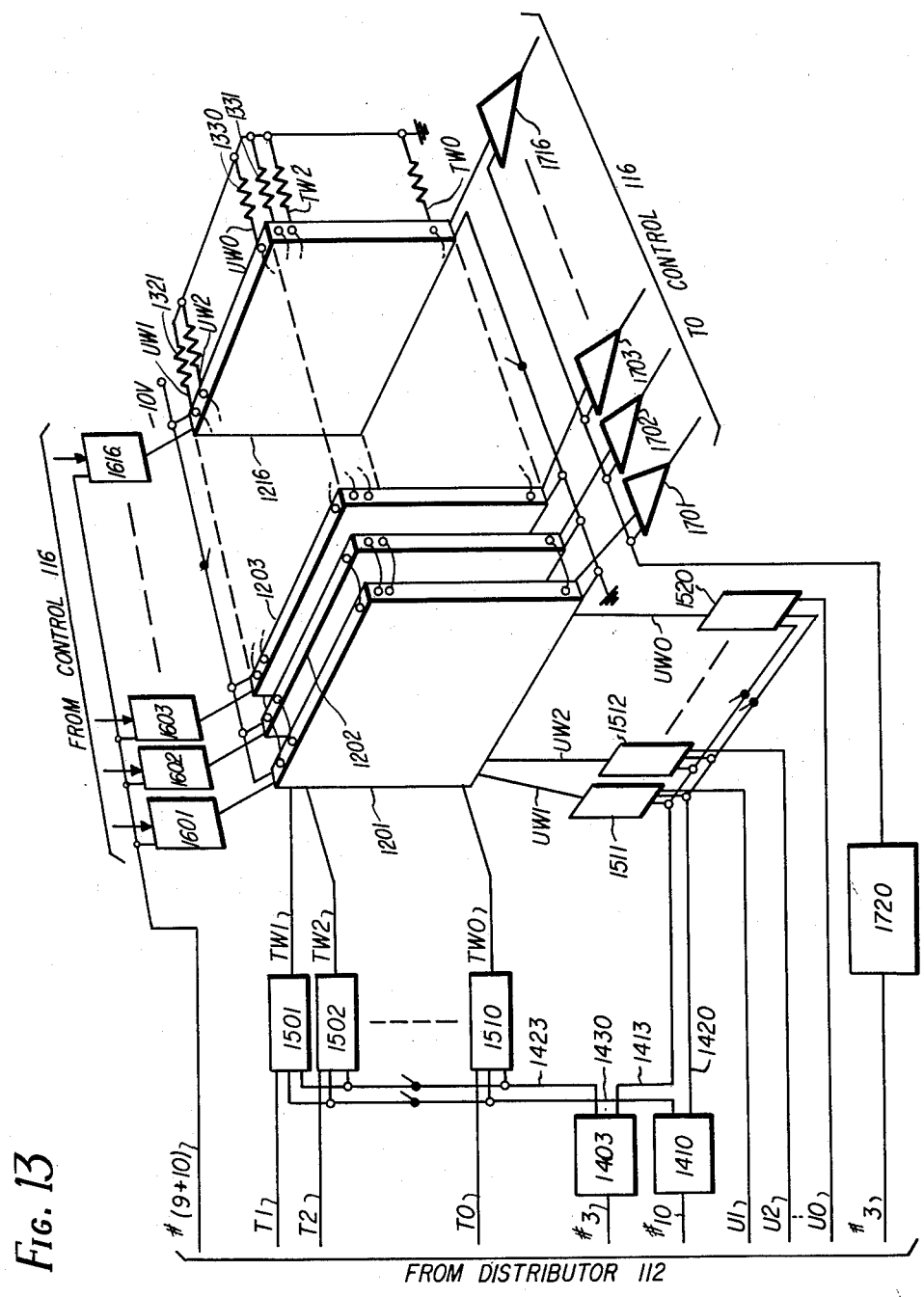
FIG. 13 is a partly perspective block diagram of the memory.

The memory 114 and control unit 116 are shared by the 100 line circuits in their respective time slots of a time division multiplex cycle. These units are shown in FIG. 11 by a functional block diagram which shows the circulating flow of signals between them. The memory 114 is also shown in FIG. 13 by a functional block diagram partly in perspective, showing how the ferrite cores are arranged in sixteen planes 1201–1216. The arrangement of the cores and the wiring for one plane is shown in FIG. 12. Each plane has 100 cores in a 10 x 10 array. In each plane, a core is associated with a particular subscriber; therefore, sixteen cores (one in each plane) are associated with a particular subscriber.

The cores in the planes are addressed by the same "tens" and "units" pulses from the distributor that address the AND gates in the line circuits (FIG. 5). From this it follows that during time slot 32, for example, which means during coincidence of T3 and U2, the control action is directed to line circuit LC32, investigating simultaneously the condition of the line loop via highway H, and by reading out of the memory a 16-bit "word" that was put into the memory during the preceding cycle (16 milliseconds earlier).

Each one of the sixteen ferrite core planes has a sensing winding, threading all 100 cores of that plane. These are connected respectively to the inputs of sensing amplifiers 1701–1716. During interval #3 of each time slot the core in each plane corresponding to a certain subscriber's time slot is "read out." If a core stored a "1," it will produce a "signal" voltage during this read-out period which is picked up by the sense winding and fed to the sensing amplifier where this signal is amplified. If a core stored an "0," no voltage is induced by this core in the sense winding during the read-out operation.

The control unit 116 includes seventeen flip-flops, one being flip-flop FF—H having its input from the highway H and the other sixteen being flip-flops P1–P16 with inputs from the respective sense winding amplifiers 1701–1716. The outputs of the flip-flops are connected to gates in the logic circuit 1130. These logic circuit gates also have inputs from the marker 118. Towards the end of the time slot the outputs from the flip-flops are supplied to the inhibit drivers 1601–1616 to control the setting or resetting of the memory core planes, and output is also taken from the logic circuits to the marker.

Following the sixteen sensing amplifiers there are sixteen flip-flops P1–P16, one for each of the core planes. When, for example, the core in plane seven corresponding to line circuit LC32, contains a "1" and this core is read out during interval #3 of time slot 32, the signal voltage, amplified by the sense amplifier 1701 of plane 1201 will set flip-flop P1 to state "1." This means that after interval #3, the flip-flops store the same combination of 16 bits that were stored in the cores corresponding to a time slot.

There is another flip-flop, designated as FF—H. If the subscriber at station S32 has his line loop closed at the time the distributor is addressing him, there is a signal during that time slot on highway H, and this signal will set flip-flop FF—H to the state "1."

After interval #3 in each time slot, the flip-flops P1–P16 show the information about the subscriber associated with that particular time slot that was available at the previous occurrence of this time slot. The logical network should modify this information on the basis of new information coming in. There are two sources of information. (1) The present condition of the subscriber's line loop, which is introduced via the highway H on flip-flop FF—H, and (2) information coming from the marker. To give a simple example: if the flip-flops P1–P16 show that a subscriber was at rest in the previous cycle, and if we now find that he has closed his line loop (flip-flop FF—H in state "1"), we know that the subscriber is initiating a call. The 16 outputs of the logic circuitry will then produce a code governing the inhibit drivers such that it will, in interval #10 of the time slot, inscribe in the core memory the information (in coded form): "subscriber is initiating a call."

Summarizing, it can be said that the logic circuitry makes decisions for each of the 100 subscribers acting on the following information, (1) condition of subscriber during previous scan (P1–P16), (2) present condition of subscriber's line loop (H), and (3) conditions in the marker; and that the information about each subscriber is in this way kept up to date once per cycle.

Figure 27:
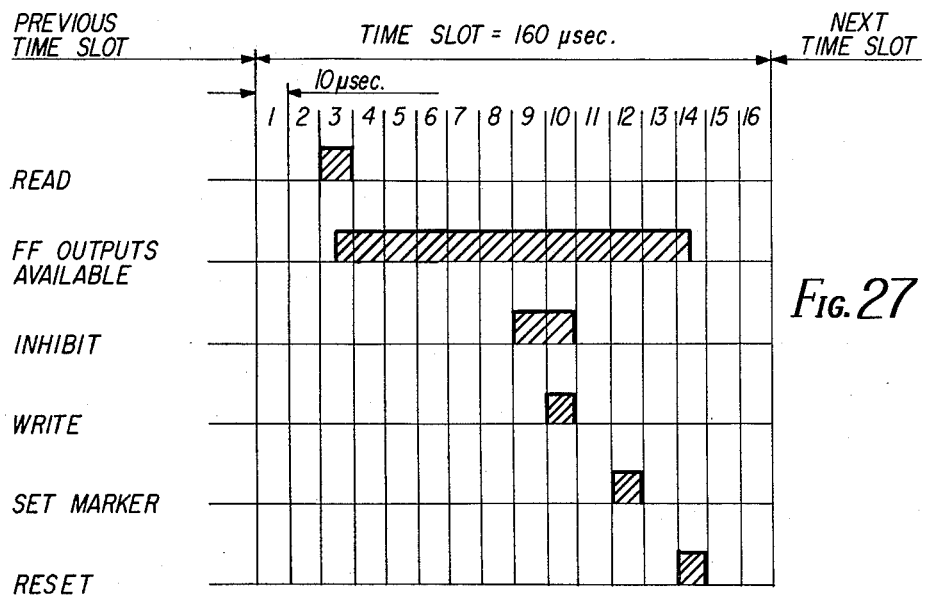

The actions in a time slot may be summarized by reference to the graph of FIG. 27. Thus, during each time slot in interval #3 the information concerning the particular subscriber addressed is read-out from the core memory to set the selected ones of the flip-flops P1–P16 corresponding to the "word" stored in the core memory, and the flip-flop FF—H is set if the line loop is closed. During intervals #3–#14 the states of the flip-flops P1–P16 and FF—H remain unchanged, furnishing information to the logical network. During intervals #4–#8, a 50-microsecond interval occurs which allows propagation of the information through the logical network. At the end of interval #8 all outputs of the network should have settled. During interval #9 and #10, based on information at the outputs of the logical networks, the inhibit drivers 812 are activated. When for example, logical output INH P8 of the network shows that we do not want to write a "1" in the core of plane 1208, the inhibit driver core to that plane is actuated during this interval. Interval #9 is the write interval. Writing currents are sent to the cores corresponding to the subscriber in each of the 16 planes. However, only the cores in those planes in which the inhibit drivers have not been activated will be switched to store a "1." In interval #12 information is introduced into the marker. In interval

14 flip-flops P1–P16 and FF—H are reset to state "0." In this way they are prepared to receive information from the core memory and the highway H pertaining to the subscriber associated with the next time slot.

E1. *Memory Details*

Each of the memory planes 1201–1216, as shown in FIG. 13, comprises 100 ferrite cores in a 10 x 10 array as shown in FIG. 12. The operation of this memory is of the conventional coincident current type, and of the parallel variety, meaning that all corresponding sixteen cores in a certain location on each of the planes are operated upon at the same time. In each plane, the ten cores in each horizontal row are threaded by one of the ten access wires TW1–TW0 corresponding to the tens digits of the subscriber numbers, and each of the ten cores in each vertical row is threaded by one of the ten access wires UW1–UW0 corresponding to the units digits of the subscriber numbers. Each of the access wires TW1–TW0 extends from a corresponding one of the ten switches, 1501–1510, thence through the ten cores of a horizontal row of each of the sixteen planes, that is, 160 cores in series, thence through a corresponding one of the resistors 1321–1330 to ground; and in like manner each of the access wires UW1–UW0 extends from a corresponding one of the switches 1511–1520 through the ten cores of a vertical row of each of the sixteen planes in series, that is, 160 cores in series, thence through a corresponding one of the resistors 1331–1340 to ground.

Each of the 20 switches 1501–1520 has three inputs, one of which is an individual input from the tens or units counter of the distributor, and the other two being from a read current driver 1403 and a write current driver 1410 respectively. During each time slot, one of the tens switches 1501–1510 is supplied with an input signal on the corresponding one of the leads T1–T0, and only one of the units switches 1511–1520 is supplied with an input and a corresponding one of the leads U1–U0. During interval #3 of each time slot a read driver 1403 is activated and supplies output current to the tens switches 1501–1510 via conductor 1423, and to the units switches 1511–1520 via conductor 1413. During interval #10 the write driver 1410 is activated and supplies output current to the tens switches via conductor 1430 to the units switches via conductor 1420.

Each of the memory planes 1201–1216 has all 100 cores threaded by a sense winding as shown in FIG. 12, and these sixteen sense windings are connected respectively to the sixteen sense winding amplifiers 1701–1716. Each memory plane also has an inhibit winding threading all 100 cores and for sixteen planes inhibit windings are driven by inhibit drivers 1601–1616 respectively.

The graph of FIG. 27 includes a showing of when the signals occur in the memory windings during one time slot. Consider for example, time slot 32. At the beginning of the time slot the signal T3 is supplied to switch 1503 and U2 is supplied to switch 1512. Therefore, all of the other ones of the switches 1501–1520 remain idle during this time slot. During interval #3, the read driver 1403 is activated and this activates the switch 1503 to supply a half-read current over the access winding TW3 and switch 1512 is activated to supply the half-read current over access winding UW2. In each of the planes the one core threaded by both windings TW3 and UW2 is supplied with full read current, and in those planes in which a 1 was stored, an output pulse is produced in the sensing winding. These outputs are supplied to the sensing amplifiers. The sensing amplifiers are only activated when an output pulse is supplied by a strobe unit 1720, which supplies a signal corresponding to the interval #3 pulse delayed two microseconds, thereby suppressing the noise voltages that are induced in the sense windings during the first few microseconds after application of the read currents.

In interval #10 the write driver 1410 and the switches 1503 and 1512 are activated to supply write currents which flow in the opposite direction from the rear currents, through the access windings TW3 and UW2. If the logic circuits 1130 (FIG. 11) decide that in certain planes the core under consideration should not be set 1 but should remain in state 0, the inhibit driver corresponding to that plane is activated. An inhibit current equal to the sum of the currents in the tens and units write windings and opposing these currents is then transmitted on the inhibit winding, preventing the core under consideration from being switched to state 1. For practical reasons the inhibit current is applied both during intervals #9 and #10, being controlled by a signal number (9+10) from the interval counter.

The cores used in the memory are of the F–394 size (0.080" O.D.) and of material S–5 (General Ceramics). These cores have a nominal full read and write current reading of 200+200, or 400 milliamps, a nominal output voltage when switching equal to 30 millivolts, and a switching time of 4–6 microseconds.

The various units associated with the memory windings have been designed with completely transistorized circuitry, using a minimum number of different transistor types. Most of the PNP transistors are type 2N583 and most of the NPN are type 2N585, although in some places it may be necessary to use PNP transistors having larger current handling capacities and greater dissipation ratings, such as type 2N578. The considerations in the design are (1) the magnitude of drive currents should depend only to a very small degree on the characteristics of the particular transistors with the circuitry working without need for adjustment of all transistors of appropriate type satisfying certain minimum conditions; (2) amplification in the sensing amplifier should be essentially independent of characteristics of particular transistors; and (3) the amplitudes of the drive currents and of the inhibit currents should depend on the voltage of the same power supply to insure proper balance of the write and inhibit currents for the deviations from the nominal supply voltage. In addition, in case of need, a temperature dependent voltage characteristic can be incorporated into the power supply for temperature compensation of the currents.

The read driver 1403 and write driver 1410 each generate two current pulses of 40 milliamps each during the presence of a negative input signal. One of these current pulses from each driver is sent to all of the tens switches in parallel and the other to all of the units switches in parallel, one tens switch and one units switch being on.

Figure 14:
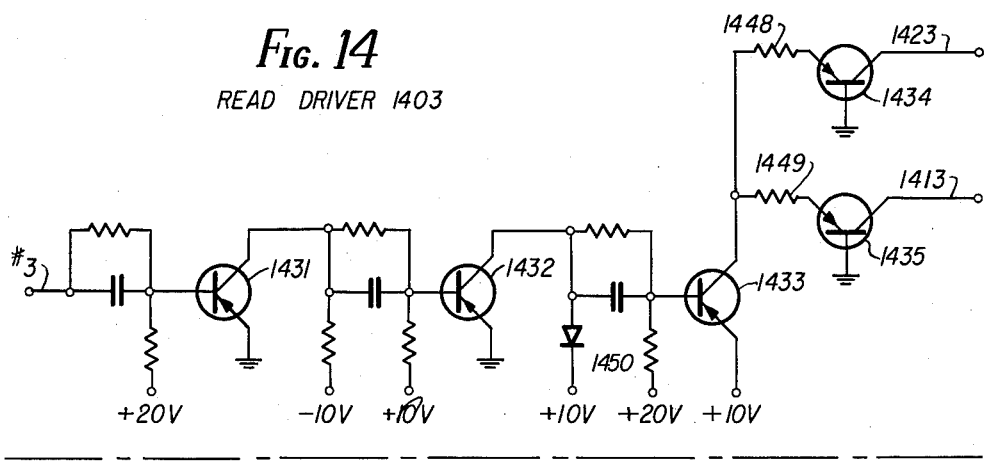

The circuit for the read driver is shown in FIG. 14. Its input is supplied by the #3 output of the interval counter. It has two outputs, one on conductor 1423 to the tens switches and the other on conductor 1413 to the units switches.

When the input is at ground potential, the transistor 1431 is reverse biased to cut-off. The coupling between transistors 1431 and 1432 insures that transistor 1432 is also cut off. The diode 1450 conducts. The input circuit of transistor 1433 supplies reverse-bias to it to cut it off. The two grounded base output transistors 1434 and 1435 do not receive emitter ground and therefore are also cut-off.

During interval #3 the input signal becomes at least 8 volts negative causing transistors 1431 and 1432 to become saturated. The diode 1450 then cuts off and the base electrode of transistor 1432 is clamped to −10 volts to the emitter base path. With collector current flowing in transistor 1433 the transistors 1434 and 1435 become conducting, but not saturated. Their emitters stay within a few tenths of a volt of ground. The emitter currents of the two output transistors 1434 and 1435 are determined by the respective resistors 1438 and 1449 and the +10 voltage supply at the emitter electrode of transistor 1433.

The currents supplied by the transistors 1434 and 1435 are dependent on the +10 volts supply, and the inhibit drivers 1601–1616 are also designed to be dependent on this voltage supply. In this way the proper balance between the write and the inhibit currents is obtained. It is also possible to incorporate a temperature-dependent characteristic of the +10 volts supply for a temperature computation of the core memory while still maintaining balance of the write and inhibit drive.

The circuit for the write driver 1410 is similar to that of the read driver 1403.

Figure 15:
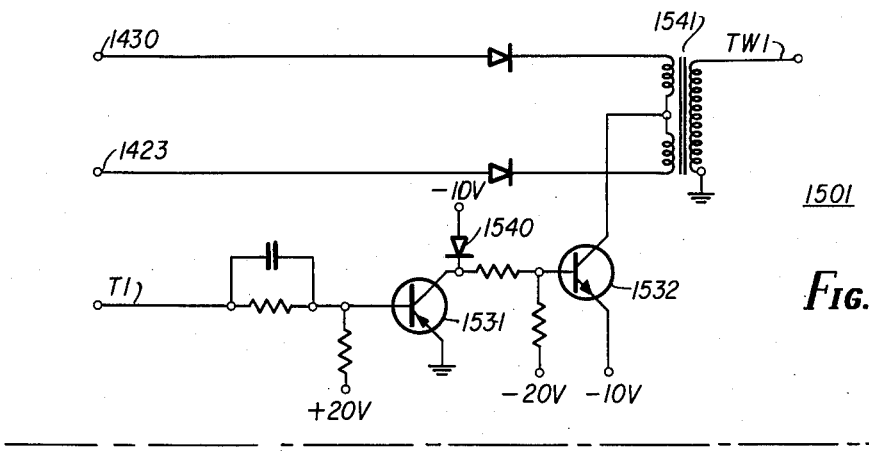
Figure 16:
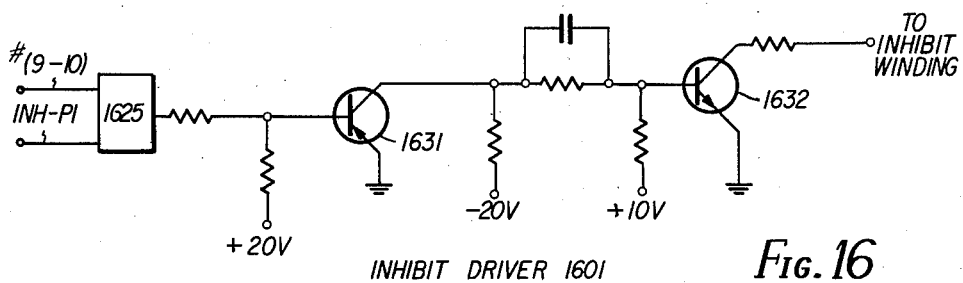
Figure 17:
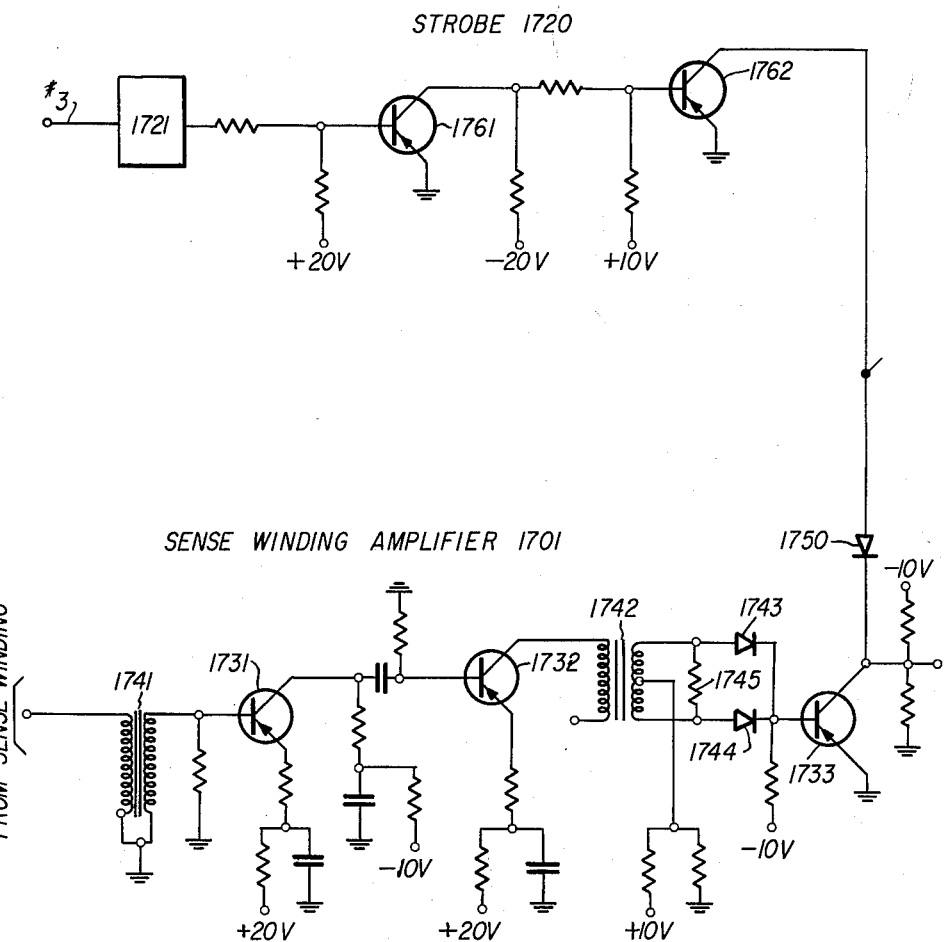

The switches 1501–1510 and 1511–1520 pass the read and write currents from the drivers to an access line of the memory, under command of an individual control signal T1–T0 and U1–U0. These switches are all similar, and one of them, 1501, is shown in FIG. 15. When the control signal T1 is at ground potential, the transistor 1511 is reverse-biased to cut-off. The diode 1520 conducts, and the transistor 1512 is also biased to cut-off. Therefore no current can flow in the transformer 1521, and the switch is off.

When the control signal T1 is on and therefore at least 8 volts negative, the transistor 1531 saturates, the diode 1540 is cut-off, and sufficient current flows in the base circuit of transistor 1532 to saturate it. During interval #3 a 40 milliamp current from the read driver 1403 is supplied over conductor 1423 and is stepped up to 200 milliamps by transformer 1541 and supplied to access winding TW1 in one direction and during the write interval #10 current from the write driver 1410 on conductor 1430 supplies a 40 milliamp current which is stepped up to 200 milliamps by the transformer 1541 and supplies current in the other direction on access line TW1.

Each of the inhibit drivers 1601–1616, when supplied with an input signal, supplies a 200 milliamp current through the inhibit winding of its core plane. This current counteracts the write current and thereby prevents the core from being switched. To insure the inhibit current being present when the write current is present, the inhibit drivers are activated earlier than the start of the write current. This is accomplished by gating the input signal with the #(9+10) signal from the interval counter in a gating unit 1625.

When the output from unit 1625 is at ground potential the transistors 1631 and 1632 are biased to cut-off. When this signal is at least 8 volts negative, transistor 1631 is biased to saturation and transistor 1632 conducts to supply a collector current of 200 milliamps.

The sensing amplifiers receives positive or negative pulses from the respective sense windings from the memory planes 1201–1216. These pulses are amplified and rectified to give 6 volt negative pulses at the output. These pulses are of suitable magnitude and polarity to trigger the respective flip-flops P1–P16 succeeding the sense amplifiers.

Transistors 1731 and 1732 act as linear amplifiers, and are biased to accept voltage pulses of either polarity. The combination of transformers 1742, resistor 1745 and the diodes 1743 and 1744 act as a full-wave rectifier. Input pulses of either polarity appear as positive pulses at the base of transistor 1733, which is normally in saturation. With no signal input, the diodes 1743 and 1744 are reverse-biased by a threshold voltage of −2 volts derived by a voltage divider 1746, 1747.

When an input signal of sufficient magnitude is received such that the −2 volt bias is overcome by either diode 1743 or diode 1744, the base bias current of transistor 1733 is diverted through the conducting diode, thereby cutting off transistor 1733. The voltage at the collector of transistor 1733 then swings from ground to −6 volts.

The output signal of the sensing amplifier is "strobed" by an input signal applied through diode 1750 to the collector electrode of transistor 1733, as long as this signal is at ground, the amplifier output is inhibited. The strobe input through diode 1750 is used to inhibit noise voltages in the sense windings that appear during the first few microseconds after application of the read currents along the access lines of the memory, and also to inhibit outputs of the sense amplifier at times other than reading times.

Normally, a switching core produces a pulse of 30 millivolts amplitude and a duration of 4 microseconds. The amplifier designed is such that the voltage across either half of the secondary of transformer 1742 is just sufficient to overcome the bias of −2 volts from the voltage divider 1746, 1747.

The strobe unit 1720 receives a signal from the #3 output of the interval counter. This signal is delayed two microseconds by a delay unit 1721. When the delayed signal is at ground potential, the strobe unit 1720 inhibits outputs of the sensing amplifiers. With the ground potential input signal the transistor 1761 is cut off by reverse bias. Sufficient base current is then supplied to transistor 1762 to maintain it in saturation while delivering the maximum expected collector current which is the current required, in the worst case, to maintain sixteen sense winding amplifiers inhibited.

When the input signal goes to at least 8 volts negative, transistor 1761 conducts at saturation. This establishes a reverse bias on the base electrode of transistor 1762 and cuts it off, thereby removing the inhibition from the sensing amplifier outputs.

E2. *Organization of Memory and Control*

In the memories, a 16 bit word is associated with each subscriber, corresponding to the 16 flip-flops P1–P16. This word, along with the information from the highway and its flip-flop FF—H can be divided into groups. A sequence switch comprising flip-flops P1—P4 and the associated memory planes and logic circuits comprises a sequence circuit showing which one of the possible calling and called conditions the subscriber circuit presents. A line supervision circuit comprising flip-flops FF—H and P5 along with the associated memory planes and logic circuits show the subscriber hookswitch and dial pulse signals and changes therein. A timer comprises flip-flops P6–P8 in the form of a counter showing the number of cycles which have occurred since the last time the hookswitch supervisory signal has changed condition. A register comprises flip-flops P9–P16 in two groups, P9–P12 and P13–P16, of four bits each to register the dialed digits or the routing of a connection to the crosspoint network 110.

E2a. SEQUENCE CIRCUIT

The four digits, 1–4 (stored in planes 1–4, and appearing on flip-flops P1–P4) contain, in coded form, the conditions that a subscriber can be in. It is possible with four binary digits, to make 16 different combinations, only 12 of which are used as shown in Table I.

TABLE I

| State | Description | P1 | P2 | P3 | P4 |
|---|---|---|---|---|---|
| S1 | rest | 0 | 0 | 0 | 1 |
| S2 | dialing first digit | 1 | 1 | 0 | 0 |
| S3 | dialing second digit | 1 | 1 | 0 | 1 |
| S4 | dialing completed | 1 | 1 | 1 | 1 |
| S5 | calling party being connected | 0 | 1 | 0 | 0 |
| S6 | calling party in conversation | 1 | 0 | 0 | 0 |
| S7 | calling party, conversation terminated or calling party who cannot be connected. | 1 | 0 | 1 | 0 |
| S8 | calling party being disconnected | 0 | 0 | 1 | 0 |
| S9 | called party after busy test before connection. | 0 | 1 | 0 | 1 |
| S10 | called party, connected but not yet answering. | 1 | 0 | 0 | 1 |
| S11 | called party, answered | 1 | 0 | 1 | 1 |
| S12 | subscriber returning to rest | 0 | 0 | 0 | 0 |

E2b. LINE SUPERVISION

The flip-flops FF—H and P5 show the subscriber's loop supervisory condition. The flip-flop FF—H shows the supervisory condition for the current time slot. This information is used at the end of the time slot to control the setting of the P5 core, so that the P5 flip-flops always show the line loop condition during the preceding cycle. Thus, if flip-flops FF—H and P5 are in different states this indicates that the line loop condition has changed since the last cycle. If P5 shows a "1" the subscriber's line loop was closed (conducting) in the preceding cycle. If P5 shows an "0" the subscriber's line loop was open (interrupted) in the preceding cycle.

E2c. TIMER

The digit positions P6, P7 and P8 show the number of cycles that have elapsed since the condition of the line loop of the subscriber changed from open to closed or from closed to open. This information is coded in binary code and shows the number of cycles from 1 to 8 since the last line loop condition change occurred.

This information is needed during dialing. Line loop interruptions due to dial impulses never exceed some 60 milliseconds. Since a cycle is 16 milliseconds in length, the P6, P7, P8 counter will never reach "7" during a line loop interruption caused by a dial impulse. If, however, the line loop is interrupted for 7×16=112 milliseconds or more, the counter will reach "7" and will cause this interruption to be interpreting the fact that a subscriber has replaced his handset.

If the period during which the line loop is closed between interruptions does not exceed some 40 milliseconds (the counter does not reach "7") they will be interpreted as periods between dial pulses of one dial pulse train. If, however, the line loop remains closed for at least 112 milliseconds, allowing the counter to reach "7," it will be interpreted as the end of a dial pulse train.

The symbol $q$—$P6.P7.P8$ will be used to designate the counterstate "7."

E2d. NUMBER AND ROUTE REGISTER

The third group of four digits (P9–P12) contains numerical information. The nature of this information is different for different subscriber's conditions. When the subscriber is in S2 the contents of P9–P12 show the number of dial pulses of the tens dial impulse train that have been received. This number is coded in binary code.

When the subscriber is in S2 or S4 the contents of P9–P12 show the number of dial impulses of the units dial pulse train that has been received. This number again is coded in binary code. When the subscriber is conected in the crosspoint connecting network (states S6, S7, S10, S11) the contents of P9–P12 show a number designated a group number, indicating the number of the XG crosspoint switch over which the connection is maintained. The significance of this will be explained later in the discussion on the marker.

Note that the logic circuitry always needs to combine the information in P9–P12 with the sequence information (P1–P4) on the subscriber's state in order to properly interpret this former information.

The fourth group of four digits P13–P16 also contains numerical information, the nature of which is different for different subscriber's conditions. When the subscriber is in S3 or S4 the contents of P13–P16 show the first dialed (tens) digit, coded in binary code. When the subscriber is connected to the crosspoint connecting network (states S6, S7, S10, S11) the contents of P13–P16 show a number designated a choice number, indicating the number of the XC crosspoint switch over which the connection is running.

Table II summarizes the information in the register during the noted subscriber states:

TABLE II

| Subscriber State | P9–P12 | P13–P16 |
|---|---|---|
| S2 | First dialed digit. | |
| S3 | Second dialed digit. | First dialed digit complete. |
| S4 | Second dialed digit complete. | Do. |
| S6 and S7 | Group. | Choice. |
| S10 and S11 | do | Do. |

E3. *Logic for Control Unit*

It was mentioned above that the logical circuitry 1130 in FIG. 11 decides what new information is to be written into digits 1–16 for each subscriber, acting on the information about the subscriber that was written during the previous cycle (P1–P16); the information about the present state of the subscriber's line loop ($h$); and when necessary, information about the state of the system and other subscribers.

It was also shown that the information from the memory and the highway is available after interval #3 of a time slot, and that for writing the new information into the core memory commands must be available during at least intervals #9 and #10. In the following, the logical equations for Set P1–Set P16 (in the form of Boolean algebra) that lead to the coding system for memory storage will be derived. The actual circuitry to generate these commands can take many forms (diode logic, transistor logic, etc.) In the arrangement as shown in FIG. 11, the commands Set P1–Set P16 are inverted at the output of the logic 1130 to become the inverted signals INH P1–INH P16 for controlling the inhibit drivers 1601–1616.

As shown in FIG. 11, the inputs to the Logic Circuits 1130 comprise the outputs from flip-flops FF—H and P1–P16; and inputs from the marker 118 as follows:

$Mi$=marker idle.

$Mb1$=marker performing busy test and hunting for a free path to set up a connection.

$Mb2$=having successfully completed the tests during $Mb1$, marker is actually marking the links of the crosspoint network necessary to establish a connection.

$Mb3$=marker disconnecting a path in crosspoint network.

$b$: When marker is in state $Mb1$, it will generate a "busy testing" signal $b$ in the time slot associated with the called party.

$i$: When the marker, in $Mb1$, finds that a connection cannot be made because:
  (1) Called party busy, or
  (2) No free link available for the connection, or
  (3) Calling party dialed his own number, the marker generates signal "$i$" (impossible).

$e$: When the marker is in state $Mb3$ (disconnection) it generates a signal in the time slot of the (called) subscriber whose routing information (P9–P16) corresponds with the routing information (P9–P16) of the calling party who has signalled the termination of a conversation.

$g1$–$g4$, $c1$–$c4$, routing information generated by marker during $Mb2$, to be stored in P9–P16 of the calling and called subscribers.

The outputs from the logic circuits include the signals INH P1–INH P16 to the inhibit drivers 812 for controlling the coded information to be written into the memory. There are also outputs to the marker which fall into categories (1) commands to change marker states, and (2) commands to transfer numerical information stored in flip-flops P9–P16 which can be either the number of the called party or the routing information of a connection to the marker. The commands to the marker will be discussed later but it should be noted that these commands to the marker will never become effective until interval #12, i.e., after the commands to the core memory have written the appropriate code into that memory. In this way it is certain that the inputs ($Mi$–$Mb3$) from the marker to the logical circuitry remain unchanged during intervals #3–#10 (since the marker itself will never change state before #12). In this way all inputs to the logical circuitry will remain unchanged from interval #3 to the time of writing (interval #10).

E3a. SUBSCRIBER STATE SEQUENCES

In FIG. 18 the states S1–S12 in which subscribers can be are shown as rectangles. The states are linked by directed lines (arrows), showing the conditions under which the transitions from one state to another are made. These conditions are indicated along the directed lines. In the following sections we will consider each of the subscriber's states, and examine under what conditions this subscriber's state has to be changed to another state, and under what conditions the present subscriber state has to remain unchanged. When the subscriber's state is S1 (rest), the next state can be S1, S2 (dialing first digit) or S9 (busy tested as a called party). When "$b$" exists (from marker) subscriber's state should go to S9 (busy tested) regardless of the line loop condition. When "$b$" does not exist, the subscriber's state should remain S1 (rest) when line loop is open ($\bar{h}$), and should go to S2 (dialing first digit) when line loop is closed ($h$). So:

$S.1b$=go to $S9$
$S1.\bar{b}.\bar{h}$=go to $S1$
$S1.\bar{b}.h$=go to $S2$

When the subscriber's state is S2 (dialing first digit) the next state can be S2, S12 (to rest) or S3 (dialing second digit).

When $q$ does not exist, it is known that the first dial impulse train has either not yet started (P6, P7, P8 counter at rest) or is in progress (line loop condition changes are sufficiently rapid to prevent the counter reaching "7"—$q$). In this case the subscriber should remain in state S2.

When a $q$ does exist, meaning that the last change in line loop conditions took place seven cycles ago, we have two possibilities:

P5.$q$: line loop has been closed long enough to be interpreted as the end of the first dial impulse train. Subscriber should transfer to S3 (dialing second digit).
$\overline{P5}.q$: line loop has been interrupted for a longer time than can be expected in the case of a dial impulse.
Conclusion: the subscriber has replaced his handset. Subscriber should transfer to S12 (to rest).
Therefore:

$S2.\bar{q}$=go to $S2$
$S2.P5.q$=go to $S3$
$S2.\overline{P5}.q$=go to $S12$

When subscriber's state is S3 (dialing second digit) the next state can be S3, S12 (to rest) or S4 (dialing complete). A reasoning similar to that for the S2 case yields: remain in S3 as long as $q$ does not exist; go to S4 at the end of the impulse train (P5.$q$) and go to S12 when line loop is interrupted sufficiently long ($\overline{P5}.q$). Therefore:

$S3.\bar{q}$=go to $S3$
$S3.P5.q$=go to $S4$
$S3.\overline{P5}.q$=go to $S12$

When the subscriber's state is S4 (dialing complete) the next state can be S5 (calling party, being connected by the marker), S4 or S12 (to rest). Obviously, when the marker is already busy ($\overline{Mi}$) the transition to S5 cannot be made. It is also desired that the marker by-pass this subscriber when the subscriber's line loop is open since it may be that the subscriber has decided to abandon the call. Thus, the transfer to S5 is made only when both $Mi$ and $h$ are true. When $Mi$ and $h$ are true the subscriber, showing no intention to abandon the call, ($h$) should remain in S4. When the subscriber's line loop is open ($\bar{h}$) this can be due to the subscriber dialing another digit. In this case the P6, P7, P8 counter will never reach "7" and the subscriber is left in state S4, the additional dial impulse train is simply disregarded ($\bar{h}.\bar{q}$). When, however, the counter indicates that the line loop has been interrupted for seven cycles $\bar{h}.q$, this will be interpreted as a subscriber having replaced his handset in which case the subscriber is transferred to S12 (to rest). Therefore:

$S4.h.Mi$=go to $S5$
$S4.(h.\overline{Mi}+\bar{h}.\bar{q})$=go to $S4$
$S4.\bar{h}.q$=go to $S12$ When the subscriber transfers from S4 to S5 (command $S4.h.Mi$) the marker is set from $Mi$ to $Mb1$. In this state the marker performs a busy test on the called party (by generating a signal "$b$" in the time slot of the called party) and also tries to find a free path in the switching network to connect both parties. For this action the marker needs a complete cycle (16 milliseconds). When the marker detects that the connection cannot be made the signal "$i$" is generated. At the end of the cycle (which is recognized by the read-out of S5 for the calling subscriber) there are two possibilities:

(1) The connection cannot be made ($S5.Mb1.i$). In this case the subscriber is transferred to S7, and the marker is reset to $Mi$ (idle).

(2) The connection can be made ($S5.Mb1.\bar{i}$). In this case the calling subscriber remains in S5 and the marker transfers to $Mb2$. In the following cycle the marker effectively establishes the connection. At the end of this cycle (which is recognized by the read-out of S5 for the calling subscriber and the marker state $Mb2$) the subscriber transfers to S6 (calling subscriber, connected), and the marker reverts to $Mi$ (idle).

Therefore:

$S5.Mb1.\bar{i}$=go to $S5$
$S5.Mb2$=go to $S6$
$S5.Mb1.i$=go to $S7$

When a subscriber is in state S6 (calling connected) he remains in that state until his line loop is interrupted sufficiently long (7 cycles) to be recognized as a return to the "on hook" condition ($\bar{h}.q$). Therefore:

$S6.\bar{h}.q$=go to $S7$ (terminate)
$S6.(h+\bar{q})$=go to $S6$

From what has been said, the state S7 can mean two subscriber conditions: (1) a calling subscriber whose connection could not be established (and should get "busy tone"), or (2) a calling subscriber who has replaced his handset and wants to be disconnected.

The system logic is organized in the following way:

A subscriber in S7 can only be released (S8—S12—S1) with the aid of the marker.

When the marker starts the disconnection, the subscriber transfers from S7 to S8, and in the following cycle from S8 to S12.

A subscriber can only be released when the subscriber's line loop is interrupted (telephone on hook), so, the subscriber in state S7 under condition 1. should first replace his handset in order to be released. Therefore:

$S7.Mi\bar{h}$=go to $S8$ (being disconnected)
$S7.(\overline{Mi}+h)$=go to $S7$ When the subscriber's state is S8 (calling party being disconnected) the next state will always be S12 (to rest). So:

$S8$=go to $S12$

When the subscriber's state is S9 (tested as a called party) the next state can be S10 (called party connected) or S12 (to rest). A subscriber was set to S9 during the $Mb1$ state of the marker. When the marker finds that the call can be established, it has moved to $Mb2$; when the call cannot be established, the marker has moved back to $Mi$. So $S9.Mb2$ should transfer this subscriber to S10 (called, connected), whereas $S9.\overline{Mb2}$ should transfer this subscriber to S12 (to rest). Therefore:

$$S9.Mb2 = \text{go to } S10$$
$$S9.\overline{Mb2} = \text{go to } S12$$

When subscriber's state is S10 (called, connected) the next state can be S10, S11, or S12. When signal "$e$" is present (from marker indicating the breaking down of a connection), the subscriber should transfer to S12 (to rest). When signal "$e$" is not present we have two possibilities: Subscriber's line loop open ($\bar{h}$), subscriber should remain in S10. When subscriber's line loop is closed ($h$), the subscriber has apparently answered the call and should transfer to S11 (called party, having answered). Therefore:

$$S10.e = \text{go to } S12$$
$$S10.\bar{e}.\bar{h} = \text{go to } S10$$
$$S10.\bar{e}.h = \text{go to } S11$$

When the subscriber is in state S11 (called, having answered) he will remain in that state as long as "$e$" (from marker) does not exist. When "$e$" is present, however, (connection broken off), the subscriber should transfer to S12 (to rest). Therefore:

$$S11.\bar{e} = \text{go to } S11$$
$$S11.e = \text{go to } S12$$

When a subscriber is in S12, the next state always is S1 (rest). So:

$$S12 = \text{go to } S1$$

Having examined the conditions under which progressions from various subscriber states are made, this information will now be rearranged to establish the commands necessary to go to each of the 12 states. Clearly, this can be done with the aid of FIG. 18, connecting the conditions along the directed lines pointing toward a certain state with the Boolean "OR" connective. In this way the following is obtained:

Set $S1 = S12 + S1.\bar{h}.\bar{b}$
Set $S2 = S1.h.\bar{b} + S2.\bar{q}$
Set $S3 = S2.P5.q + S3.\bar{q}$
Set $S4 = S3.P5.q + S4(h.\overline{Mi} + \bar{h}.\bar{q})$
Set $S5 = S4.h.Mi + S5.Mb1.\bar{i}$
Set $S6 = S5.Mb2 + S6(\bar{q} + h)$
Set $S7 = S6.\bar{h}.q + S5.Mbi + S7(\overline{Mi} + h)$
Set $S8 = S7.Mi.\bar{h}$
Set $S9 = S1.b$
Set $S10 = S9.Mb2 + S10.\bar{h}.\bar{e}$
Set $S11 = S10.h.\bar{e} + S11.\bar{e}$
Set $S12 = S2.\overline{P5}.q + S3.\overline{P5}.q + S4.\bar{h}.q$
$\qquad + S8 + S9.\overline{Mb2} + S10.e + S11.e$ With the aid of the equations set S1–S12 and Table I the equations for Set P1–Set P4 can be developed. From examination of FIG. 18 and Table I, the following equations can be written:

set $P1 = $ set $S2 + $ set $S3 + $ set $S4 + $ set $S6 + $ set $S7 + $ set $S10 + $ set $S11$ and in a similar way:

set $P2 = $ set $S2 + $ set $S3 + $ set $S4 + $ set $S5 + $ set $S9$
set $P3 = $ set $S4 + $ set $S7 + $ set $S8 + $ set $S11$
set $P4 = $ set $S1 + $ set $S3 + $ set $S4 + $ set $S9 + $ set $S10 + $ set $S11$ Substituting the equations for Set S1–Set S12 into the righthand side of the above equations, one obtains, after some Boolean simplification:

set $P1 = S4.h.\overline{Mi} + (S10 + S11).\bar{e} + S4.\bar{h}.\bar{q} + S5.Mb1.i$
$\qquad + (S5 + S9).Mb2 + (S2 + S3).(P5 + \bar{q}) + S1.h.b$
$\qquad + S7.(\overline{Mi} + h) + S6$ set $P2 = S5.Mb1.\bar{i} + (S2 + S3).(P5 + \bar{q}) + S4(h + \bar{q})$
$\qquad + S1.(b + h)$ set $P3 = S3.P5.q + S4.(h.\overline{Mi} + \bar{h}.\bar{q}) + S5.Mb1.i + S6h.\bar{q}$
$\qquad + S7 + (S10.h + S11).\bar{e}$ set $P4 = S1.(b + \bar{h}) + S2.P5.q + S3(P5 + \bar{q}) + S4(h.\overline{Mi}$
$\qquad + \bar{h}.\bar{q}) + S9.Mb2 + (S10 + S11).\bar{e} + S12$ Remembering that S1–S12 are combinations of assertions and negations of P1–P4 which are available as inputs to the logical circuitry, it is clear that the above equations for set P1–set P4 can be generated in the logical network from the inputs that are provided for this network. The resulting signals may then be inverted to drive the inhibit drivers 1601–1616.

E3b. COMMANDS FOR THE TIMER

The commands for the flip-flops P6, P7, and P8 of the timer counter are:

Step to position 1 when a change in line loop condition is encountered, regardless of present position of counter.

When counter is in positions 1, 2, 3, 4, 5, 6, or 7, and there is no change in line loop condition, advance counter one step.

When the counter is in position 8 and there is no line loop change, leave counter in this position.

The counter may operate in any subscriber's state except S1. (If the counter were operating in S1, the change in line loop condition marking the transition from S1 to S2 of a subscriber would start the counter, and if the subscriber then does not start dialling within 112 milliseconds, the counter will reach state "7" which then will be misinterpreted as the interdigital pause.)

The "change in line loop" criterion is $(P5.\bar{h} + \overline{P5}.h)$, since P5 or $\overline{P5}$ indicates the line loop condition during the preceding cycle and $h$ or $\bar{h}$ indicates the present line loop condition. The "no-change in line loop" criterion is $(P5.h + \overline{P5}.\bar{h})$. The equations are as follows:

$\qquad$ counter position "1" $= C1 = P6.\overline{P7}.\overline{P8}$
$\qquad$ counter position "2" $= C2 = \overline{P6}.P7.\overline{P8}$
$\qquad$ counter position "3" $= C3 = P6.P7.\overline{P8}$
$\qquad$ counter position "4" $= C4 = \overline{P6}.\overline{P7}.P8$
$\qquad$ counter position "5" $= C5 = P6.\overline{P7}.P8$
$\qquad$ counter position "6" $= C6 = \overline{P6}.P7.P8$
$\qquad$ counter position "7" $= C7 = P6.P7.P8$
$\qquad$ counter position "8" $= C8 = \overline{P6}.\overline{P7}.\overline{P8}$ the above requirements can be written as:

$\qquad$ set $C1 = \overline{S1}.(\overline{P5}.h + P5.\bar{h})$
$\qquad$ set $C2 = \overline{S1}.(P5.h + \overline{P5}.\bar{h}).C1$
$\qquad$ set $C3 = \overline{S1}.(P5.h + \overline{P5}.\bar{h}).C2$
$\qquad$ set $C4 = \overline{S1}.(P5.h + \overline{P5}.\bar{h}).C3$
$\qquad$ set $C5 = \overline{S1}.(P5.h + \overline{P5}.\bar{h}).C4$
$\qquad$ set $C6 = \overline{S1}.(P5.h + \overline{P5}.\bar{h}).C5$
$\qquad$ set $C7 = \overline{S1}.(P5.h + \overline{P5}.\bar{h}).C6$
$\qquad$ set $C8 = \overline{S1}.(P5.h + \overline{P5}.\bar{h}).C7$ and from the definitions of C1–C8 it is found:

$\qquad$ set $P6 = $ set $C1 + $ set $C3 + $ set $C5 + $ set $C7$
$\qquad$ set $P7 = $ set $C2 + $ set $C3 + $ set $C6 + $ set $C7$
$\qquad$ set $P8 = $ set $C4 + $ set $C5 + $ set $C6 + $ set $C7$ and from this it is deduced:

set $P6 = \overline{S1}[(P5.\bar{h} + \overline{P5}.h) + (P5.h + \overline{P5}.\bar{h}).$
$\qquad (C2 + C4 + C6)]$
$\qquad = \overline{S1}.[(P5.\bar{h} + \overline{P5}.h) + C2 + C4 + C6]$
$\qquad = \overline{S1}.(P5.\bar{h} + \overline{P5}.h + \overline{P6}.P7.\overline{P8} + \overline{P6}.\overline{P7}.P8$
$\qquad + \overline{P6}.P7.P8)$ set $P6 = \overline{S1}.(P5.\bar{h} + \overline{P5}.h + \overline{P6}.P7 + \overline{P6}.P8)$ In a similar way it is found:

set $P7 = \overline{S1}.(P5.h + \overline{P5}.\overline{h}).(\overline{P6}.P7 + P6.\overline{P7})$ set $P8 = \overline{S1}.(P5.h + \overline{P5}.\overline{h}).(P6.P7.\overline{P8} + \overline{P6.P7}.P8)$ The "7" $(P6.P7.P8)$ condition of the counter will be referred to as $q$.

The combination $P5.q = P5.P6.P7.P8$. indicates a line loop that changed to the closed condition 112 milliseconds ago (end of first or second dial impulse trains).

The combination $\overline{P5}.q = \overline{P5}.P6.P7.P8$. indicates a line loop that changed to the interrupted" condition 112 milliseconds ago. This indicates the fact that the line loop has been interrupted for a longer period than can be expected in the case of dial impulses. It will be interpreted as the fact that a subscriber has replaced the handset of his telephone instrument.

E3c. COMMANDS FOR REGISTERS P9–P12 AND P13–P16

The commands to the register P9–P12 are (1) when a subscriber is in S2, digits P9–P12 add the received dial impulses of the first dialled digit, (2) when a subscriber is in S3, digits P9–P12 add the dial impulses of the second dialled digit, (3) when a subscriber is in S4, digits P9–P12 store the second dialled digit, and (4) when a subscriber is connected to the crosspoint network (states $S6 + S7 + S10 + S11$) digits P9–P12 contain routing information about this connection. This means that the set commands fall into three categories:

Re-write commands. These should be given when a subscriber is in $S4 + S6 + S7 + S10 + S11$ or when a subscriber is in $S2 + S3$ at the times that no new dial impulse is received. In addition, when a subscriber is ready to transfer from S2 to S3, re-write commands should not be given (contents of P9–P12 should be blanked out in order to start counting the second dial pulse train). These re-write conditions are indicated in the equations by R or R*.

In subscriber states $S2 + S3$, a "unit" should be added to the contents of P9–P12 when a dial impulse is received. This condition is designated as A. The signal $\overline{P5}.h$ at the end of a line loop interruption indicates the reception of a dial impulse. When the marker is establishing a connection, the calling party is in S5 and the called party is in S9. The "group" routing information from the marker $g1$–$g4$ should be introduced in P9–P12 of the calling and called parties; this information is introduced when the marker is in state Mb2, as indicated in the equations by T.

The terms associated with the "add one" commands can be found when it is remembered that the dialed digits are stored in binary code. For example, when A is true, P10 should be set if the present contents of the counter are "1", "2", "5", "6", or "9", since in the next cycle the counter should read "2", "3", "6", "7", or "10" respectively, all of which contain P10=1. The condition: present contents of counter is 1 or 2 or 5 or 6 or 9 and can be symbolized by the equation $P9.\overline{P10} + \overline{P9}.P10$ as can be verified by consideration of the binary code.

Similar considerations lead to the "add one" commands for P9, P11, P12.

The commands to the register P13–P16 are (1) when a subscriber is in state $S3 + S4$, digits P13–P16 contain information of the first dialled digit, and (2) when a subscriber is connected in the crosspoint network (states $S6 + S7 + S10 + S11$), digits P13–P16 contain information on the routing of this connection. The condition: This means that the commands for digits P9–P13 fall into three categories:

Rewrite that was already stored. This should happen in in subscriber's states $S3 + S4 + S6 + S7 + S10 + S11$.

At the time a subscriber transfers from S2 (dialling first digit) to S3 (dialling second digit) the first dialled digit which has been stored in P9–P12 should be transferred to P13–P16.

The signal: $S2.P5.q$ (end of first dial impulse train) is used to transfer a subscriber from S2 to S3. This signal can be used here to effect the transfer of the first dialled digit.

When the marker is establishing a connection, the calling party is in state S5 and the called party is in state S9. The routing information $c1$–$c4$ from marker should be introduced in P13–P16 of calling and called parties when marker is in state Mb2. Using auxiliary equations for add (A), rewrite (R or R*), and transfer ($t$) the commands for setting the register can be written:

$A = (S2 + S3).\overline{P5}.h$ is true $R = S4 + S6 + S7 + S10 + S11 + \overline{P5}.h(S2.\bar{q} + S3) + Mb2.S5$ $R^* = S3 + S4 + S6 + S7 + S10 + S11 + Mb2.S5$ $T = Mb1.\bar{i}.S5 + Mb2.S9$ set $P9 = R.P9 + T.g1 + A.\overline{P9}$ set $P10 = R.P10 + T.g2 + A.(\overline{P9}.P10 + P9.\overline{P10}$ set $P11 = R.P11 + T.g3 + A.(P9.P10.P11 + \overline{P9.P10.P11})$ set $P12 = R.P12 + T.g4 + A.(P9.P10.P11 + P12)$ set $P13 = R^*.P13 + T.c1 + (S2.P5.q).P9$ set $P14 = R^*.P14 + T.c2 + (S2.P5.q).P10$ set $P15 = R^*.P15 + T.c3 + (S2.P5.q).P11$ set $P16 = R^*.P16 + T.c4 + (S2.P5.q).P12$

F. MARKER

The marker consists of a number of logical circuits and of a number of memory registers (flip-flops). The marker can assume the following four states:

$Mi$ = marker idle
$Mb1$ = marker performing busy test on called party and making a routing decision for a call.
$Mb2$ = establishing a connection
$Mb3$ = terminating a connection The marker is set to Mb1 when the marker is idle, and a subscriber state S4 (dialling completed) is read-out in the memory, and that same subscriber has presently a closed line loop ($h$). At the same time the marker is set to Mb1, the calling subscriber now being served by the marker is transferred from S4 to S5. Also, at this time, the identification numbers of calling and called parties are inscribed in the marker memory.

The marker remains in the Mb1 state for a full cycle of 100 time slots. During this time the marker makes a busy test on the called party and tries to find a free path in the crosspoint switching network from calling to called party. When either of these tests is not successful, the marker internally generates the signal "$i$" (impossible). At the end of the cycle, which is evidenced by the read-out in the core memory of a subscriber in state S5, the marker will either revert to idle when the connection cannot be made or proceed to Mb2 when the connection can be made. The Mb2 cycle persists for another 100 time slots, during which the link-markers in the connection network are activated. At the end of this cycle, again evidenced by the read-out of the subscriber in S5, the junctor over which the connection has been routed is fired, establishing the connection, and the marker is reset to the Mi state.

The marker is set from Mi to Mb3 when the central memory reads out a subscriber signalling to be disconnected ($S7.\bar{h}$). At the same time this subscriber is transferred to state S8. The marker stays in Mb3 for a full cycle, being reset to Mi when the central memory reads out a subscriber in S8. During the time that the marker is in Mb3, the connection is terminated and the called subscriber is moved from S10 or S11 to S1 (idle).

F1. *Marker State Sequences and Indications*

In the marker, two flip-flops MF–1 and MF–2 indicate the marker states as follows:

| State | MF-1 | MF-2 |
|---|---|---|
| M$i$ | 0 | 0 |
| M$b1$ | 1 | 0 |
| M$b2$ | 1 | 1 |
| M$b3$ | 0 | 1 |

The marker state sequences are shown by the flow chart in FIG. 19.

Set $Mb1=S4.h.Mi$
Set $Mb2=S5.\bar{i}.Mb1$
Set $Mb3=S7.\bar{h}.Mi$
Set $Mi=S5.Mb1.i+S5.Mb2+S8.Mb3$ and from this follows:

Set $MF-1=S4.h.Mi$
Set $MF-2=Mb1.S5.\bar{i}+S7.\bar{h}.Mi$
Reset $MF-1=Mb1.S5.i+Mb2.S5$
Reset $MF-2=Mb2.S5+Mb3.S8$ FIGURE 20 shows the circuitry for establishing the marker states. As was mentioned in Section E, the marker memory elements are only to change state at the intervals #12. Gated pulse amplifier 2011 gates the impulse train TP–1 from the distributor by a signal representing interval #12 of each time slot. The resulting impulse train TP–12 consists of impulses recurring once in every time slot at the end of interval #12. The TP–12 impulse train triggers the memory elements of the marker.

Flip-flops MF–1 and MF–2 are set to state 1 by applying the appropriate D.C. "set" commands to the D.C. "set" inputs and applying TP–12 to the "trigger-set" inputs. (The "D.C." commands are generated within the logical network of the marker, using both internal marker quantities such as M$i$, M$b1$, etc., and quantities generated in the logical network of the common control equipment such as S4, S7, etc.) in accordance with the equations given above.

To reset flip-flops MF–1 and MF–2, a slightly different procedure is adopted. Gated pulse amplifier 2012 receives on its impulse input the impulse train TP–12 and on its gating input the signal MR as follows:

$MR=Mb1.S5.i+Mb2.S5+Mb3.S8$

This covers all conditions in which the marker has to return to M$i$. Consequently, the output of gated pulse amplifier 2012 is an impulse MRP (marker-reset-pulse), appearing in interval #12 every time the marker is to be reset. This impulse is fed to the reset-trigger inputs of flip-flops MF–1 and MF–2. These flip-flops have on their D.C. reset inputs their own "state-1" signals. In this way, when the marker is to be reset to "idle," MRP exists and resets MF–1 and/or MF–2, whichever is in state 1. The marker reset pulse MRP is used to reset other marker flip-flops as well.

In addition to MRP, a marker set pulse MSP is generated. Gated pulse amplifier 2013 which receives TP–12 on its pulse input, receives on its gating input a signal MS as follows:

$MS=S4.h.Mi+S7.h.Mi$

This represents all conditions under which the marker must move out of M$i$. The resulting impulse MSP appears in interval #12 whenever the marker is to move out of state M$i$.

F2. *Marker Memory*

The marker memory consists of the flip-flops N1–N16. These flip-flops store the identification numbers of the calling and the called party when a connection is to be established. When a connection is to be broken off, N9–N16 stores the routing information of the connection to be terminated.

FIG. 21 shows that each time the marker leaves M$i$ (idle) the information of distributor flip-flops D5–D12 is transferred to N1–N8 by means of impulse MSP. At the same time, the information in flip-flops P9–P16 of the control equipment is transferred to N9–N16, also by means of MSP. This information remains in the N flip-flops until the marker reverts to M$i$. At that moment the marker reset pulse MRP resets all N flip-flops that were in state 1 (and therefore carry signals on their D.C. reset inputs) thereby erasing the marker memory.

When the marker moves out of M$i$, N1–N4 assume states corresponding to those of D5–D8. This means that N1–N4 store in binary code the "units" identification of the subscriber who is addressed at that moment, and who is in S4 or S7. Therefore, N1–N4 store the units number of the originating subscriber.

N5–N8 assume states corresponding to those of D9–D12 which indicate the "tens" identification number of the subscriber who is addressed at that time (i.e. the originating subscriber).

N9–N12 assume states corresponding to those of P9–P12. When the marker is moving to M$b$ (because addressed subscriber shows state S4), P9–P12 contain in binary code the "units" identification number of the called (receiving) party. On the other hand, when marker moves to M$b3$ (because addressed subscriber shows S7) P9–P12 contain the "group" routing (designation of XG switch) over which the connection to be terminated is running.

N13–N16 assume the states corresponding to those of P13–P16. When marker moves to M$b1$ (addressed party in S4) P13–P16 contain the "choice" routing (designation of XC switch) over which the conversation to be terminated is running. The designations of the XG and XC switches are coded as shown in Table III.

TABLE III

|  | P9 | P10 | P11 | P12 |
|---|---|---|---|---|
| Group 1 | 1 | 0 | 0 | 0 |
| Group 2 | 0 | 1 | 0 | 0 |
| Group 3 | 0 | 0 | 1 | 0 |
| Group 4 | 0 | 0 | 0 | 1 |
| Group 5 | 0 | 0 | 0 | 0 |

|  | P13 | P14 | P15 | P16 |
|---|---|---|---|---|
| Choice 1 | 1 | 0 | 0 | 0 |
| Choice 2 | 0 | 1 | 0 | 0 |
| Choice 3 | 0 | 0 | 1 | 0 |
| Choice 4 | 0 | 0 | 0 | 1 |
| Choice 5 | 0 | 0 | 0 | 0 |

F3. *Party Signals*

The logical networks in the marker compare the information stored in flip-flops N1–N16 with information from other parts of the system and generate tens and units parity signals. When the distributor is addressing subscribers of the same tens group as the calling subscriber whose tens identification is stored in flip-flops N5–N8, a parity originating tens signal POT is generated. This signal means that the states of flip-flops N5 and D9, the states of N6 and D10, the states of N7 and D11, and the states of N8 and D12 coincide. When the distributor is addressing subscribers of the same tens group as the called subscriber whose tens identification is stored in flip-flops N13–N16 a parity receiving tens signal PRT is generated; meaning that the states of flip-flops D9–D12 coincide with the states of the respective ones of the flip-flops N13–N16. When this distributor is addressing subscribers of the same units group as the called subscriber whose units identification is stored in flip-flops N9–N12, a parity receiving units signal PRU is generated; meaning that the states of flip-flops D5–D8 coincide respectively with the states of flip-flops N9–N12. When the marker is in state $Mb3$ and the routing information stored in flip-flops N9–N16 coincide respectively with the routing information of a subscriber read-out from flip-flops P9–P16, a parity groups/choice signal PGC is generated. With the method of coding used, the Boolian algebra equations for the parity signals are as follows:

$POT = (N5.d9 + \overline{N5}.\overline{d9}).(n6.d10 + \overline{n6}.\overline{d10}).(n7.d11 + \overline{n7}.\overline{d11}).(n8.d12 + \overline{n8}.\overline{d12})$ $PRT = (n13.d9 + \overline{n13}.\overline{d9}).(n14.d10 + \overline{n14}\overline{d10}).(\overline{n15}.d11 + \overline{n15}.d11).(n16.d12 + \overline{n16}.\overline{d12})$ $PRU = (n9.d5 + \overline{n9}.\overline{d5}).(n10.d6 + \overline{n10}.\overline{d6}).(n11.d7 + \overline{n11}.\overline{d7}).(n12.d8 + \overline{n12}.\overline{d8})$ $PGC = (P9.n9 + \overline{P10}.\overline{n10} + P11.n11 + P12.n12 + \overline{P9}.\overline{P10}.\overline{P11}.\overline{P12}.\overline{n9}.\overline{n10}.\overline{n11}.\overline{n12}).(P13.n13 + P14.n14 + P15.n15 + P16.n16 + \overline{13}.\overline{P14}\overline{P15}.\overline{P16}.\overline{n13}.\overline{n14}.\overline{n15}.\overline{n16})$

F4. *Marker Busy Test*

While in $Mb1$ the marker performs a busy test by generating a signal "$b$" in the time slot of the called (receiving) party:

$$b = Mb1.PRT.PRU$$

The signal "$b$" is used to transfer a subscriber from S1 to S9. In addition, $b$ is used in the marker to set the busy flip-flop BY when the party addressed at the time $b=1$ is not available as a called party (S1). To this end, the signal $$\text{Set } BY = \overline{S1}.b$$

is used as the "set" command for the flip-flop BY. FIG. 20 shows the connections for the flip-flop BY. When the marker reverts to $Mi$ the flip-flop BY is reset by means of impulse MRP (marker reset pulse).

F5. *Disconnect Called Party Identification Signal*

When the marker is in $Mb3$ (terminating connection) a signal $e$ is generated when the distributor addresses the subscriber whose routing information coincides with the routing information (in N9–N16) of the connection to be termintaed. This signal $e$ is then used in the logical network of the control equipment to change the state of the called subscriber (S10 or S11) to S12 (erase).

$$e = Mb3.PGC.(S10 + S11)$$

It is necessary to add $(S10 + S11)$ to this equation, to be sure that the information in P9–P16 is indeed a routing information and not a number of a called party (as is the case when the addressed subscriber is in S2, S3 or S4).

F6. *Group and Choice Registers*

During $Mb1$ the marker gathers information necessary for a routing decision on a connection to be established. Part of this information answers the two questions: (1) What XG switches can be reached by the calling (originating) subscriber?, and (2) What XC switches can be reached by the called (receiving) subscriber?

The marker contains the flip-flops $G*1$–$G*5$ and $C*1$–$C*5$. During the $Mb1$ cycle the marker will set to state 1 those flip-flops $G*$ and $C*$ corresponding to the XG and XC switches in the crosspoint network which cannot be used for the connection to be established. With reference to FIG. 2, it can be seen that, for example, XG–3 cannot be used for a calling party in tens group 2 when another subscriber in this tens group already has originated a connection via this XG switch, thereby occupying the only La link (La23) from XA–2 to XG–3.

In a similar way, a certain XC switch cannot be reached by a called (receiving) party when another subscriber in the same tens group already receives a conversation via that XC switch. Clearly, the marker should test all subscribers in the same tens group as the originating subscriber and when it finds subscribers within this group to be calling subscribers $(S6 + S7)$ should set to 1 the $G*$ flip-flops corresponding to the group routing $(P9-P12)$ information of those subscribers. It should also test all subscribers in the same tens group as the called subscriber, and when it finds subscribers in this group to be called subscribers $(S10 + S11)$ it should set to 1 the $C*$ flip-flops corresponding to the choice routing information $(P13-P16)$ of those subscribers.

FIG. 22 shows the command arrangement for the flip-flops. The D.C. set inputs are connected to outputs of the P flip-flops P9–P12 in the control equipment, according to the routing code discussed in Section F2.

The "set" trigger for the $G*$ flip-flops is an impulse GSP, generated in gated pulse amplifier 2211. GSP exists when, during the $Mb1$ marker cycle, a party in the same tens group as the calling party to be connected (POT) is found to be an originating party $(S6 + S7)$. The gating input of amplifier 2211 is:

$$GS = Mb1.(S6 + S7).POT$$

In a similar manner, the $C*$ flip-flops receive a trigger set impulse CSP, generated by gated pulse amplifier 2212. This impulse exists when, during marker cycle $Mb1$, a subscriber in the same tens group as the called party to be connected (PRT) is found to be a called party $(S10 + S11)$. The gating input of amplifier 2212 is:

$$CS = Mb1.(S10 + S11).PRT$$

Whatever $G*$ and $C*$ flip-flops have been set to state 1 during the $Mb1$ marker cycle, will be reset when the marker reverts to idle $(Mi)$, by means of MRP.

F7. *Pathfinder*

The pathfinder determines whether routes are available for a certain conversation and selects one of the available routes. With reference to FIG. 2, it can be seen that for a given route to be avilable, the junctor must be available, the group switch XG can be reached from the XA switch to which the calling party is connected, and the choice switch XC can be reached from the XD switch to which the called party is connected. In the discussion on the marker it was explained that during the complete cycle the marker is in state $Mb1$, a group flip-flop is set to state 1 when it is found that an outgoing call by a subscriber in the same tens group as the calling party to be connected runs over the corresponding XG switch, thereby making this switch unavailable for the new conversation. In the same manner, a choice flip-flop is set to state 1 when it is found that the called party cannot be reached via the corresponding XC switch because of other established connections.

Three sets of input signals are fed into the pathfinder:

(1) $\overline{j11}-\overline{j55}$, the 0 outputs of the junctor (J) flip-flops in the connecting network. When the 0 output of a junctor (J) flip-flop is true, indicating that the flip-flop is in the state 0, the junctor is free.

(2) $\overline{g1}*-\overline{g5}*$, the 0 outputs of the group $(G*)$ flip-flops in the marker. When the 0 output of a group flip-flop is true, indicating that the flip-flop is in state 0, the corresponding group switch XG is available for the connection to be established.

(3) $\overline{c1}*-\overline{c5}*$, the 0 outputs of the choice $(C*)$ flip-flops in the marker. When the 0 output of a choice flip-flop is true, indicating that the flip-flop is in state 0, the corresponding choice switch XC is available for the connection.

At the end of the $Mb1$ marker cycle, the group $(G*)$ and choice $(C*)$ flip-flops have been set as necessary and since the signals from the junctor (J) flip-flops are available also, the pathfinder can make a routing decision.

There are 11 pathfinder outputs, $g1-g5$, $c1-c5$, and NoGo. When a free route has been found, one of the $g$ outputs and one of the $c$ outputs has a signal. When, for example, the route via XG3 and XC5 is chosen, an output signal appears on g3 and c5. When no route can be found only the NoGo output carries a signal.

Within the pathfinder a number of intermediate quantities are generated, indicating which routes are available. These quantities are identified by the symbol "$r$" followed by the number of a group switch and then the number of a choice switch. The general equation is:

$$rxy = \overline{g^*x}.jxy.\overline{c^*y}$$

where $x$ and $y$ can each have any value from 1 to 5. When the quantity $r$ equals 1, it means that the corresponding path is available. For example, $r15=1$ means that the path via switches XG1 and XC5 is available.

With the aid of these intermediate quantities the pathfinder outputs are formed as follows:

$g1 = (r11+r12+r13+r14+r15)$
$g2 = \overline{g1}.(r21+r22+r23+r24+r25)$
$g3 = \overline{g1}.\overline{g2}.(r31+r32+r33+r34+r35)$
$g4 = \overline{g1}.\overline{g2}.\overline{g3}.(r41+r42+r43+r44+r45)$
$g5 = \overline{g1}.\overline{g2}.\overline{g3}.\overline{g4}.(r51+r52+r53+r54+r55)$
$c1 = (g1.r11+g2.r21+g3.r31+g4.r41+g5.r51)$
$c2 = \overline{c1}(g1.r12+g2.r22+g3.r32+g4.r42+g5.r52)$
$c3 = \overline{c1}.\overline{c2}(g1.r13+g2.r23+g3.r33+g4.r43+g5.r53)$
$c4 = \overline{c1}.\overline{c2}.\overline{c3}(g1.r14+g2.r24+g3.r34+g4.r44+g5.r54)$
$c5 = \overline{c1}.\overline{c2}.\overline{c3}.\overline{c4}(g1.r15+g2.r25+g3.r35+g4.r45+g5.r55)$
$NoGo = \overline{g1}.\overline{g2}.\overline{g3}.\overline{g4}.\overline{g5}$ From these equations it can be seen that:

$g1=1$ means that at least one path via XG1 is available.
$g2=1$ means that no path via XG1 is available, but at least one path via XG2 is available.
$g5=1$ means that no paths via XG1 or XG3 or XG4 are available, but at least one path via XG5 is available.

In this manner the pathfinder selects the lowest indexed XG switch through which a path is available. Note that because of the construction of the equations, not more than one of the $g$ outputs can carry a signal at any one time. For instance, if $g3=1$, then $g1$, $g2$, $g4$, and $g5$ each equals 0.

The expressions for $c1$–$c5$ can best be studied with the aid of a specific example. Assume that output $g3$ carries a signal. This means that none of the routes $r11$–$r15$, $r21$–$r25$ are available and that at least one route of the group $r31$–$r35$ is available. In this case ($g3=1$, $g1=g2=g4=g5=0$) and the expressions for $c1$–$c5$ simplify to:

$c1 = r31$ (6a)
$c2 = \overline{c1}.r32 = \overline{r31}.r32$ (7a)
$c3 = \overline{c1}.\overline{c2}.r33 = \overline{r31}.\overline{r32}.r33$ (8a)
$c4 = \overline{c1}.\overline{c2}.\overline{c3}.r34 = \overline{r31}.\overline{r32}.\overline{r33}.r34$ (9a)
$c5 = \overline{c1}.\overline{c2}.\overline{c3}.\overline{c4}.r35 = \overline{r31}.\overline{r32}.\overline{r33}.\overline{r34}.r35$ (10a)

This means that:

$c1$ has a signal if the "first choice" route in the third group ($r31$) is available.

$c2$ has a signal when the "second choice" route in the third group ($r32$ is available and $r31$ is not available).

$c5$ has a signal when the "fifth choice" route in the third group ($r35$) is available and $r31$–$r34$ are not available.

In this manner, it can be seen that having made a group selection, the pathfinder then selects the lowest indexed available choice route within this group and produces a signal on one of its outputs $c1$–$c5$ according to this selection.

When no free route can be found, none of the outputs $g1$–$g5$ carries a signal. In that case, the output $NoGo = \overline{g1}.\overline{g2}.\overline{g3}.\overline{g4}.\overline{g5}$ carries a signal. This signal is used in the marker state logic.

F8. *Connection Impossible Signal*

At the end of the M$b1$ cycle information is available as to whether the connection can be established. When at the end of the M$b1$ cycle (indicated by read-out of a subscriber in state S5) the signal "$i$" (impossible) exists, the connection cannot be made and the marker moves back to M$i$. Absence of "$i$" at the time M$b1$.S5 makes the marker move to M$b2$, establishing the connection.

The signal $i=1$ is produced when sometime during M$b1$ the "busy" flip-flop BY has been set to state 1, indicating called party busy, or when the pathfinder shows that no free route is available (NoGo=1); or when the calling party has dialled his own number, as is evidenced by the coincidence of signal $b$ (generated in called party time slot) and signal S5 (read-out of calling party being served by marker). Summarizing:

$$i = by + \text{NoGo} + S5.b$$

This signal is generated in a logical network within the marker.

F9. *Commands to Link Markers*

As shown in FIG. 3 each of the link markers has two inputs. One of the inputs to all of the link-markers is M$b2$, which indicates when it is to be activated; and the other input, which is different for each link-marker, indicates which of them is to be activated. Any link-marker is only activated when signals appear on both inputs in coincidence. FIG. 23 shows in block diagram a portion of the logic of marker 118 for obtaining the individual link-marker input signals. Each of the logic units 1911, 1912, 1913, and 1914 is a simple translation matrix for translating binary codes into a one-out-of-ten signal. Matrix 1911 translates the calling units identification stored in flip-flops N1–N4 to a signal on one of the leads $ou$–1 to $ou$–0, matrix 1912 translates the calling tens identification stored in flip-flops N5–N8 to a signal on one of the leads $ot$–1 to $ot$–0, matrix 1913 translates the called units identification stored in flip-flops N9–N12 into a signal on one of the leads $ru$–1 to $ru$–0, and matrix 1914 translates the called tens identification stored in N13–N16 into a signal on one of the leads $rt$–1 to $rt$–0. Logic unit 1920 produces the signals $g1$–$g5$ and $c1$–$c5$, as well as the signal NoGo as indicated by the equations in the description of the pathfinder. These signals $g1$–$g5$ and $c1$–$c5$ are used in the marker for finding an available path, and are also supplied to the link-markers.

F10. *Commands to the Junctor Flip-Flops*

The input commands to the J and R flip-flops associated with the junctors are shown in FIG. 24. The commands as to which junctor to operate always is taken from the routing information in P9–P16. To this end, the D.C. set and D.C. reset inputs of both R and J flip-flops in each junctor are tied together from an input JM. For instance:

Set $J23$ = reset $J23$ = set $R23$ = reset $R23$ = $JM23$ = $P10.P15$

The commands when to set or reset J or R flip-flops are introduced in the form of trigger impulses from gated pulse amplifiers.

When a connection to be established can be made, the marker moves from M$b1$ to M$b2$. During the M$b2$ cycle the chosen L$c$, L$a$, L$b$, and L$d$ links are marked. At the end of the M$b2$ cycle, evidenced by the read-out of a subscriber in $S5$, the junctor effectively is set to busy. First, in interval #4, the R flip-flop is set to state 1, this fires the connection; next in interval #12 the J flip-flop also is set to state 1. This sequence is necessary because the junctor has to be fired before the link-marking signals disappear, and since the 1 outputs of the J flip-flops are used as inputs for the pathfinder, setting the J flip-flops destroys the routing information of the pathfinder. This is overcome in the present arrangement by first setting the R flip-flop, and only setting the J flip-flop when the connection in the switching network has been established.

Gated pulse amplifier 2402 generates the "set R" impulse SRP. To this end it receives the impulse train TP-1, and a gating signal $$SR = Mb2.S5.\#4$$

In this way SRP appears in interval #4 of the last time slot of the $Mb2$ cycle($Mbs.S5$). Gated pulse amplifier 2403 generates the "set J" impulse SJP. It receives the impulse train TP-12 and a gating signal $$SJ = Mb2.S5$$

In this way SJP appears in interval #12 of the last time slot in the $Mb2$ cycle ($Mbs.S5$). Gated pulse amplifier 2404 generates the "reset J" impulse RJP. It receives the impulse train TP-12 and a gating signal $$RJ = S7.h.Mi$$

In this way RJP appears when a connection is to be broken off. Gated pulse amplifier 2401 generates the "reset R" impulse RRP. It receives the impulse train TP-12 and a gating signal $$RR = S7.\bar{h}.Mi + S10.h$$

In this way RRP appears when a connection has to be broken down or when a called subscriber has answered ($S10.h$), resetting the R flip-flop.

G. SEQUENCE FOR ESTABLISHING CONNECTION

Figure 29:
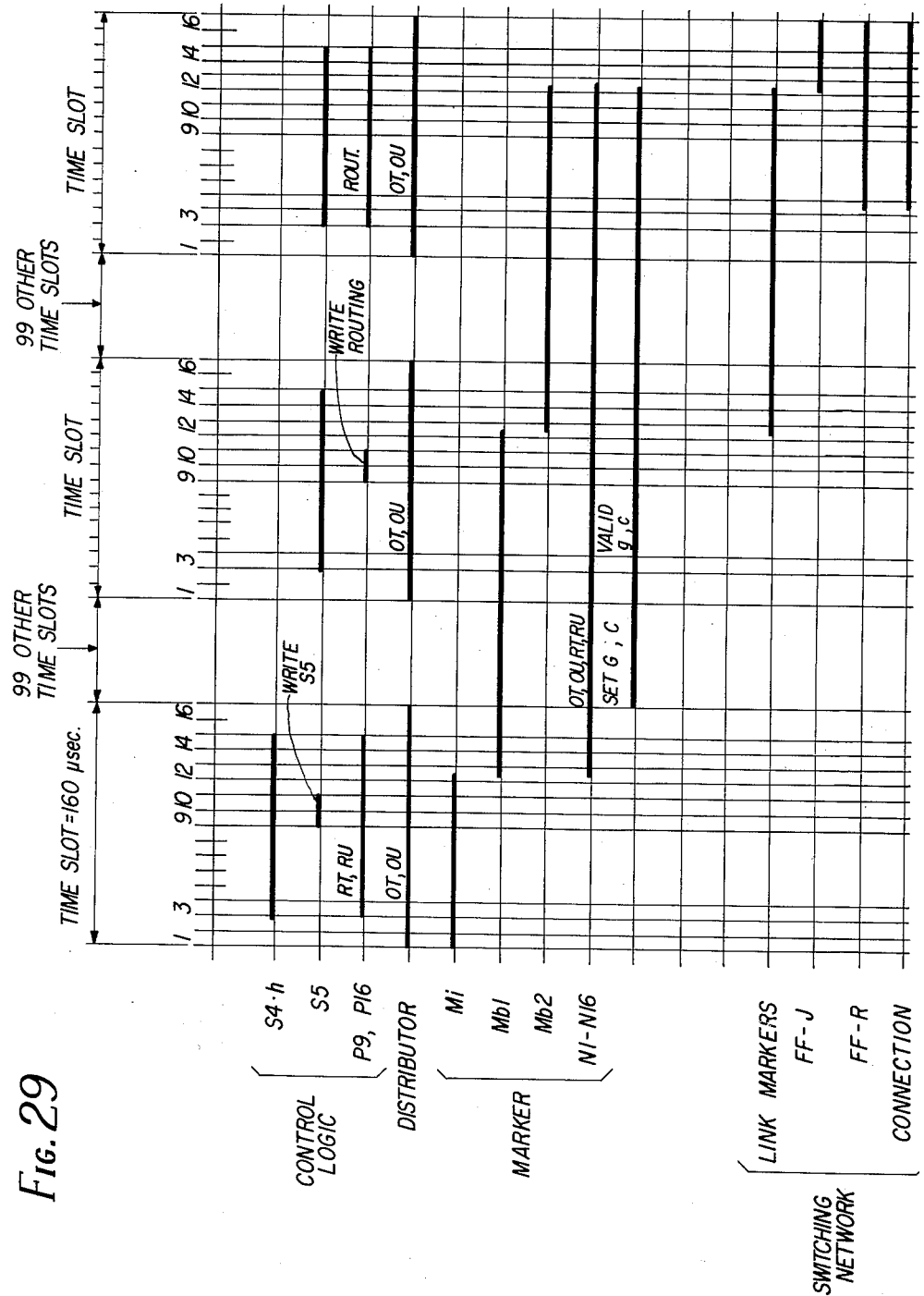

FIG. 29 represents a time sequence chart of the various parts in the system for the case of a connection that can be established. The calling subscriber's time slot is shown three times.

During the first occurrence of the calling party's time slot, the condition $S4.h$ (in P1–P5) signals a calling party waiting to be served by marker. The distributor shows the number of the party that is addressed (D5–D12), in other words, it shows the originating (calling) tens and units information. Flip-flops P9–P16 show the tens and units information of the called party. The marker is idle ($Mi$). At the "write" time (#9+#10) of the control equipment, the information $S4.h.Mi$ writes S5 into the memory location of the calling party. At the "write" time of the marker, $S4.h.Mi$ sets marker to $Mb1$, and transfers tens and units information of calling party (in distributor) and called party (in P9–P16) to marker memory flip-flops N1–N16.

During the second occurrence of the calling party's time slot, the read-out S5 shows that the distributor addresses the party being served by marker the marker is in $Mb1$ and we assume, in addition, that the connection can be made. Signal "$i$" does not exist. The pathfinder shows the valid routing ($g$ and $c$). At the "write" time of the control equipment, S5 is rewritten in the memory location of calling party (in positions P1–P4); the $g$ and $c$ information is written (in positions P9–P16). At the "write" time of the marker (#12), $Mb1.S5.\bar{i}$ sets marker to $Mb2$. This activates the link markers LMOT, LMOU, LMG, LMC, LMRT, LMRU who receive their information from N1–N16 (OT, OUT, RT, RU) and from pathfinder ($g$ and $c$).

During the third occurrence of calling party's time slot, read-out S5 shows that the distributor addresses the party being served by marker. The marker is in $Mb2$. The routing is shown in flip-flops P9–P16. At interval #4 the appropriate FF—R is set to state 1 (with routing information from P9–P16). This establishes the connection. At the "write" time of the control equipment, the subscriber's state is modified to S6, the routing information is rewritten in P9–P16. At the "write" time for the marker (#12) the appropriate junctor flip-flop (J) is set to state 1 (with routing information from P9–P16). The condition $S5.Mb2$ resets the marker to $Mi$, erasing N1–N16, G*1–G*5, C*1–C*5.

H. ALTERNATIVE EMBODIMENT

FIGS. 30 to 43 inclusive, arranged as shown in FIG. 45, comprise a functional block diagram of an alternative embodiment, showing the control unit 116 and marker 118.

In this embodiment of the invention the arrangement is such that in the cores of memory 114, the switched state of each core is designated as state 0, and the unswitched state is designated as state 1. Thus in the #10 interval of each time slot, the cores that receive write currents on both the tens and units access windings and no current in the inhibit winding will be switched; and the resulting state is designated as state 0. During the same interval the cores which have current flowing in the inhibit winding will not be switched; and this resulting state is designated state 1. This means that during the read interval #3 of each time slot, the cores which receive current on both the tens and units access windings will be switched from state 0 to state 1, and will produce an output pulse which is amplified by the respective sense winding amplifiers. The outputs from the sense winding amplifiers are supplied through the flip-flops P1–P16, so that for those amplifiers which supply output pulses, the corresponding ones of the flip-flops will be set to state 0. Then during the reset interval #14, all of the flip-flops P1–P16 are set to the state 1. However, the flip-flop FF—H is set 1 by pulses from the highway H, and reset to state 0 by the pulse #14. Since with this arrangement those inhibit drivers are activated which correspond to memory planes in which the cores are to be in state 1, the signals supplied from the logic of the control unit to the inhibit drivers are "set" signals rather than inhibit signals. These signals Set P1–Set P16 to the inhibit drivers are shown in FIGS. 31, 32, 33 and 35.

In the drawings, generally the control unit 116 is shown in FIGS. 30–35 inclusive; and the marker 118 is shown in FIGS. 36–43 inclusive. These figures show the flip-flops and the logic circuit by functional block diagrams. For most of the logic circuits NOR gates are used, represented herein by trapezoids. In some cases OR gates designated by a diagonal line within the block, and AND gates designated by a vertical line adjacent the output side of the block, have been used. The logic represented by these circuits is substantially the same as that represented by the equations given for the principal embodiment, although some minor variations have been introduced. Some of the logic given by the equations in Section E for a control unit 116 correspond to gate circuits shown in the marker, FIGS. 36–43; and some of the equations given in Section F for the marker correspond to gates in the control units FIGS. 30–35.

Figure 30:
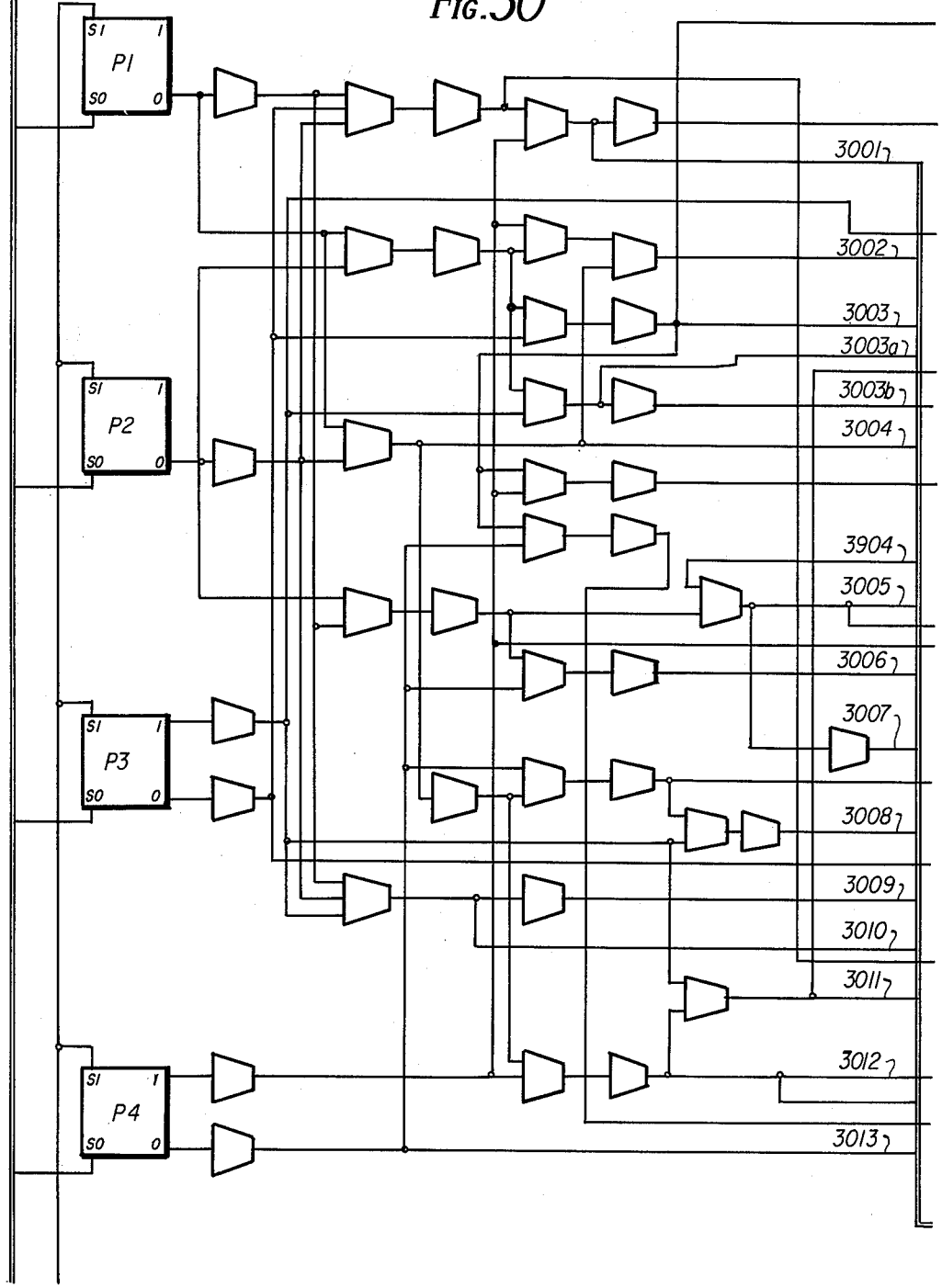
Figure 31:
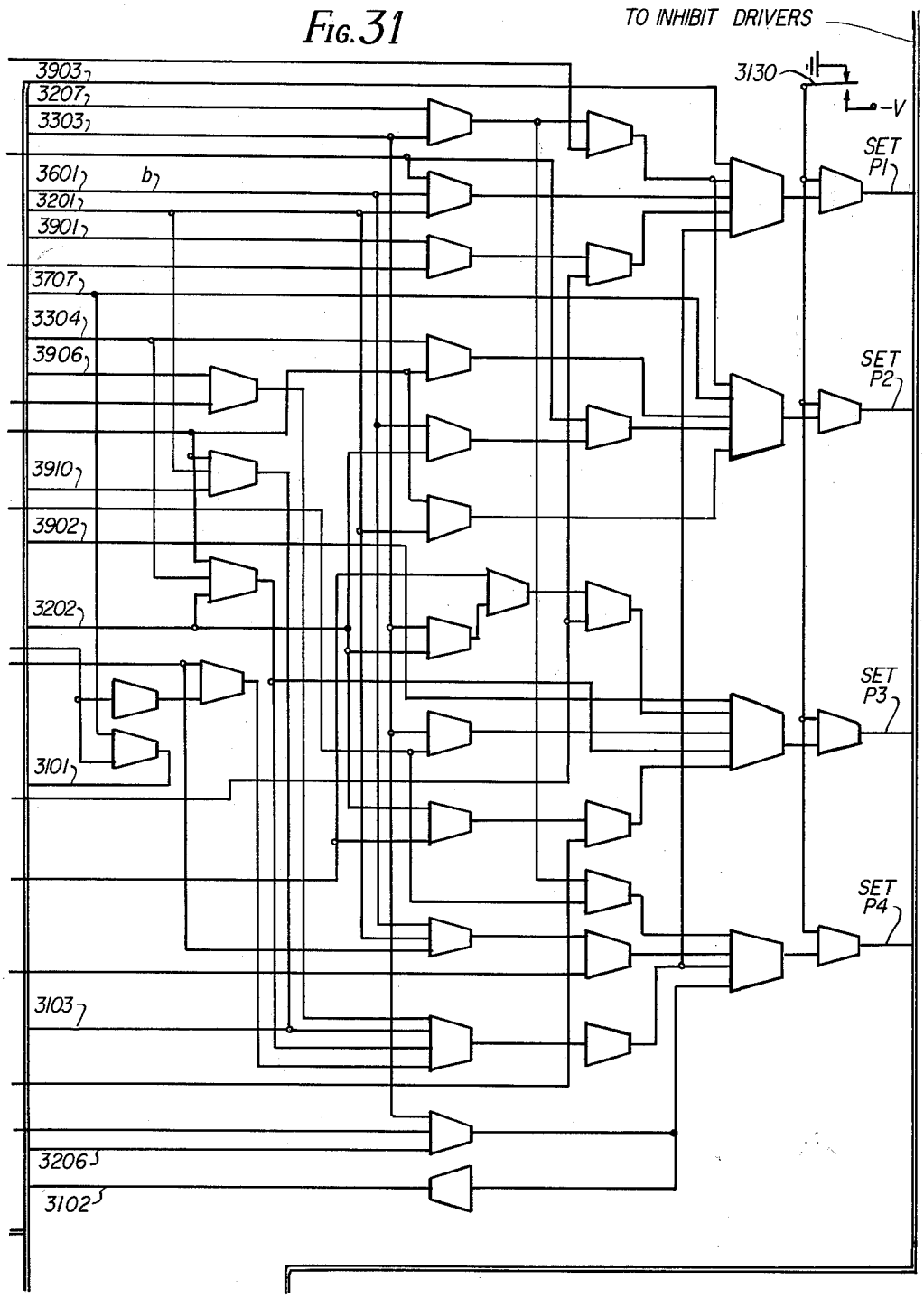
Figure 32:
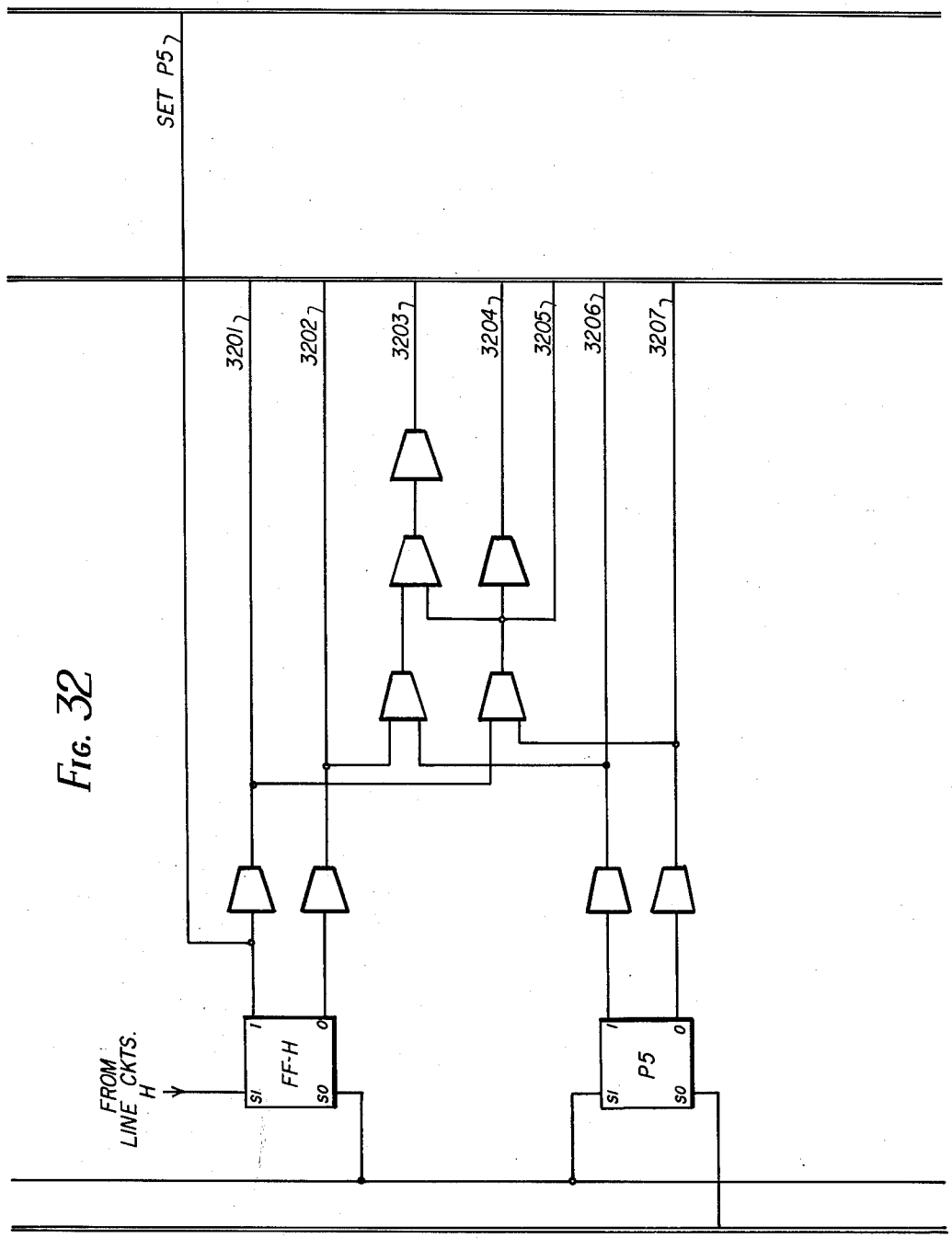
Figure 33:
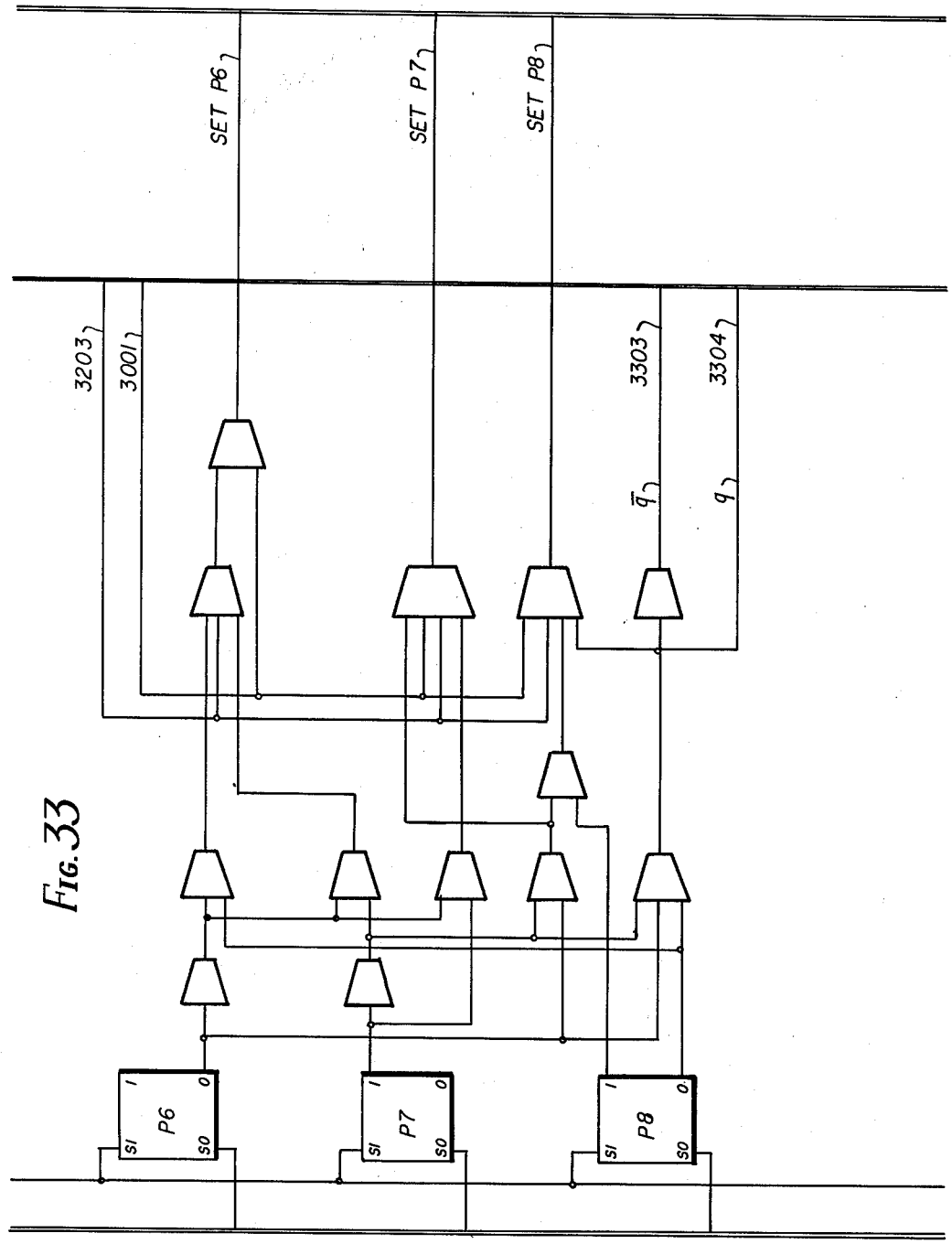
Figure 34:
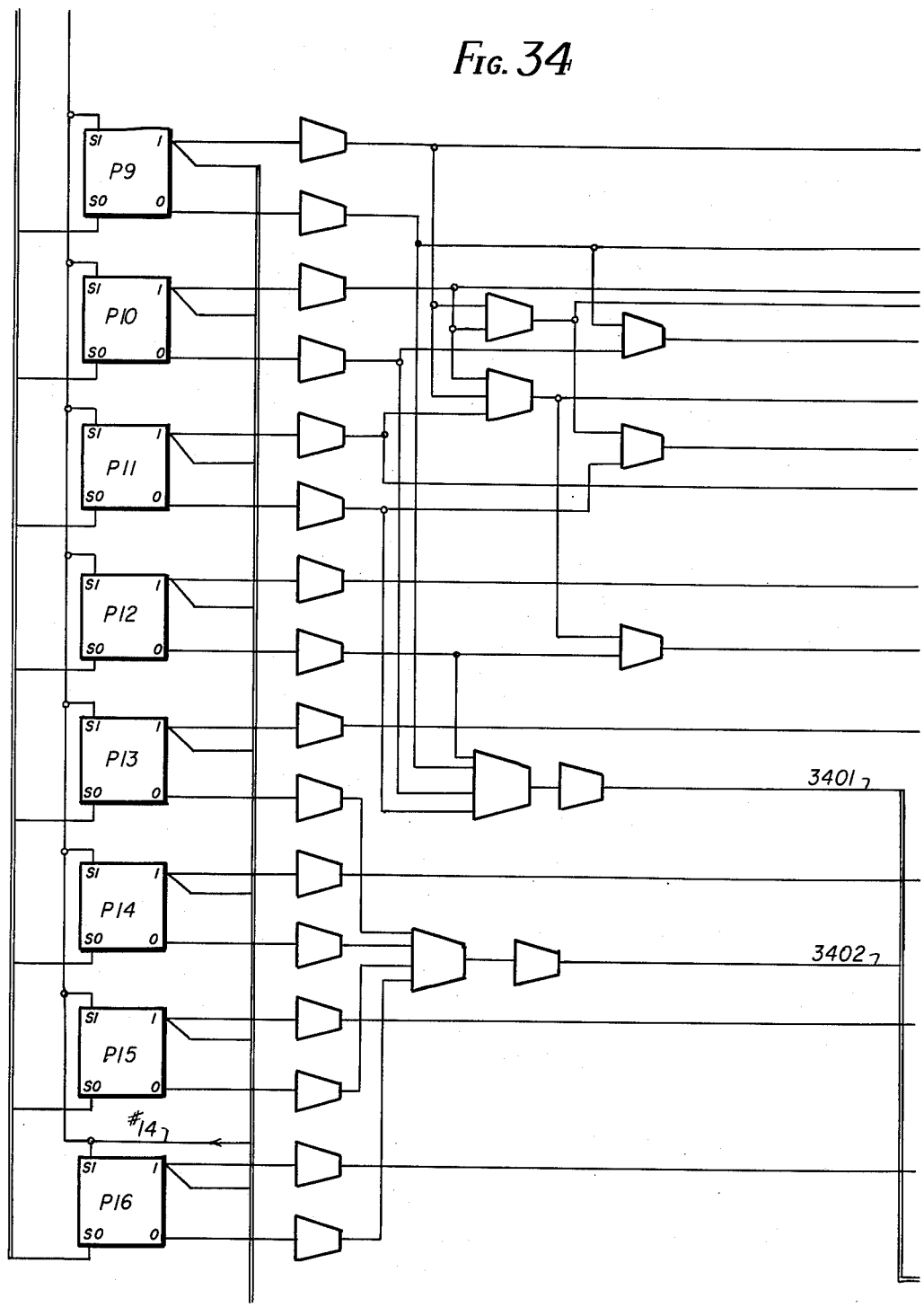
Figure 35:
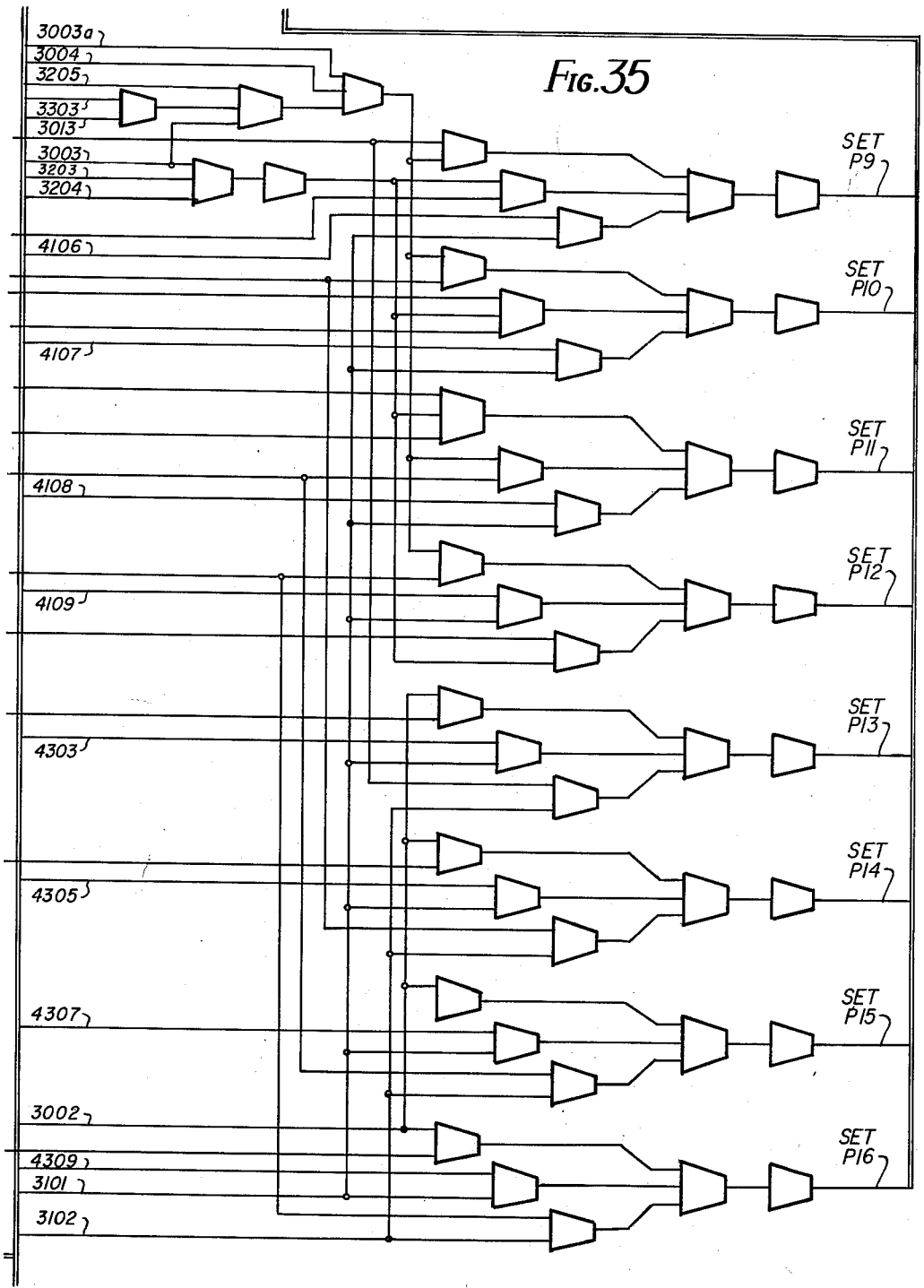
Figure 36:
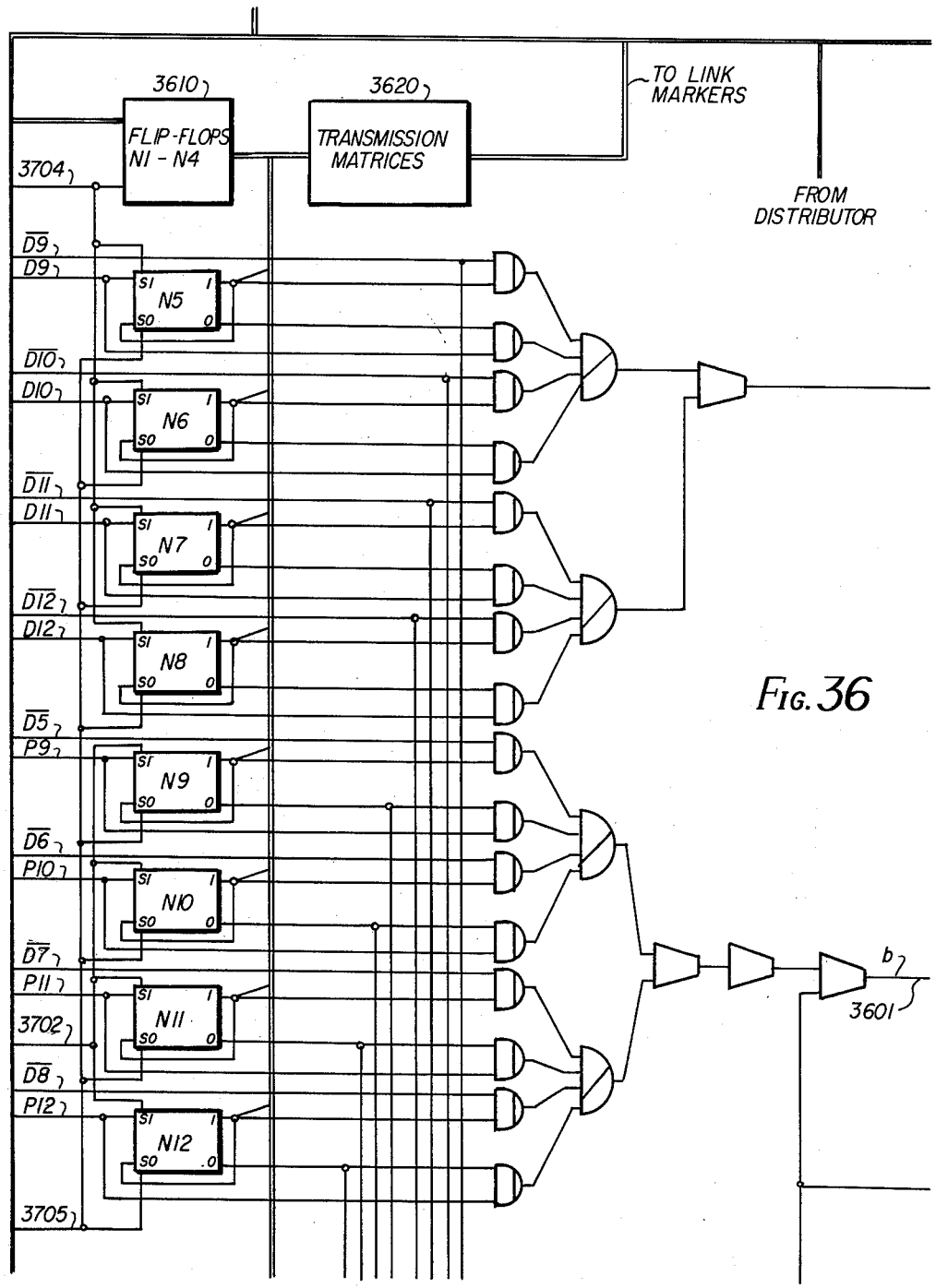
Figure 37:
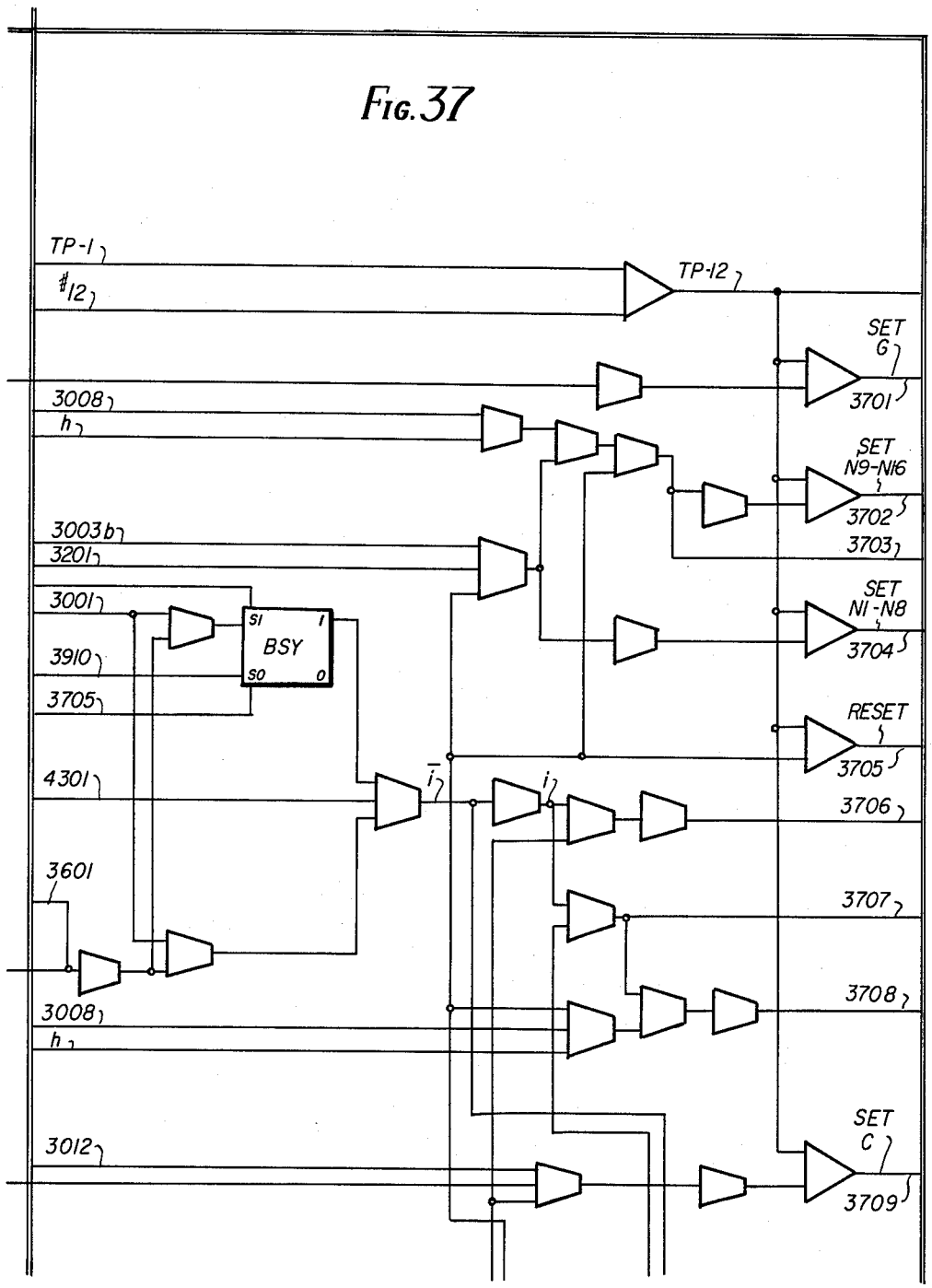
Figure 38:
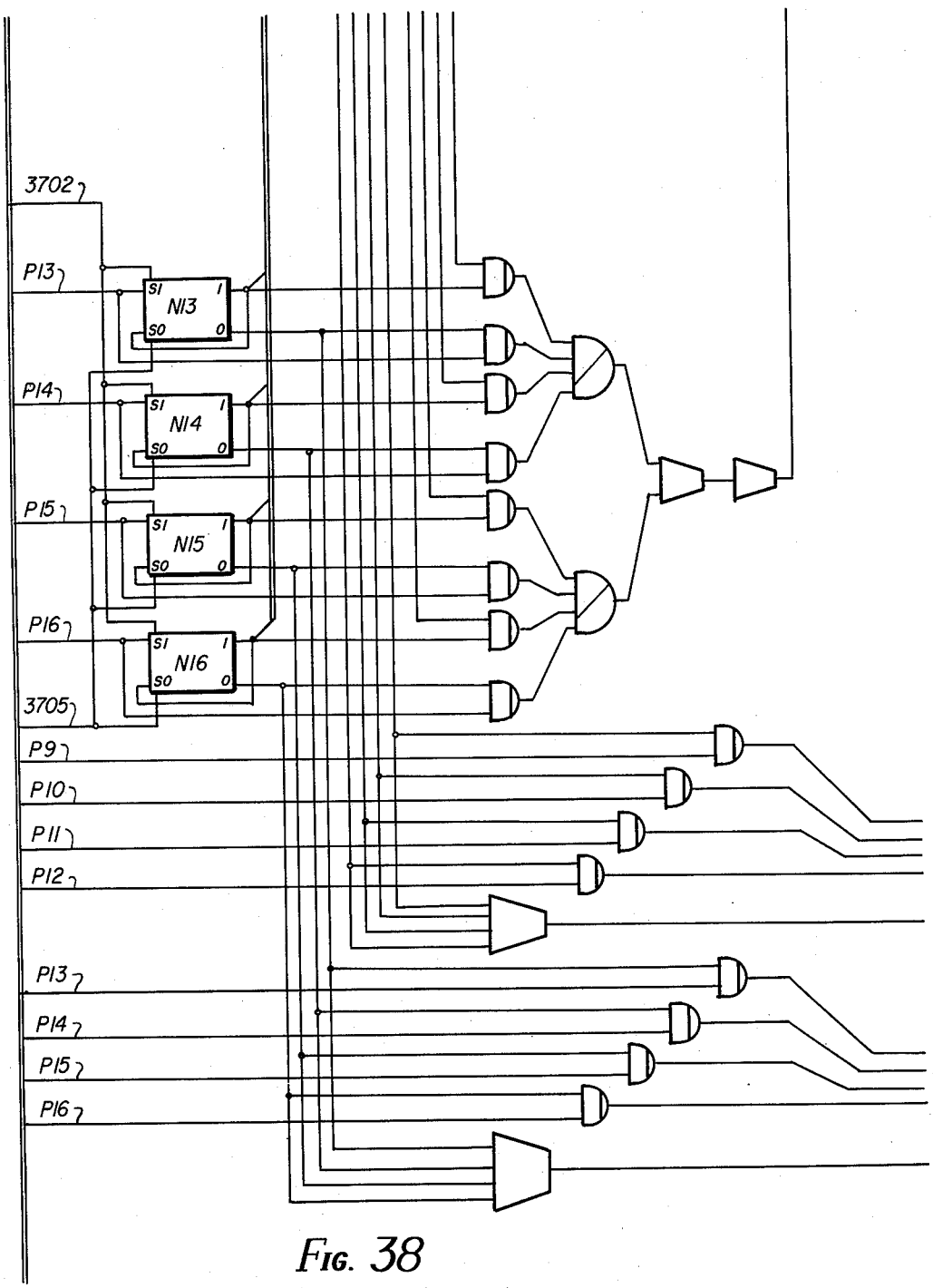
Figure 39:
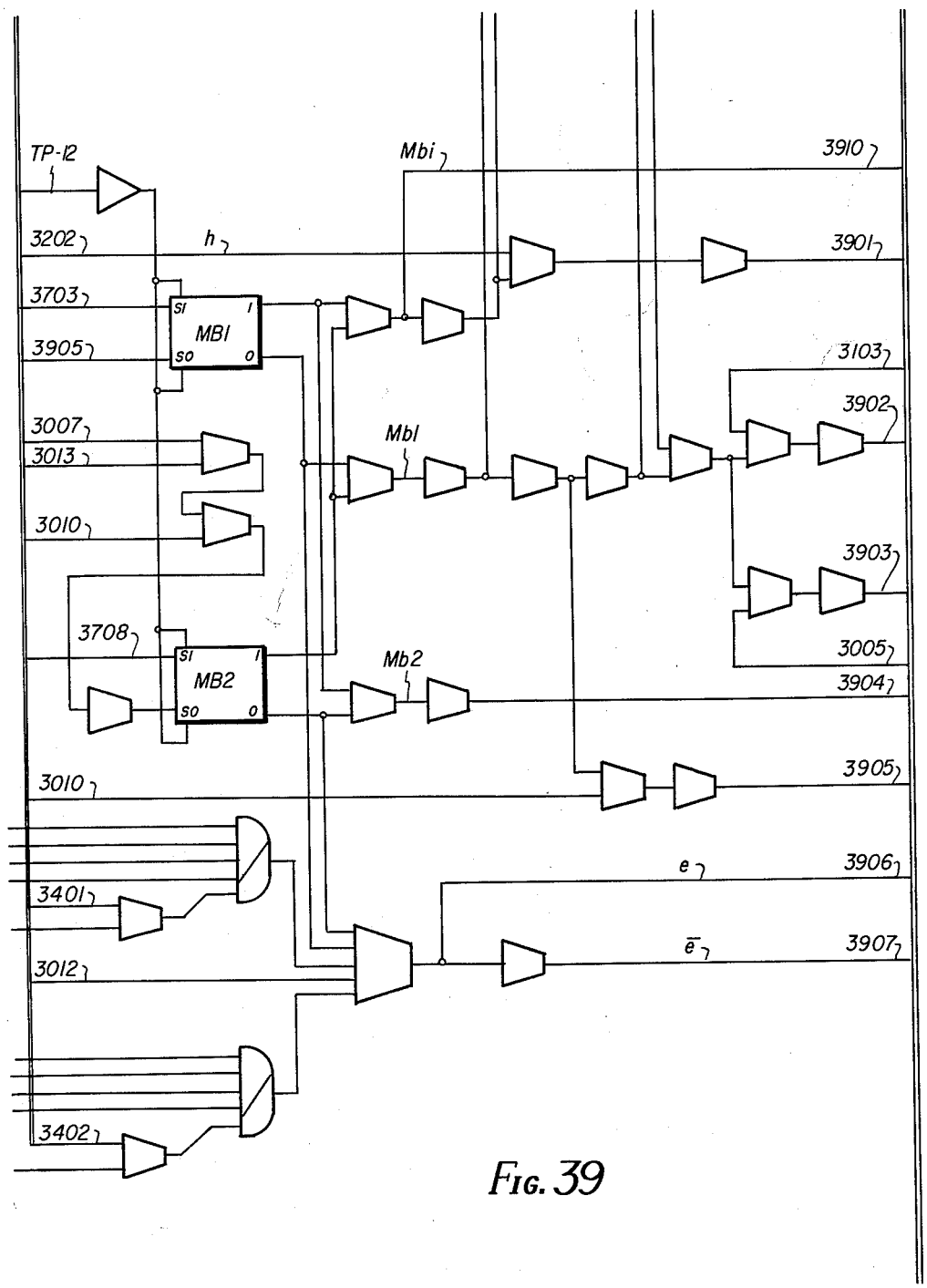
Figure 40:
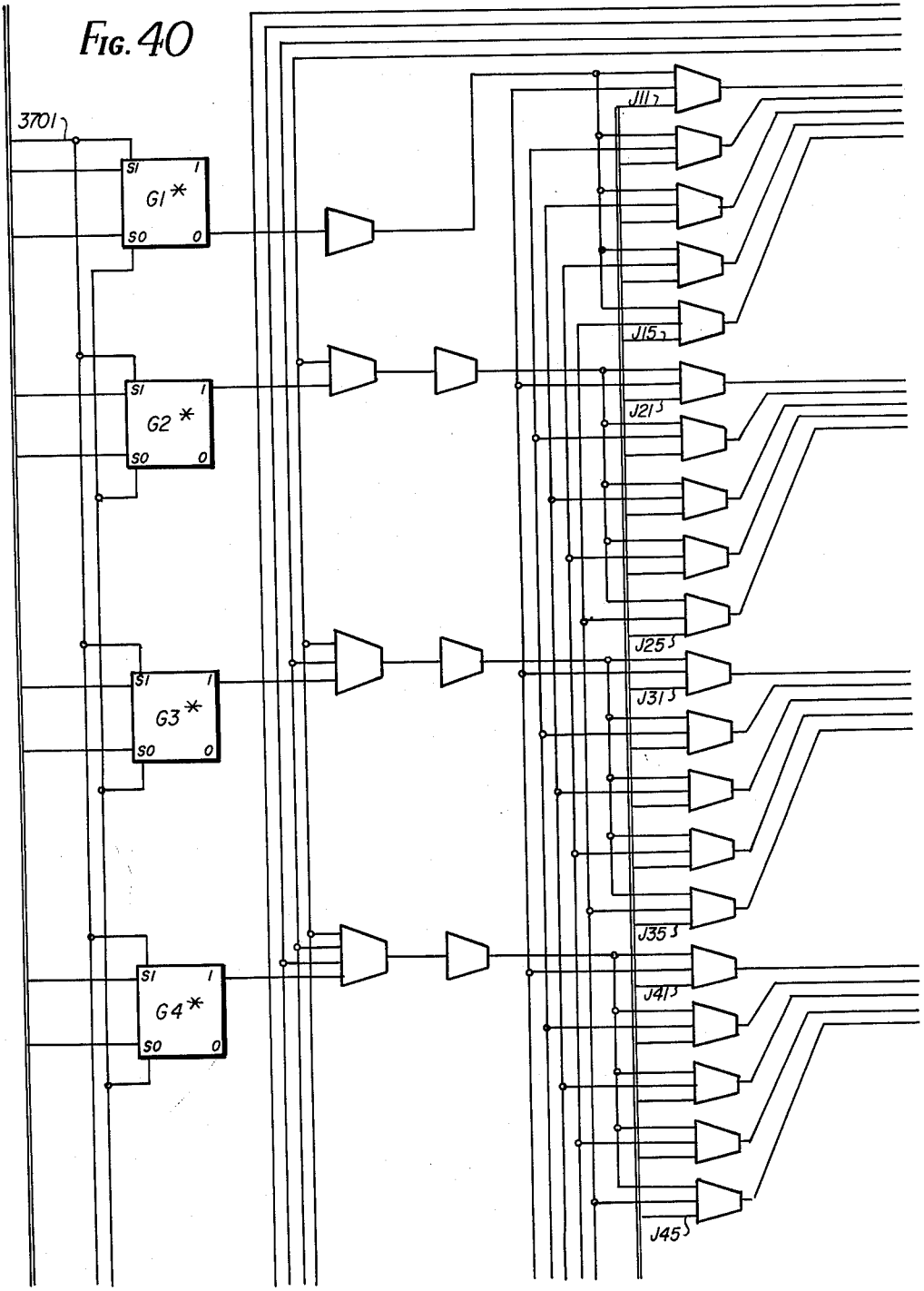
Figure 41:
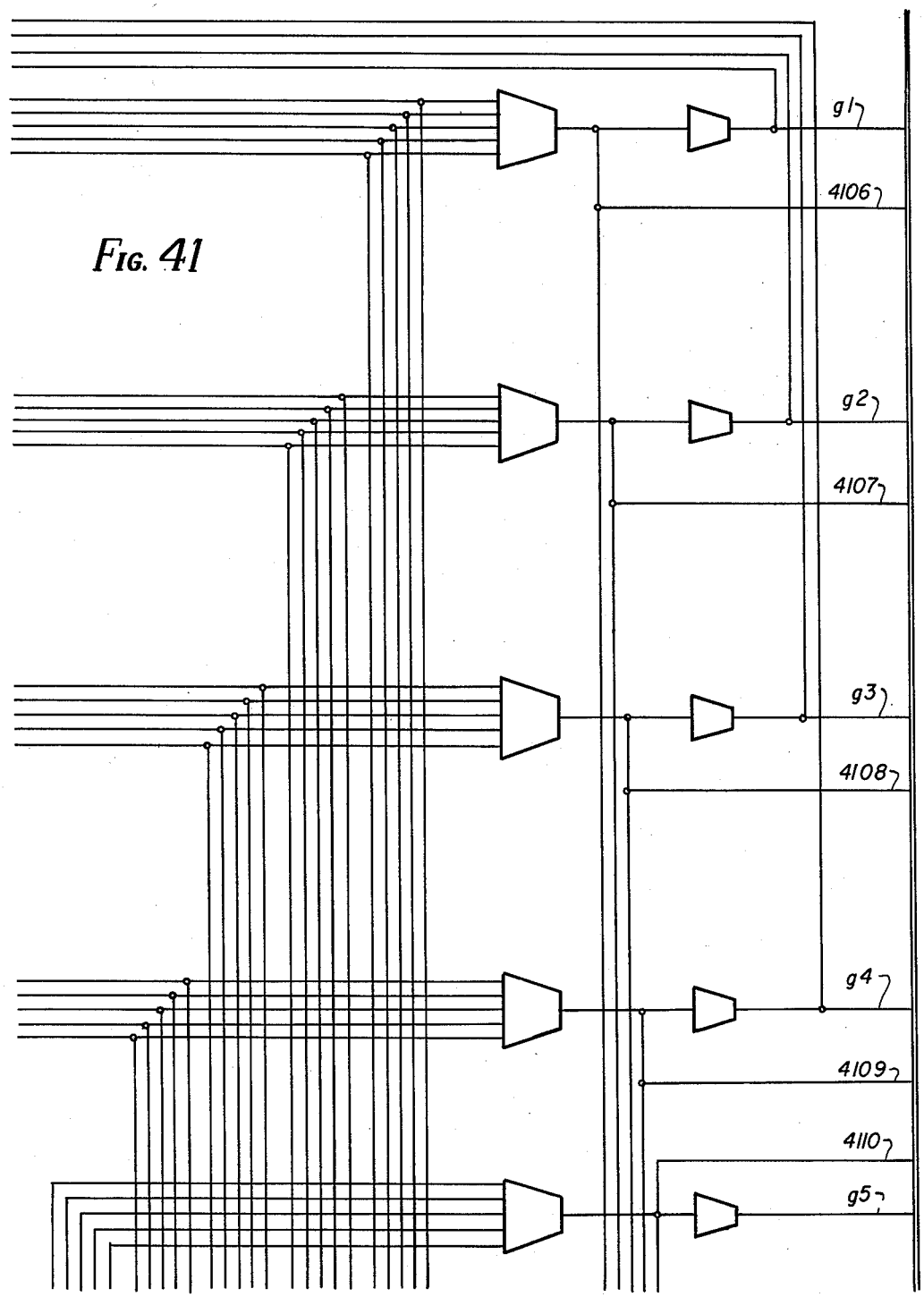
Figure 42:
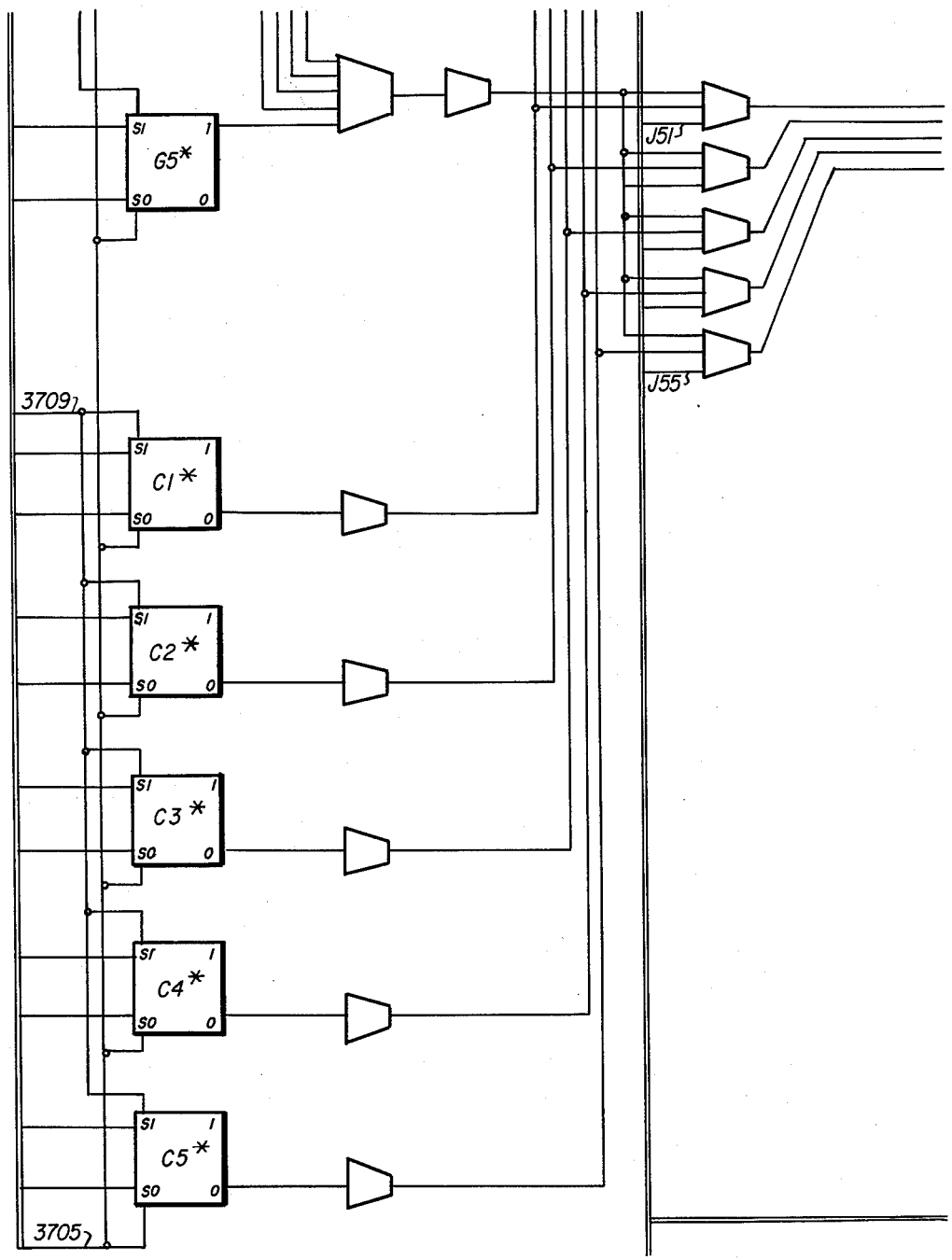
Figure 43:
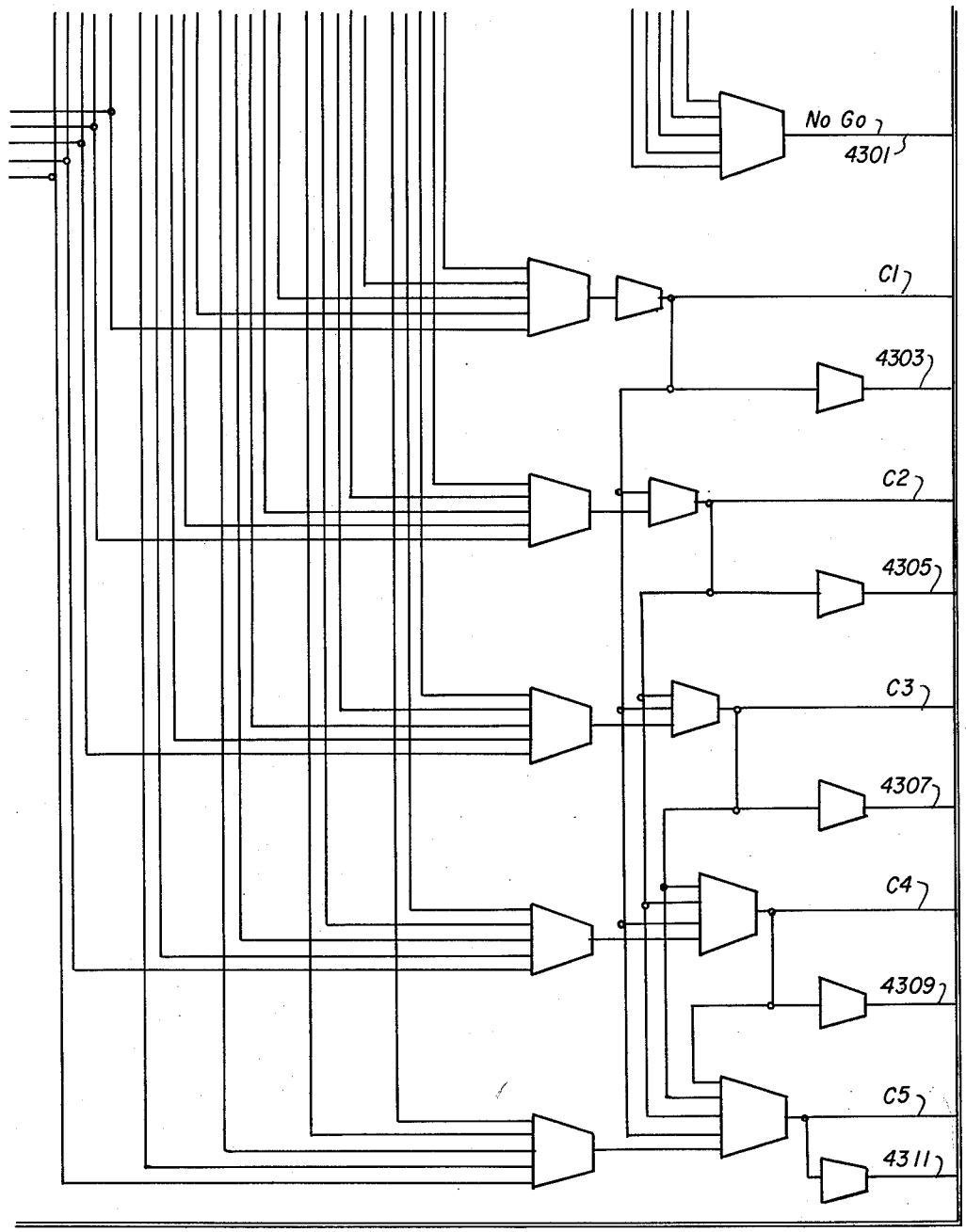

The sequence circuit is shown in FIGS. 30 and 31. A switch 3130 is provided for clearing the memory by making the output signals Set P1–Set P4 all zero. This forces the sequence circuit into state S12, which in turn causes the remainder of the memory to be cleared. The line supervisory circuit is shown in FIG. 32, the timer is shown in FIG. 33, and the number and route registers P9–P12 and P13–P16 are shown in FIGS. 34 and 35.

The marker flip-flops and related logic circuits are shown in FIGS. 36–43 inclusive. The flip-flops N1–N4 are shown by a single box 3610. The outputs from the flip-flops N1–N16 are translated by a group of matrices 3620, which correspond to the matrices 1911, 1912, 1913, and 1914, for supplying input signals to the link-markers in the crosspoint network 110.

While I have described above the principles of my invention in connection with specific apparatus, it is to be clearly understood that this description is made only by way of example and not as a limitation to the scope of my invention.

What is claimed is:

1. In a communication switching system, a switching network for selectively establishing connections between any one of a plurality of originating paths and any one of a plurality of terminating paths in accordance with supervisory control signals received in a given call, said switching network comprising a plurality of junctor links, and a plurality of crosspoint matrix switches connected by interstage links for selectively connecting the junctor links to the originating paths and to the terminating paths, each matrix switch comprising a coordinate array of switching devices, common control equipment including a memory and logic circuits shared on a time division multiplex basis by a plurality of calls, said memory having a plurality of groups of storage elements, a source of recurring pulses supplied to the memory, a multiplex arrangement for associating each group of memory elements with an individual pulse time slot during which the stored information is recirculated and may be selectively modified by means of the logic circuits, means for associating the given call with a particular time slot for the duration of the call and for responding to the supervisory control signals to register the numerical designation of a called terminating path in the corresponding group of elements, a marker controlled by the called path numerical designation as registered in said group of elements for finding an available route and supplying marking signals to cause a connection to be established in the switching network between the originating path for the call and the terminating path by way of the route found, and means for storing the identity of said route in said group of elements for the duration of the call, the connection in the switching network being maintained during the call independently of the common control equipment.

2. In a communication switching system, the combination as claimed in claim 1, wherein to effect said finding of an available route said marker searches during a first marker cycle for an available route by scanning the memory in all time slots for the stored identities of routes of established connections; and selects a route in accordance with the information determined by said scanning of the identities of routes.

3. In a communication switching system, the combination as claimed in claim 2, wherein during a second marker cycle said marker supplies marking signals to said switching network to effect said establishment of a connection, and transmits the identity of the route to the memory to effect said storage.

4. In a communication switching system, the combination as claimed in claim 3, wherein during a third marker cycle, responsive to disconnect of the call, said marker supplies a signal to the switching network to break down the connection, and signals the common control equipment to cause the identity of said route to be erased from the memory.

5. In a communication switching system, the combination as claimed in claim 2, wherein a register subgroup in said group of elements is used for said registration of the numerical designation, and wherein means effective after an available route has been selected by the marker is provided for causing the numerical designation of the called terminating path to be erased and the identity of a route to be stored in the same elements in said register subgroup.

6. In a communication switching system, the combination as claimed in claim 5, further including a plurality of line circuits, each of which is assigned an individual one of said time slots and the corresponding group of memory elements, each line circuit being associated with one originating path and one terminating path, a common supervisory signal path connected between said common control equipment and all of the line circuits, and means for each line circuit to transmit supervisory control signals during its time slot over the supervisory signal path to the common control equipment.

7. In a communication switching system, the combination as claimed in claim 6, wherein during a second marker cycle said marker supplies marking signals to said switching network to effect said establishment of a connection, and wherein said means for storing the identity of the route is effective during said second cycle to cause the routing designation to be stored in the memory register subgroup of both the calling and the called line circuits, each such registration occurring during the corresponding time slot of the line circuit.

8. In a communication switching system, the combination as claimed in claim 6, wherein said group of memory elements associated with each line circuit further includes a sequence subgroup for storing the state of a line circuit as idle, calling or called, and the sequence state of a calling or called line circuit.

9. In a communication switching system, the combination as claimed in claim 8, wherein each said group of memory elements further includes a subgroup for registering the condition of the supervisory signals, and for measuring the time following a change of condition.

10. In a communication switching system, the combination as claimed in claim 7, wherein said switching devices are bistable diodes, and said means to cause a connection to be established in the switching network comprises means responsive to said marking signals for applying a marking potential to the originating path, the terminating path, the junctor link, and each interstage link selected for the connection and for triggering the diodes between the marked points to a low-resistance state to thereby establish the connection.

11. In a communication switching system, the combination as claimed in claim 7, wherein each said register subgroup of memory elements is divided into single-item registers, each of which at any time may store one numerical digit in coded form or one item of routing information, the nature of the stored digit or item being dependent on the sequence state of the call.

12. In a communication switching system, the combination as claimed in claim 11, wherein said single-item registers comprise a first and a second register, means effective during the receipt of supervisory control signals designating a called number for storing each digit of the number in the first register while it is being received and for transferring the first digit to the second register during the interdigital interval, and wherein during established connection states for both the calling and the called line, the corresponding first registers store the identity of the route of the calling side of the connection, and the second registers store the identity of the route of the called side of the connection.

13. In a communication switching system, the combination as claimed in claim 7, wherein said memory elements are ferrite cores.

14. In a communication switching system, the combination as claimed in claim 1, wherein said switching network comprises (1) a multistage array of electrically interconnected four-layer semi-conductor diodes having each an anode and a cathode and being of the type which may be triggered from a high-resistance state to a low-resistance state by an applied voltage of a given direction and value, which remains in the low-resistance state with a holding current exceeding a small value, and which reverts to the high-resistance state upon the holding current falling below said small value, (2) interstage links connected between stages of four-layer diodes, a plurality of such links in tandem being required for a connection, (3) voltage sources, and (4) selective marking networks individually connected to said paths and links for coupling the voltage sources to the four-layer diodes, means responsive to said marking signals for applying marking potentials from the voltage sources through respective marking networks to the paths and links of a selected connection to thereby apply a voltage of said given direction and value across the four-layer diodes in the path to trigger them to the low-resistance state.

15. In a communication switching system, the combination as claimed in claim 14, wherein said means for applying marking potentials includes means for limiting the rate of change of the triggering voltage across each four-layer diode so that it does not exceed a given rate, whereby false triggering of other four layer diodes is inhibited.

16. In a communication switching system, the combination as claimed in claim 15, wherein said limiting means includes a resistance-capacitance network connected to the link or path on one side of each four-layer diode during triggering.

17. In a communication switching system, the combination as claimed in claim 14, further including a plurality of junctors connected in respective junctor links, one of the said links in each connection being a junctor link, and there being a plurality of links in tandem between the junctor link and each path of a connection, the marking network for each junctor link including means for shunting it through a low impedance path to ground when it is idle.

18. In a communication switching system, the combination as claimed in claim 17, wherein each of the link and path marking networks includes means for shunting the corresponding path or link through a low impedance path to ground, and control signals are supplied to each marking network at a low-potential point thereof.

19. In a communication switching system, the combination as claimed in claim 17, further including means for applying ringing signals to the junctor links for transmission over an established transmission path through the four-layer diodes to the terminating path for transmission to a called substation to operate a tone ringer therein, and to the originating path for supplying a supervisory tone to a calling substation.

20. In a communication switching system, a switching network for selectively establishing connections between any one of a plurality of originating paths and any one of a plurality of terminating paths in accordance with supervisory control signals received in a given call, said switching network comprising a plurality of junctor links, and a plurality of crosspoint matrix switches connected by interstage links for selectively connecting the junctor links to the originating paths and to the terminating paths, each matrix switch comprising a coordinate array of switching devices, common control equipment including a plurality of storage units, each unit having a group of storage elements, means for associating the given call with a particular storage unit for the duration of the call and for responding to the supervisory control signals to register the numerical designation of a called terminating path in the corresponding unit, a marker controlled by the called path numerical designation as registered in said unit for finding an available route and supplying marking signals to cause a connection to be established through the switching network between the originating path for the call and the terminating path by way of the route found, and means for storing the identity of said route in said group of elements for the duration of the call, the connection in the switching network being maintained during the call independently of the common control equipment.

References Cited in the file of this patent
UNITED STATES PATENTS

| | | |
|---|---|---|
| 2,668,876 | Gohorel | Feb. 5, 1954 |
| 2,694,751 | Den Hertog et al. | Nov. 16, 1954 |
| 2,827,516 | Morris | Mar. 18, 1958 |
| 2,830,121 | Trousdale | Apr. 8, 1958 |
| 2,917,583 | Burton et al. | Dec. 15, 1959 |
| 2,951,124 | Hussey et al. | Aug. 30, 1960 |
| 2,984,705 | Harris | May 16, 1961 |
| 3,027,427 | Woodin | Mar. 27, 1962 |